(12) United States Patent
Hammel et al.

(10) Patent No.: US 7,488,464 B2
(45) Date of Patent: Feb. 10, 2009

(54) METAL OXIDE PROCESSING METHODS AND SYSTEMS

(75) Inventors: Charles F. Hammel, Escondido, CA (US); Richard M. Boren, Bakersfield, CA (US)

(73) Assignee: EnviroScrub Technologies Corporation, Minneapolis, MN (US)

( * ) Notice: Subject to any disclaimer, the term of this patent is extended or adjusted under 35 U.S.C. 154(b) by 814 days.

(21) Appl. No.: 10/902,439

(22) Filed: Jul. 28, 2004

(65) Prior Publication Data

US 2005/0074380 A1 Apr. 7, 2005

Related U.S. Application Data

(60) Provisional application No. 60/491,653, filed on Jul. 31, 2003.

(51) Int. Cl.
| | |
|---|---|
| C01B 13/32 | (2006.01) |
| C01B 13/36 | (2006.01) |
| C01D 1/02 | (2006.01) |
| C01D 15/02 | (2006.01) |
| C01G 3/02 | (2006.01) |
| C01G 53/04 | (2006.01) |
| C01G 51/04 | (2006.01) |
| C01G 37/02 | (2006.01) |
| C01G 23/04 | (2006.01) |
| C01G 45/02 | (2006.01) |
| C01G 9/02 | (2006.01) |
| C01G 49/02 | (2006.01) |
| C01F 7/02 | (2006.01) |
| C01F 11/16 | (2006.01) |
| C01F 5/04 | (2006.01) |

(52) U.S. Cl. .......... 423/592.1; 423/593.1; 423/594.1; 423/594.2; 423/594.3; 423/594.4; 423/594.5; 423/594.6; 423/595; 423/596; 423/598; 423/599; 423/600; 423/594.14; 423/594.15; 423/594.16; 423/604; 423/605; 423/606; 423/607; 423/608; 423/622; 423/624; 423/625; 423/632; 423/633; 423/635; 423/636; 423/641; 423/594.18; 423/594.19; 502/514

(58) Field of Classification Search .......... 423/605, 423/592.1–596, 598–600, 604–608, 622, 423/624–625, 632–633, 635–636, 641, 594.18–594.19; 502/514

See application file for complete search history.

(56) References Cited

U.S. PATENT DOCUMENTS 1,178,927 A 4/1916 Kaplan .................. 423/605

(Continued)

FOREIGN PATENT DOCUMENTS

DE 33 12 890 10/1984

(Continued)

OTHER PUBLICATIONS

Donne et al., "The Chemostat: A Novel Approach to the Synthesis of Manganese Dioxide", Materials Research Bulletin, vol. 30, No. 7, pp. 859-869, 1995.

*Primary Examiner*—Wayne Langel
*Assistant Examiner*—Brittany M Martinez
(74) *Attorney, Agent, or Firm*—Fredrikson & Byron, PA

(57) ABSTRACT

Methods and systems for processing metal oxides from metal containing solutions. Metal containing solutions are mixed with heated aqueous oxidizing solutions and processed in a continuous process reactor or batch processing system. Combinations of temperature, pressure, molarity, Eh value, and pH value of the mixed solution are monitored and adjusted so as to maintain solution conditions within a desired stability area during processing. This results in metal oxides having high or increased pollutant loading capacities and/or oxidation states. These metal oxides may be processed according to the invention to produce co-precipitated oxides of two or more metals, metal oxides incorporating foreign cations, metal oxides precipitated on active and inactive substrates, or combinations of any or all of these forms. Metal oxides thus produced are, amongst other uses; suitable for use as a sorbent for capturing or removing target pollutants from industrial gas streams or drinking water or aqueous streams or for personal protective respirators.

23 Claims, 14 Drawing Sheets

U.S. PATENT DOCUMENTS

| | | | | |
|---|---|---|---|---|
| 1,275,666 | A | 8/1918 | Ellis | 423/605 |
| 1,293,461 | A | 2/1919 | Kaplan | 423/605 |
| 1,851,312 | A | 3/1932 | Huff | 423/222 |
| 2,123,250 | A | 7/1938 | Muller et al. | 23/145 |
| 2,486,530 | A | 11/1949 | Jenness | 252/186 |
| 2,608,466 | A | 8/1952 | Fox | 23/145 |
| 2,956,860 | A | 10/1960 | Welsh | 23/145 |
| 2,984,545 | A | 5/1961 | Tarbutton | 23/178 |
| 3,011,867 | A | 5/1961 | Welsh | 23/61 |
| 3,150,923 | A | 9/1964 | Bienstock | 423/244.06 |
| 3,226,192 | A | 12/1965 | Atsukawa | 23/167 |
| 3,251,649 | A | 5/1966 | Atsukawa | 23/167 |
| 3,330,096 | A | 7/1967 | Zimmerley | 55/73 |
| 3,427,128 | A | 2/1969 | Schmier | 23/145 |
| 3,723,598 | A | 3/1973 | Spedden | 423/244 |
| 3,770,868 | A | 11/1973 | Lean | 423/5 |
| 3,780,158 | A | 12/1973 | Welsh | 423/49 |
| 3,798,310 | A | 3/1974 | Atsukawa | 423/244 |
| 3,898,320 | A | 8/1975 | Atsukawa | 423/605 |
| 3,933,128 | A | 1/1976 | Cramer | 122/4 |
| 3,951,765 | A | 4/1976 | Everett | 204/96 |
| 3,956,189 | A | 5/1976 | Warshaw | 252/466 |
| 3,957,949 | A | 5/1976 | Senjo | 423/235 |
| 3,981,971 | A | 9/1976 | Saito | 423/239 |
| 4,006,217 | A | 2/1977 | Faber | 423/605 |
| 4,008,169 | A | 2/1977 | McGauley | 252/191 |
| 4,011,298 | A | 3/1977 | Fukui | 423/235 |
| 4,012,487 | A | 3/1977 | Merkl | 423/242 |
| 4,014,982 | A | 3/1977 | Paull | 423/528 |
| 4,017,586 | A | 4/1977 | Reeves | 423/242 |
| 4,029,752 | A | 6/1977 | Cahn | 423/563 |
| 4,033,113 | A | 7/1977 | Cramer | 60/39 |
| 4,070,441 | A | 1/1978 | Pessel | 423/242 |
| 4,081,509 | A | 3/1978 | Hishinuma | 423/235 |
| 4,087,372 | A | 5/1978 | Saitoh | 252/184 |
| 4,091,075 | A | 5/1978 | Pessel | 423/242 |
| 4,102,982 | A | 7/1978 | Weir | 423/242 |
| 4,108,969 | A | 8/1978 | Merkl | 423/560 |
| 4,112,053 | A | 9/1978 | Sanada | 423/239 |
| 4,123,499 | A | 10/1978 | Welsh | 423/35 |
| 4,123,507 | A | 10/1978 | Hass | 423/574 |
| 4,133,309 | A | 1/1979 | Köhler | |
| 4,144,144 | A | 3/1979 | Radimer | 205/347 |
| 4,153,429 | A | 5/1979 | Matthews | 55/68 |
| 4,162,207 | A | 7/1979 | Boyer | 204/157 |
| 4,164,545 | A | 8/1979 | Scott | 423/239 |
| 4,233,188 | A | 11/1980 | Ghandi | 252/470 |
| 4,250,149 | A | 2/1981 | Welsh | 423/50 |
| 4,276,268 | A | 6/1981 | Welsh | 423/49 |
| 4,277,255 | A | 7/1981 | Apelgren | 55/20 |
| 4,277,360 | A | 7/1981 | Mellors | 252/182 |
| 4,309,386 | A | 1/1982 | Pirsh | 422/177 |
| 4,309,392 | A | 1/1982 | Shaw | 423/239 |
| 4,310,494 | A | 1/1982 | Welsh | 423/49 |
| 4,369,108 | A | 1/1983 | Bertolacini | 208/120 |
| 4,369,130 | A | 1/1983 | Bertolacini | 252/455 |
| 4,369,167 | A | 1/1983 | Weir | 423/210 |
| 4,376,103 | A | 3/1983 | Bertolacini | 423/244 |
| 4,381,991 | A | 5/1983 | Bertolacini | 208/113 |
| 4,400,362 | A | 8/1983 | Lerner | 423/235 |
| 4,402,931 | A | 9/1983 | Tanabe | 423/605 |
| 4,411,878 | A | 10/1983 | Welsh | 423/605 |
| 4,423,019 | A | 12/1983 | Bertolacini | 423/244 |
| 4,448,760 | A | 5/1984 | Welsh | 423/605 |
| 4,450,148 | A | 5/1984 | Welsh | 423/605 |
| 4,476,104 | A | 10/1984 | Mellors | 423/605 |
| 4,479,877 | A | 10/1984 | Guter | 210/670 |
| 4,497,902 | A | 2/1985 | Bertolacini | 502/65 |
| 4,500,281 | A | 2/1985 | Beardmore | 431/3 |
| 4,542,116 | A | 9/1985 | Bertolacini | 502/65 |
| 4,550,098 | A | 10/1985 | Gens | 502/324 |
| 4,551,254 | A | 11/1985 | Imada | 210/688 |
| 4,552,734 | A | 11/1985 | Iannicelli | 423/230 |
| 4,552,735 | A | 11/1985 | Iannicelli | 423/224 |
| 4,581,210 | A | 4/1986 | Teller | 423/242 |
| 4,581,219 | A | 4/1986 | Imada | 423/605 |
| 4,713,225 | A | 12/1987 | Iannicelli | 423/230 |
| 4,719,791 | A | 1/1988 | Greiner | 73/38 |
| 4,755,499 | A | 7/1988 | Neal | 502/415 |
| 4,798,711 | A | 1/1989 | Neal | 423/239 |
| 4,836,993 | A | 6/1989 | Bertolacini | 423/244 |
| 4,843,980 | A | 7/1989 | Markham | 110/342 |
| 4,871,522 | A | 10/1989 | Doyle | 423/239 |
| 4,872,989 | A | 10/1989 | Pirotta | 210/638 |
| 4,883,647 | A | 11/1989 | Kainer | 423/239 |
| 4,908,194 | A | 3/1990 | Hooper | 423/235 |
| 4,915,922 | A | 4/1990 | Filss | 423/239 |
| 4,921,689 | A | 5/1990 | Walker | 423/605 |
| 4,923,688 | A | 5/1990 | Iannicelli | 423/224 |
| 4,925,633 | A | 5/1990 | Doyle | 422/171 |
| 4,940,569 | A | 7/1990 | Neal | 423/239 |
| 4,944,878 | A | 7/1990 | Lockridge | 210/683 |
| 4,954,324 | A | 9/1990 | Hooper | 423/239 |
| 5,000,930 | A | 3/1991 | Boguslawski | 423/239 |
| 5,009,872 | A | 4/1991 | Chuang | 423/245 |
| 5,023,063 | A | 6/1991 | Stiles | 423/239 |
| 5,059,406 | A | 10/1991 | Sheth | 423/244 |
| 5,112,796 | A | 5/1992 | Iannicelli | 502/402 |
| 5,176,888 | A | 1/1993 | Stiles | 423/239 |
| 5,192,515 | A | 3/1993 | Gardner-Chavis | 423/213 |
| 5,199,263 | A | 4/1993 | Green | 60/670 |
| 5,200,160 | A | 4/1993 | Benson | 423/235 |
| 5,246,554 | A | 9/1993 | Cha | 204/157 |
| 5,258,340 | A * | 11/1993 | Augustine et al. | 502/60 |
| 5,277,890 | A | 1/1994 | Wang | 423/605 |
| 5,348,726 | A | 9/1994 | Wang | 423/605 |
| 5,352,269 | A | 10/1994 | McCandlish | 75/351 |
| 5,358,643 | A | 10/1994 | McClintock | 210/709 |
| 5,366,710 | A | 11/1994 | Chou | 423/235 |
| 5,384,301 | A | 1/1995 | Flytzani-Stephanopoulos | 502/304 |
| 5,391,218 | A | 2/1995 | Jorgenson | 95/20 |
| 5,391,365 | A | 2/1995 | Wang | 423/605 |
| 5,439,658 | A | 8/1995 | Johnson | 423/243 |
| 5,456,892 | A | 10/1995 | Yang | 423/239 |
| 5,505,766 | A | 4/1996 | Chang | 95/134 |
| 5,534,234 | A | 7/1996 | Reddin | 423/50 |
| 5,556,545 | A | 9/1996 | Volchek | 210/651 |
| 5,607,496 | A | 3/1997 | Brooks | 75/670 |
| 5,635,073 | A | 6/1997 | Aktor | 210/714 |
| 5,658,544 | A | 8/1997 | Goodes | 423/230 |
| 5,672,323 | A | 9/1997 | Bhat | 422/172 |
| 5,700,439 | A | 12/1997 | Goyette | 423/230 |
| 5,712,219 | A | 1/1998 | Klabunde | 502/328 |
| 5,780,000 | A | 7/1998 | Strickland | 423/220 |
| 5,798,088 | A | 8/1998 | Dorchak | 423/567 |
| 5,853,684 | A | 12/1998 | Fang | 423/244 |
| 5,866,014 | A | 2/1999 | Santina | 210/716 |
| 5,871,703 | A | 2/1999 | Alix | 423/210 |
| 5,888,926 | A | 3/1999 | Biswas | 502/406 |
| 5,955,045 | A | 9/1999 | Baur | 423/239.1 |
| 5,955,393 | A | 9/1999 | Moskovitz | 502/5 |
| 6,010,666 | A | 1/2000 | Kurokawa | 422/122 |
| 6,039,783 | A | 3/2000 | Lueck | 71/59 |
| 6,066,590 | A | 5/2000 | Horii | 502/324 |
| 6,085,440 | A | 7/2000 | Getler | 34/314 |
| 6,102,039 | A | 8/2000 | Springett | 128/206.12 |
| 6,117,333 | A | 9/2000 | Frankiewicz | 210/705 |
| 6,117,403 | A | 9/2000 | Alix | 423/210 |
| 6,132,692 | A | 10/2000 | Alix | 423/210 |
| 6,162,530 | A | 12/2000 | Xiao | 428/292 |
| 6,214,303 | B1 | 4/2001 | Hoke | 423/210 |
| 6,214,304 | B1 | 4/2001 | Rosenthal | 423/210 |
| 6,248,217 | B1 | 6/2001 | Biswas | 204/157 |

| | | | |
|---|---|---|---|
| 6,338,830 B1 | 1/2002 | Moskovitz | 423/210 |
| 6,368,510 B2 | 4/2002 | Friot | 210/670 |
| 6,398,968 B1 | 6/2002 | Higby | 210/721 |
| 6,517,802 B1 | 2/2003 | Xiao | 423/263 |
| 6,558,556 B1 | 5/2003 | Khoe | 210/758 |
| 6,579,509 B1 | 6/2003 | Otsuka | 423/245 |
| 6,599,429 B1 | 7/2003 | Azizian | 210/681 |
| 2002/0006363 A1 | 1/2002 | Feeley | 422/171 |
| 2002/0070172 A1 | 6/2002 | Schlegel | 210/660 |
| 2002/0074292 A1 | 6/2002 | Schlegel | 210/681 |
| 2002/0168302 A1 | 11/2002 | Pahlman | |
| 2003/0077249 A1 | 4/2003 | Bebbington | 424/93 |
| 2003/0077398 A1 | 4/2003 | Strutt | 427/452 |
| 2003/0196960 A1 | 10/2003 | Hughes | 210/679 |
| 2003/0196966 A1 | 10/2003 | Hughes | 210/758 |
| 2003/0209495 A1 | 11/2003 | Schlegel | 210/660 |
| 2004/0109800 A1* | 6/2004 | Pahlman et al. | 423/210 |
| 2004/0109821 A1 | 6/2004 | Koyanaka | |

FOREIGN PATENT DOCUMENTS

| | | |
|---|---|---|
| DE | 37 31 889 | 4/1989 |
| DE | 40 12 982 | 10/1991 |
| DE | 197 15 244 | 10/1998 |
| EP | 0 428 389 | 5/1991 |
| EP | 0 476 300 | 1/1995 |
| JP | 08266859 | 10/1996 |
| WO | WO 86/02918 | 5/1986 |
| WO | WO 98/17365 | 4/1998 |
| WO | 01/77031 | 10/2001 |
| WO | WO 01/87464 | 11/2001 |
| WO | 02/09852 | 2/2002 |
| WO | 02/081376 | 10/2002 |
| WO | 2004/009232 | 1/2004 |
| WO | 2004/067161 | 8/2004 |

OTHER PUBLICATIONS

Ambrose, Covington and Thirsk, "Electrode Potentials and related Properties of Some Potassium-Containing alpha Manganese Dioxides," Power Sources, 1970, 2, pp. 303-318.

"Commercial Demonstration of the NOXSO SO2/NO2 Removal flue Gas Clean-up System," Quarterly Technical Progress Report No. 16 Contract No. DE-FC22-91PC90549 date—stamped Dec. 11, 1996.

De Bruijn, et al, "Thermal Decomposition of Aqueous Manganese Nitrate Solutions", Thermal Analysis, ICTA, Berkhaeuser, Verlag, Basel, Boston, Stuttgart, 1980: 393-398.

Elvers, Barbara, Ed., "Manganese," Ullmans Encyclopedia of Industrial Chemistry, Basel, Switzerland? .

Hypolito, Valarelli, Giovanoli, Netto, "Gibbs Free Energy of Formation of Synthetic Cryptomelane," Chimia 38 (1984) No. 12 (Dec.), pp. 427-429.

Il'chenko, Kucha, Chernomordik, Andreeva, Ivabova, "Path and Products of Thermal Decomposition of Mn(NO3)2 in Aqueous Nitric Acid Solutions," Plenum Publishing Corp., 1985, Northwest Correspondence Polytechnic Institute, Zhurnal Prikladnoi Khimii, vol. 58, May 21, 1984: pp. 984-989.

Kalagnanam, J. & Rubin ES, "Development of Integrated Environmental Control Model," Quarterly Progress Report DE-AC22-92PC91346-12 Oct. 1995.

Kanungo, Parida and Sant, "Studies on MnO2—II: Relationship Between Physico . . . Activity . . . Synthetic Mn" Electrochemiica Acta, 26 (8), pp. 1147-1156, 1981? Dec. 15, 1980.

Kapteijn, et. al., "Alumina-Supported Manganese Oxide Catalysts—Part II: Surface Characterization and Adsorbtion of Ammonia and Nitric Oxide," Journal of Catalysis, 150, (May 12, 1994), pp. 105-116.

Kapteijn, et. al., "Alumina-Supported Manganese Oxide Catalysts—Part I: Characterization: Effect Precursor and Loading," Journal of Catalysis, 150, pp. 94-104, Apr. 13, 1994.

Kijlstra, et. Al., "Mechanism of the SCR of NO by NH3 Over MnOx / Al2O3—Part I; Adsorption and Desorption of Single Reaction Components," Journal of Catalysis, 171, pp. 208-218, Jun. 2, 1997, article No. CA971788.

Kijlstra, et. al., "Mechanism of the SCR of NO by NH3 Over MnOx/Al2O3—Part II; Reactivity of Adsorbed NH3 and NO Complexes," Journal of Catalysis, 171, pp. 219-230, Jun. 2, 1997, article No. CA971789.

Powerspan Corp., Powerspan System Overview: ECO™ Technology (Electro-Catalytic Oxidation) www.powerspancorp.com/news/release-11.shtml downloaded Jan. 11, 2002.

Singoredjo, Kapteijn, et. al., "Alumina-Supported Mn Oxides for the Low-Temp. SCR of NO with Ammonia Applied Catalysis B," Environmental, 1 (Aug. 5, 1992) 297-316.

Stiles, et. al., "Selective Catalytic Reduction of NOx in the Presence of Oxygen," Ind. Chem. Res.., 1994: 33, pp. 2259-2264.

Tarbutton, Jones, Gray and Smith, "Recovery of Sulfur Dioxide from Flue Gases," Industrial and Engineering Chemistry, vol. 49, No. 3, Mar. 1957, pp. 392-395.

Uno, et. al., "A New Dry Process of SO2 Removal From Flue Gas Proceedings," 7th world petroleum congress, vol. 9, pp. 289-295, Elsivier publishing Co, 1967.

Vadjic, et. al., "The Effect of MnO2 and Some Mn Salts on the Behaviour of SO2 in the Air," The Science of the Total Environment, 44 (Feb. 18, 1985) 245-251, Elsevier Publishers.

Wu, Shu-Chuan, et al., "Use of Deep Sea Manganese Nodules as Catalysts for Reduction of Nitric Oxide with Ammonia," Atmospheric Environment, Pergamon Press (1972), vol. 6, pp. 309-317.

* cited by examiner

REGENERATION OF LOADED SORBENT

REGENERATION OF LOADED SORBENT

REGENERATION & PRECIPITATION OF SORBENT

PRE-TREATMENT OF VIRGIN SORBENT

PRECIPITATION OF VIRGIN OXIDES OF MANGANESE SORBENT

PRECIPITATION OF VIRGIN OXIDES OF MANGANESE SORBENT

ELECTROLYTIC CELL & BY-PRODUCTS

Pourbaix Diagram at 25 C and 1 atm for the 1 mole/Liter manganese-water system

Pourbaix Diagram at 25 C and 1 atm for the 1*10E-6 mole/Liter manganese-water system Pourbaix Diagram at 25 C and 1 atm for the iron-water system Pourbaix Diagram at 25 C and 1 atm for the manganese-iron-water system Pourbaix Diagram at 100 C and 1 atm for the manganese-water system Pourbaix Diagram at 25 C and 10 atm for the manganese-water system Pourbaix Diagram at 100 C and 10 atm for the manganese-water system

METAL OXIDE PROCESSING METHODS AND SYSTEMS

RELATED APPLICATIONS

This application claims priority to the benefit of U.S. Provisional Application Nos. 60/491,653, filed Jul. 31, 2003; U.S. Provisional Application No. 60/538,386 filed Jan. 21, 2004; 60/538,644 filed Jan. 22, 2004; 60/538,968 filed Jan. 23, 2004; 60/549,255 filed Mar. 2, 2004; and U.S. patent application Ser. No. 10/767,460 filed Jan. 28, 2004, which are incorporated herein by reference.

FIELD OF THE INVENTION

The invention relates to systems and processes for preparing and regenerating metal oxide compounds and to the use of such compounds as sorbents, filtration media, and/or purification media for removal of pollutants from gases, including industrial and waste gas streams, and aqueous streams, including drinking water and industrial water streams.

BACKGROUND OF THE INVENTION

Metal oxides are utilized for a number of applications, such as gaseous and aqueous pollution control systems, steel manufacture, batteries and catalytic converters, to name a few. Of particular, but not exclusive, interest to Applicants is the use of oxides of manganese in air pollution control systems, water filtration, and respirator applications. Applicants are co-inventors of the subject matter of issued U.S. Pat. Nos. 6,579,507 and 6,610,263, the disclosures of which are incorporated herein by reference. These patents disclose pollutant removal systems and processes, sometimes referred to as Pahlman Process™ Technology, which utilize dry and wet removal techniques and combinations thereof, incorporating the use of oxides of manganese as a sorbent for capture and removal of target pollutants from gas streams.

Metal oxides have the ability to capture target pollutants from gas streams; however, the low pollutant loading rates achieved with various prior art metal oxides have made some industrial applications of this attribute uneconomical. The low target pollutant loading rates of various prior art metal oxide sorbents would require voluminous amounts of sorbent to effectively capture large quantities of target pollutants that exist at many industrial sites, e.g., $NO_x$ and/or $SO_2$. The large quantity of sorbent that would be required to capture $NO_x$ and/or $SO_2$ could result in an overly costly pollutant removal system, sorbent regeneration system, and waste removal system. It would therefore be desirable to enhance the loading capacities of the metal oxide sorbent in order to economically implement a pollution removal system utilizing metal oxide sorbents.

Metal oxides are also useful in removing pollutants from aqueous streams. However, limitations of prior art metal oxides again result in disappointing pollutant removal performance and marginal economic return. As an example, arsenic is found in water in two common forms or species, arsenite ($As^{+3}$) and arsenate ($As^{+5}$). Metal oxides of conventional systems have difficulty in removing arsenite, and costly provisions are often necessary to oxidize the arsenite to arsenate that may be more easily removed. Further, Applicants are not aware of any current technology that can remove arsenite and/or arsenate along with selectively removing hardness in the form of calcium, magnesium, and/or other hardness minerals.

Personal protective respirators also use metal oxides, amongst other materials, in filter elements to capture pollutants and toxins present in various environments to reduce human exposure risks and concerns. Sorbents and filtration media used in conventional filter elements may have a low affinity for certain pollutants requiring more media to ensure removal of pollutants to safe levels. These conventional media may also have low loading capacities that require frequent replacement of the filter cartridge media to prevent breakthrough of the pollutant or toxin.

Metal oxides processed according to the various embodiments of the methods of the invention may exhibit high loading capacities and/or oxidation potential, may be useful as sorbents or filtration media for removal of pollutants from gaseous and aqueous process streams, or may be used to remove arsenite and/or arsenate as well as hardness from aqueous streams, or may be used as filter media in respirators.

SUMMARY OF THE INVENTION

Figure 1:
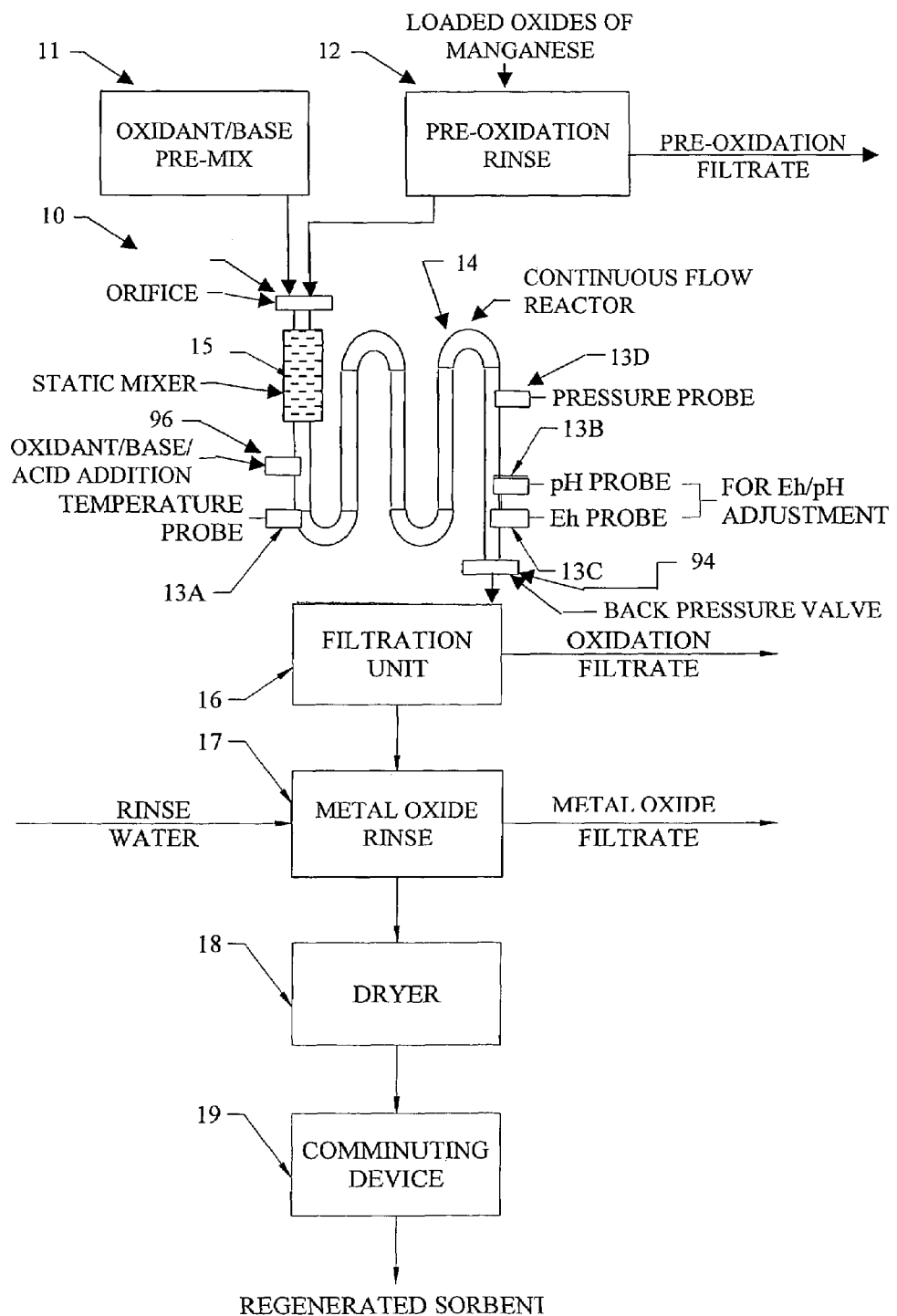
FIG. 1 is a block flow diagram of a system and process according to the invention.

The invention relates to methods and systems and processes for processing metal oxides that, amongst other uses, are utilized as a sorbent for removal of target pollutants from a gas or aqueous stream. The metal oxides processed in embodiments of the methods and systems of the invention exhibit high pollutant loading capacities and/or oxidation states. The invention further relates to metal oxides produced by the methods and systems of the invention and novel applications for these metal oxides.

In an embodiment of the invention, a method for rapid and adaptive processing metal oxides comprises the steps of: a) providing a metal containing solution; b) providing an aqueous oxidizing solution, the oxidizing solution being prepared to have Eh and pH values within the stability area of an aqueous solution system, the stability area being selected from the group consisting of a metal oxide stability area, a metal ion stability area, and a polyatomic ion stability area for an aqueous solution system at process temperature and process pressure when the aqueous oxidizing solution is mixed with the metal containing solution; c) feeding the metal containing solution and the aqueous oxidizing solution into at least one continuous flow reactor, the solutions being fed either separately into the continuous flow reactor where they mix to form a combined mixed processing solution or being premixed and fed as a combined mixed processing solution; d) heating the combined mixed processing solution to process temperature; e) monitoring and adjusting the combined mixed processing solution temperature, Eh value, pH value, molarity, and pressure within the continuous flow reactor so as to rapidly and adaptively move the combined mixed processing solution conditions into and/or maintain the combined processing solution conditions within the metal oxide stability area; and f) maintaining the combined mixed processing solution conditions within the metal oxide stability area as the combined mixed processing solution travels through the continuous flow reactor so as to produce metal oxides selected from the group consisting of regenerated metal oxides, pretreated metal oxides, precipitated metal oxides, and regenerated and precipitated metal oxides.

Embodiments of the invention may also comprise the steps of a) providing at least first and second metal containing solutions or a mixed metal containing solution of the at least first and second metals; b) providing an aqueous oxidizing solution, the oxidizing solution being prepared to have Eh and pH values within a co-precipitation stability area of an aqueous solution system for the at least first and second metals at process temperature and process pressure when the aqueous oxidizing solution is mixed with the at least first and second metal containing solutions; c) feeding the at least first and second metal containing solutions or the combined at least first and second metal solution and the aqueous oxidizing solution into at least one continuous flow reactor, the solutions being fed either separately into the continuous flow reactor where they mix to form a combined mixed processing solution or being premixed and fed as a combined mixed processing solution; d) heating the combined mixed processing solution to process temperature; e) monitoring and adjusting the combined mixed processing solution temperature, Eh value, pH value, molarity, and pressure within the continuous flow reactor so as to rapidly and adaptively move the combined mixed processing solution conditions into and/or maintain the combined processing solution conditions within the co-precipitation stability area; and f) maintaining the combined mixed processing solution conditions within the co-precipitation stability area as the combined mixed processing solution travels through the continuous flow reactor so as to produce a co-precipitated metal oxide.

Embodiments of the invention may also comprise the steps of: a) providing a primary metal containing solution, the primary metal containing solution being a solution of a first metal salt; b) providing at least one secondary metal containing solution, the secondary metal containing solution being a solution of at least one secondary metal salt with the foreign metal cations being the disassociated metal cation of the at least one secondary metal salt; c) providing an aqueous oxidizing solution, the oxidizing solution being prepared to have Eh and pH values within the stability area of an aqueous solution system, the stability area being selected from the group consisting of a first metal oxide stability area, a first metal ion stability area, and a polyatomic ion stability area for a polyatomic ion of the first metal for an aqueous solution system at process temperature and process pressure when the aqueous oxidizing solution is mixed with the metal containing solutions; d) feeding the metal containing solutions and the aqueous oxidizing solution into at least one continuous flow reactor, the solutions being fed either separately into the continuous flow reactor where they mix to form a combined mixed processing solution or being premixed and fed as a combined mixed processing solution; e) heating the combined mixed processing solution to process temperature; f) monitoring and adjusting the combined mixed processing solution temperature, Eh value, pH value, molarity, and pressure within the continuous flow reactor so as to rapidly and adaptively move the combined mixed processing solution conditions into and/or maintain the combined processing solution conditions within the first metal oxide stability area but outside of the metal oxide stability area of the at least one secondary metal; and g) maintaining the combined mixed processing solution conditions solely within the first metal oxide stability area as the combined mixed processing solution travels through the continuous flow reactor so as to produce first metal oxides incorporating foreign metal cations.

Embodiments of the invention may also comprise the steps of: a) providing a metal containing solution, the metal containing solution comprising at least one disassociated primary metal salt and at least one disassociated secondary metal salt, the primary metal being a first metal and the foreign metal cations being the disassociated metal cation of the at least one secondary metal salt; b) providing an aqueous oxidizing solution, the oxidizing solution being prepared to have Eh and pH values within the stability area of an aqueous solution system, the stability area being selected from the group consisting of a first metal oxide stability area, a first metal ion stability area, and a polyatomic ion stability area for a polyatomic ion of the first metal for an aqueous solution system at process temperature and process pressure when the aqueous oxidizing solution is mixed with the metal containing solution; c) feeding the metal containing solution and the aqueous oxidizing solution into at least one continuous flow reactor, the solutions being fed either separately into the continuous flow reactor where they mix to form a combined mixed processing solution or being premixed and fed as a combined mixed processing solution; d) heating the combined mixed processing solution to process temperature; e) monitoring and adjusting the combined mixed processing solution temperature, Eh value, pH value, molarity, and pressure within the continuous flow reactor so as to rapidly and adaptively move the combined mixed processing solution conditions into and/or maintain the combined processing solution conditions within the first metal oxide stability area but outside of the metal oxide stability area of the at least one secondary metal; and f) maintaining the combined mixed processing solution conditions solely within the first metal oxide stability area as the combined mixed processing solution travels through the continuous flow reactor so as to produce first metal oxides incorporating foreign metal cations.

Embodiments of the invention may also include the steps of: a) providing at least first and second metal containing solutions or a mixed metal containing solution of the at least first and second metals; b) providing at least one secondary metal containing solution, the secondary metal containing solution being a solution of at least one secondary metal salt with the foreign metal cations being the disassociated metal cation of the at least one secondary metal salt; c) providing an aqueous oxidizing solution, the oxidizing solution being prepared to have Eh and pH values within a co-precipitation stability area of an aqueous solution system for the at least first and second metals at process temperature and process pressure when the aqueous oxidizing solution is mixed with the at least first and second metal containing solutions and the at least one secondary metal containing solution; d) feeding the at least first and second metal containing solutions or the combined at least first and second metal solution, the at least on secondary metal containing solution, and the aqueous oxidizing solution into at least one continuous flow reactor, the solutions being fed either separately into the continuous flow reactor where they mix to form a combined mixed processing solution or being premixed and fed as a combined mixed processing solution; e) heating the combined mixed processing solution to process temperature; f) monitoring and adjusting the combined mixed processing solution temperature, Eh value, pH value, molarity, and pressure within the continuous flow reactor so as to rapidly and adaptively move the combined mixed processing solution conditions into and maintain the combined processing solution conditions within the co-precipitation stability area; and g) maintaining the combined mixed processing solution conditions within the co-precipitation stability area as the combined mixed processing solution travels through the continuous flow reactor so as to produce a co-precipitated metal oxide incorporating foreign metal cations.

Embodiments of the invention may also comprise the steps of providing a substrate sized to be fed into the continuous flow reactor, feeding the substrate into the continuous flow reactor, the substrate being fed separately or mixed in one of the process solutions being fed into the continuous flow reactor, and precipitating the metal oxides onto the substrate.

Embodiments of the invention may also comprise the steps of providing a metal oxide substrate in particle form, the substrate being sized to be fed into the continuous flow reactor, feeding the substrate into the continuous flow reactor, the substrate being fed separately or mixed in one or process solutions being fed into the continuous flow reactor, and precipitating the metal oxides onto the substrate Embodiments of the invention may also comprise the step of heating the combined mixed processing solution within the continuous flow reactor to a temperature at or above 100° C.

Embodiments of the invention may also comprises the steps of heating the combined mixed processing solution within the continuous flow reactor to a temperature above 100° C. after being fed into the continuous flow reactor, wherein the manganese containing solution and the aqueous oxidizing solution are heated to a temperature of about 100° C. prior to being fed into the continuous flow reactor.

In yet another embodiment of the invention, a system for rapid and adaptive processing of metal oxides comprises: a) a continuous flow reactor equipped with an orifice, a back pressure valve, probes for measuring temperature, pressure, Eh and pH values of aqueous solutions within the continuous flow reactor, the continuous flow reactor being configured for introduction of a heated aqueous oxidizing solution and a metal containing solution, the metal containing solution and the aqueous oxidizing solution being processed together in the continuous flow reactor as a combined mixed processing solution; b) a metal containing solution vessel equipped with a feeder, the metal containing solution vessel containing the metal containing solution; c) a oxidant vessel equipped with a feeder, the oxidant vessel containing a supply of the aqueous oxidizing solution, the oxidizing solution prepared to have Eh and pH values within the stability area of an aqueous solution system, the stability area being selected from the group consisting of a metal oxide stability area, a metal ion stability area, and a polyatomic ion stability area for an aqueous solution system at process temperature and process pressure or to move solution conditions initially into the metal oxide stability area when the aqueous oxidizing solution is mixed with the metal containing solution; d) a plurality of heating units for providing heat to the continuous flow reactor, oxidant vessel, and the metal containing solution vessel; e) a base and/or acid feeder for feeding base or acid to the continuous flow reactor; f) a least one filtration and/or rinse unit; and g) a sorbent processing controller for simultaneously monitoring and adjusting system operational parameters and regulating system components, the controller being in electronic communication with the probes of the oxidant vessel, the metal containing solution vessel, the continuous flow reactor, the feeders, the at least one filtration and/or rinse unit, the back pressure valve and the heating units; the sorbent processing controller being capable of monitoring and adjusting system operational parameters selected from the group consisting of temperature, pressure, molarity, Eh, pH, and feeder rates, so as adjust and maintain conditions in the continuous flow reactor within the metal oxide stability area during processing.

In yet another embodiment of the invention, an integrated pollution control and sorbent processing system comprises a pollutant removal subsystem for removal of target pollutants from gases, the pollutant removal subsystem comprising: a) a feeder containing a supply of sorbent, the feeder being configured to handle and feed sorbent, the sorbent comprising a metal oxide; boat least one reaction chamber configured to receive sorbent and a gas containing at least one target pollutant, where the gas is introduced at temperatures ranging from ambient temperature to below the thermal decomposition temperature of a reaction product formed by a reaction between the target pollutant and the sorbent and contacted with the sorbent for a time sufficient to effect capture of the target pollutant at a targeted capture rate set point, the target pollutant being captured by reacting with the sorbent to form the reaction product to substantially strip the gas of the target pollutant, the reaction chamber being further configured to render the gas that has been substantially stripped of the target pollutant free of reacted and unreacted sorbent so that the gas may be vented from the reaction chamber; and wherein differential pressure within the system is regulated so that any differential pressure across the system is no greater than a predetermined level; c) a pollutant removal controller for simultaneously monitoring and adjusting system operational parameters, the controller providing integrated control of system differential pressure and other operational parameters selected from the group consisting of target pollutant capture rate gas inlet temperature, sorbent feed rate and any combination thereof, wherein differential pressure within the system is regulated so that any differential pressure across the system is no greater than a predetermined level and the target pollutant is removed at their targeted capture rate set points; and d) a sorbent processing subsystem for rapid and adaptive processing of metal oxides, the sorbent processing subsystem comprising: i) a continuous flow reactor equipped with an orifice, a back pressure valve, probes for measuring temperature, pressure, Eh and pH values of aqueous solutions within the continuous flow reactor, the continuous flow reactor being configured for introduction of a heated aqueous oxidizing solution and a heated metal containing solution, the metal containing solution and the aqueous oxidizing solution being processed together in the continuous flow reactor as a combined mixed processing solution; ii) a metal containing solution vessel equipped with a feeder, the metal containing solution vessel containing the metal containing solution; iii) a oxidant vessel equipped with a feeder, the oxidant vessel containing a supply of the aqueous oxidizing solution, the oxidizing solution being prepared to have Eh and pH values within a polyatomic ion stability area, metal ion stability area, metal oxide stability area, or a co-precipitation stability area, or to move solution conditions initially into a polyatomic ion stability area, metal ion stability area, metal oxide stability area, or a co-precipitation stability area when contacted with the manganese containing solution; iv) a plurality of heating units; v) a base and/or acid feeder for feeding base or acid to the continuous flow reactor; vi) at least one filtration and/or rinse unit; and vii) a sorbent processing controller for simultaneously monitoring and adjusting system operational parameters and regulating system components, the controller being in electronic communication with the probes of the oxidant vessel, the manganese vessel, the continuous flow reactor, the feeders, the at least one filtration and/or rinse unit, the back pressure valve and the heating units; the controller being capable of monitoring and adjusting system operational parameters selected from the group consisting of temperature, pressure, molarity, Eh, pH and feeder rates so as adjust and maintain conditions in the continuous flow reactor within a metal oxide stability area or a co-precipitation stability area during processing.

Embodiments of the systems of the invention may also include a jet cooker, the jet cooker being in electronic communication with the sorbent processing controller and the sorbent processing controller being capable of monitoring and adjusting the jet cooker steam injection rate, steam temperature and steam pressure so as to adjust and maintain conditions in the continuous flow reactor within the metal oxide stability area during processing.

Embodiments of the systems of the invention may also include an electrolytic cell for production of oxidant and other useful by-products, the electrolytic cell being configured to receive and process filtrate and rinse solutions from the at least one filtration/rinse unit, the solutions being generated from the separation of metal oxides processed in the combined mixed processing solution, wherein the sorbent processing controller is in electronic communication with and regulates and controls operation of the electrolytic cell.

In yet another embodiment of the invention, a method of rapid and adaptive processing of metal oxides, comprises the steps of: a) feeding a metal containing solution into an precipitation vessel containing a heated aqueous oxidizing solution, the solution being prepared so as to have Eh and pH values within a polyatomic ion stability area, metal ion stability area, or a metal oxide stability area for an aqueous solution heated to a temperature at or near boiling temperature at atmospheric or higher pressure; b) monitoring and adjusting solution temperature, Eh value and pH value so as to rapidly move solution conditions into and to maintain them within the metal oxide stability area; and c) maintaining the solution conditions within the metal oxide stability area so as to produce metal oxides selected from the group consisting of regenerated metal oxides, pretreated metal oxides, precipitated metal oxides, and regenerated and precipitated metal oxides.

In yet another embodiment of the invention, a method of rapid and adaptive processing of metal oxides, comprises the steps of a) feeding at least first and second metal containing solutions or a mixed metal containing solution of the at least first and second metals into a precipitation vessel containing a heated aqueous oxidizing solution, the solution being prepared so as to have Eh and pH values within a co-precipitation stability area of an aqueous solution for the at least first and second metals when heated to a temperature at or near boiling temperature at atmospheric or higher pressure and the combined solution being heated to a temperature at or near the boiling temperature; b) monitoring and adjusting combined solution temperature, Eh value and pH value so as to rapidly move solution conditions into and to maintain them within the co-precipitation stability area; and c) maintaining the combined solution conditions within the co-precipitation stability area so as to produce co-precipitated metal oxide.

In yet another embodiment of the invention, a method of rapid and adaptive processing of metal oxides incorporating foreign metal cations comprises the steps of: a) providing a primary metal containing solution, the primary metal containing solution being a solution of a first metal salt; b) providing at least one secondary metal containing solution, the secondary metal containing solution being a solution of at least one secondary metal salt with the foreign metal cations being the dissociated metal cation of the at least one secondary metal salt; c) feeding the primary metal containing solution and the at least one secondary metal containing solution into a precipitation vessel containing a heated aqueous oxidizing solution, the solution being prepared so as to have Eh and pH values within the stability area, the stability area being selected from the group consisting of a first metal oxide stability area, a first metal ion stability area, and a polyatomic ion stability area for a polyatomic ion of the first metal for an aqueous solution heated to a temperature at or near boiling temperature at atmospheric or higher pressure and the combined solution being heated to a temperature at or near the boiling temperature; d) monitoring and adjusting solution temperature, Eh value and pH value so as to rapidly move solution conditions into and to maintain them within the first metal oxide stability but outside of the stability area of the at least one secondary metal; and e) maintaining the combined solution conditions solely within the first metal oxide stability area so as to produce first metal oxides incorporating foreign metal cations.

In yet another embodiment of the invention a method for rapid and adaptive processing of metal oxides incorporating foreign metal cations comprises the steps of: a) providing a metal containing solution, the metal containing solution comprising at least one disassociated primary metal salt and at least one disassociated secondary metal salt, the primary metal being a first metal and the foreign metal cations being the disassociated metal cation of the at least one secondary metal salt; b) mixing the metal containing solution and a heated aqueous oxidizing solution in a precipitation vessel to form a solution mixture, the heated aqueous oxidizing solution being prepared so as to have Eh and pH values within the stability area of an aqueous solution system, the stability area being selected from the group consisting of a first metal oxide stability area, a first metal ion stability area, and a polyatomic ion stability area of the first metal for an aqueous solution heated to a temperature at or near boiling temperature at atmospheric pressure and being heated to a temperature at or near the boiling temperature; c) monitoring and adjusting the temperature, Eh value and pH value of the solution mixture so as to rapidly move mixture conditions into and to maintain them within the first metal oxide stability area but outside of the metal oxide stability area of the at least one secondary metal; and d) maintaining the solution conditions within the first metal oxide stability area so as to produce first metal oxides incorporating foreign metal cations.

In yet another embodiment of the invention a method rapid and adaptive processing of metal oxide sorbents comprises the steps of: a) providing at least first and second metal containing solutions or a mixed metal containing solution of the at least first and second metals; b) providing at least one secondary metal containing solution, the secondary metal containing solution being a solution of at least one secondary metal salt with the foreign metal cations being the disassociated metal cation of the at least one secondary metal salt; c) feeding the at least first and second metal containing solutions or the mixed metal containing solution and the at least one secondary metal containing solution into a precipitation vessel containing a heated aqueous oxidizing solution, the solution being prepared so as to have Eh and pH values within a co-precipitation stability area for at the at least first and second metals for an aqueous solution heated to a temperature at or near boiling temperature at atmospheric or higher pressure when the aqueous oxidizing solution is mixed with the at least first and second metal containing solutions and the at least one secondary metal containing solution; and d) monitoring and adjusting solution temperature, Eh value and pH value in the precipitation vessel so as to rapidly move solution conditions into and to maintain them within the co-precipitation stability area and maintaining the solution conditions within the co-precipitation stability area so as to produce a co-precipitated metal oxide incorporating foreign cations.

Embodiments of the invention may also include feeding a substrate into the precipitation vessel, the substrate being fed separately or mixed in one of the process solutions being fed into the precipitation vessel, and precipitating the metal oxides onto the substrate.

Embodiments of the invention may also include feeding a metal oxide substrate in particle form into the precipitation vessel, the substrate being fed separately or mixed in one of the process solutions being fed into the precipitation vessel and precipitating the metal oxides onto the substrate.

Embodiments of the invention may also include maintaining solution or solution mixture pH constant throughout the processing cycle.

Embodiments of the invention may also include separating the metal oxides from the processing solution to provide separated metal oxides and a oxidation filtrate, the oxidation filtrate being routed for further processing and handling; rinsing and filtering the separated metal oxides to provide a rinsed metal oxide filter cake or and a rinse filtrate, the rinse filtrate being directed further handling and processing; and directing the filter cake to a filter cake feed for introduction into a reaction chamber of a pollutant removal system.

Embodiments of the invention may also include separating the metal oxides from the processing solution to provide separated metal oxides and a oxidation filtrate, the oxidation filtrate being routed for further processing and handling; rinsing and filtering the separated metal oxides to provide a rinsed metal oxide filter cake or and a rinse filtrate, the rinse filtrate being directed further handling and processing; adding water to the rinsed metal oxides to form a metal oxide slurry; and directing the metal oxide slurry to a feeder selected from the group consisting of slurry feeders, spray feeders, spray injection feeders for introduction into a reaction chamber of a pollutant removal system.

Embodiments of the invention may also include separating the metal oxides from the processing solution to provide separated metal oxides and a oxidation filtrate, the oxidation filtrate being routed for further processing and handling; and rinsing and filtering the separated metal oxides to provide rinsed metal oxides and a rinse filtrate, the rinse filtrate being directed further handling and processing.

Embodiments of the invention may also include separating the metal oxides from the processing solution to provide separated metal oxides and a oxidation filtrate; rinsing and filtering the separated metal oxides to provide rinsed metal oxides and a rinse filtrate; and measuring and controlling the concentration of dissolved solids and fine particulates in the rinse filtrate.

Embodiments of the invention may also include separating the produced metal oxides from the aqueous oxidizing solution to provide separated metal oxides and a oxidation filtrate, the oxidation filtrate being routed for further processing and handling; rinsing and filtering the separated metal oxides to provide rinsed metal oxides and a rinse filtrate, the rinse filtrate being directed further handling and processing; and drying and/or comminuting the rinsed oxides of manganese.

Yet another embodiment of the invention comprises metal oxides that are produced by a method of processing of metal containing solutions, the method comprising the steps of: a) combining a metal containing solution with a heated aqueous oxidizing solution, the solution being prepared so as to have Eh and pH values within the stability area of an aqueous solution system, the stability area being selected from the group consisting of a metal oxide stability area, a co-precipitation stability area, a metal ion stability area, and a polyatomic ion stability area for an aqueous solution system at process temperature and process pressure when the aqueous oxidizing solution is mixed with the metal containing solution; b) monitoring and adjusting solution temperature, Eh value and pH value so as to rapidly move solution conditions into and to maintain them within the metal oxide stability area, co-precipitation stability area, metal ion stability area, or polyatomic ion stability area; and c) maintaining the solution conditions within the metal oxide stability area, co-precipitation stability area, metal ion stability area, or polyatomic ion stability area so as to produce metal oxides selected from the group consisting of regenerated metal oxides, pretreated metal oxides, precipitated metal oxides, and regenerated and precipitated metal oxides.

Yet another embodiment of the invention comprises co-precipitated metal oxides, wherein the method of processing further comprises the steps of: a) providing at least first and second metal containing solutions or a mixed metal containing solution of the at least first and second metals; b) combining the at least first and second metal containing solutions or the mixed metal containing solution and an aqueous oxidizing solution, the oxidizing solution being prepared to have Eh and pH values within a co-precipitation stability area of an aqueous solution system for the at least first and second metals at process temperature and process pressure when the aqueous oxidizing solution is mixed with the at least first and second metal containing solutions; c) heating the combined mixed processing solution to process temperature; d) monitoring and adjusting the combined mixed processing solution temperature, Eh value, pH value, molarity, and pressure so as to rapidly and adaptively move the combined mixed processing solution conditions into and/or maintain the combined processing solution conditions within the co-precipitation stability area; and e) maintaining the combined mixed processing solution conditions within the co-precipitation stability area so as to produce a co-precipitated metal oxide.

Yet another embodiment of the invention comprises metal oxides with incorporated foreign cations, wherein the method of processing further comprises the steps of: a) providing a primary metal containing solution, the primary metal containing solution being a solution of a first metal salt; b) providing at least one secondary metal containing solution, the secondary metal containing solution being a solution of at least one secondary metal salt with the foreign metal cations being the disassociated metal cation of the at least one secondary metal salt; c) combining the metal containing solutions and an aqueous oxidizing solution, the oxidizing solution being prepared to have Eh and pH values within the stability area of an aqueous solution system, the stability area being selected from the group consisting of a first metal oxide stability area, a first metal ion stability area, and a polyatomic ion stability area for a polyatomic ion of the first metal for an aqueous solution system at process temperature and process pressure when the aqueous oxidizing solution is mixed with the metal containing solutions; d) heating the combined mixed processing solution to process temperature; e) monitoring and adjusting the combined mixed processing solution temperature, Eh value, pH value, molarity, and pressure so as to rapidly and adaptively move the combined mixed processing solution conditions into and/or maintain the combined processing solution conditions within the first metal oxide stability area but outside of the metal oxide stability area of the at least one secondary metal; and f) maintaining the combined mixed processing solution conditions solely within the first metal oxide stability area so as to produce first metal oxides incorporating foreign metal cations.

Yet another embodiment of the invention comprises metal oxides with incorporated foreign cations, wherein the method of processing further comprises the steps of: a) providing a metal containing solution, the metal containing solution comprising at least one disassociated primary metal salt and at least one disassociated secondary metal salt, the primary metal being a first metal and the foreign metal cations being the disassociated metal cation of the at least one secondary metal salt; b) combining the metal containing solution with an aqueous oxidizing solution, the oxidizing solution being prepared to have Eh and pH values within the stability area of an aqueous solution system, the stability area being selected from the group consisting of a first metal oxide stability area, a first metal ion stability area, and a polyatomic ion stability area for a polyatomic ion of the first metal for an aqueous solution system at process temperature and process pressure when the aqueous oxidizing solution is mixed with the metal containing solution; c) heating the combined mixed processing solution to process temperature; d) monitoring and adjusting the combined mixed processing solution temperature, Eh value, pH value, molarity, and pressure so as to rapidly and adaptively move the combined mixed processing solution conditions into and/or maintain the combined processing solution conditions within the first metal oxide stability area but outside of the metal oxide stability area of the at least one secondary metal; and e) maintaining the combined mixed processing solution conditions solely within the first metal oxide stability area so as to produce first metal oxides incorporating foreign metal cations.

Yet another embodiment of the invention comprises co-precipitated metal oxides with incorporated foreign cations, wherein the method of processing further comprises the steps of: a) providing at least first and second metal containing solutions or a mixed metal containing solution of the at least first and second metals; b) providing at least one secondary metal containing solution, the secondary metal containing solution being a solution of at least one secondary metal salt with the foreign metal cations being the disassociated metal cation of the at least one secondary metal salt; c) combining the at least first and second metal containing solutions and the at least one secondary metal containing solution and an aqueous oxidizing solution, the oxidizing solution being prepared to have Eh and pH values within a co-precipitation stability area of an aqueous solution system for the at least first and second metals at process temperature and process pressure when the aqueous oxidizing solution is mixed with the at least first and second metal containing solutions and the at least one secondary metal containing solution; d) heating the combined mixed processing solution to process temperature; e) monitoring and adjusting the combined mixed processing solution temperature, Eh value, pH value, molarity, and pressure so as to rapidly and adaptively move the combined mixed processing solution conditions into and maintain the combined processing solution conditions within the co-precipitation stability area; and f) maintaining the combined mixed processing solution conditions within the co-precipitation stability area so as to produce a co-precipitated metal oxide incorporating foreign metal cations.

In yet another embodiment of the invention a system for producing metal oxides having high loading capacities and/or high average valence states comprises an oxidation vessel equipped with probes for measuring temperature, Eh and pH values of aqueous solutions within the oxidation vessel, the oxidation vessel being configured for introduction of metal containing solution; a oxidant feeder containing a supply of aqueous oxidizing solution, the aqueous oxidizing solution being prepared so as to have Eh and pH values within a metal oxide stability area, a co-precipitation stability area, a metal ion stability area, or a polyatomic ion stability area for an aqueous solution heated to a temperature at or near boiling temperature at atmospheric or higher pressure; a heater for providing heat to the oxidation vessel; a base and/or acid feeder for feeding base or acid to the oxidation vessel; a least one filtration and/or rinse unit, which optionally may be incorporated into and a part of the oxidation vessel; and a controller for simultaneously monitoring and adjusting system operational parameters and regulating system components, the controller being in electronic communication with the probes of the oxidation vessel, the feeders, the at least one filtration and/or rinse unit and the heaters; the controller being capable of monitoring and adjusting system operational parameters selected from the group consisting of temperature, Eh, pH and feeder rates so as maintain conditions in the oxidation vessel within the metal oxide stability area or co-precipitation stability area through processing cycles.

In yet another embodiment of the invention a system for the removal of metals from an aqueous solution comprises a contactor adapted for contacting an aqueous solution containing at least one target pollutant with a sorbent, wherein the sorbent removes at least a portion of said target pollutant from said aqueous stream, said sorbent material comprising metal oxides formed by the process of; a) mixing a metal containing solution and an aqueous oxidizing solution in a sorbent production reactor to form a solution mixture, the heated aqueous oxidizing solution being prepared so as to have Eh and pH values within a polyatomic ion stability area, metal ion stability area, a metal oxide stability area, or a co-precipitation stability area of an aqueous solution at process temperature and process pressure when the aqueous oxidizing solution is mixed with the metal containing solution; b) monitoring and adjusting the temperature, Eh value and pH value of the solution mixture so as to rapidly move mixture conditions into and to maintain them within the metal oxide stability area or co-precipitation stability area; and c) maintaining the solution conditions within the metal oxide stability area or co-precipitation stability area so as to produce metal oxides having high loading capacities and/or high average oxidation states.

In yet another embodiment of the invention a system for the removal of pollutants from an aqueous solution comprises a contactor adapted for contacting an aqueous solution containing at least one target pollutant with a sorbent, wherein the sorbent removes at least a portion of the target pollutant from the aqueous stream, said sorbent comprising a metal oxide formed by the process of; a) providing a metal containing solution; b) providing a aqueous oxidizing solution, the oxidizing solution being prepared to have Eh and pH values within a polyatomic ion stability area, metal ion stability area, a metal oxide stability area, or a co-precipitation stability area or to move solution conditions initially into the polyatomic ion stability area, metal ion stability area, metal oxide stability area, or co-precipitation stability area when contacted with the metal containing solution; c) feeding the metal containing solution and the aqueous oxidizing solution into at least one continuous flow reactor, the solutions being fed either separately into the continuous flow reactor where they mix to form a combined mixed processing solution or being premixed and fed as a combined mixed processing solution; d) heating the combined mixed processing solution to process temperature; e) monitoring and adjusting combined mixed processing solution temperature, Eh value, pH value, molarity, and pressure within the continuous flow reactor so as to rapidly and adaptively move combined mixed processing solution conditions into and maintain processing solution conditions within the metal oxide stability area or co-precipitation stability area; and f) maintaining combined mixed processing solution conditions within the metal oxide stability area or co-precipitation stability area as the combined mixed processing solution travels through the continuous flow reactor so as to produce metal oxides with high loading capacities and/or high average oxidation states.

Embodiments of the invention may also include a contactor that includes a diffuser for creating a fluidized bed of sorbent and a clear water overflow for allowing removal of the aqueous stream once at least a portion of a target pollutant has been removed.

Embodiments of the invention may also include a contactor that includes a diffuser for creating a fluidized bed of sorbent, a clear water overflow for allowing removal of the aqueous stream once at least a portion of a target pollutant has been removed, and a reacted sorbent outlet in the fluidized bed portion of the contactor.

Embodiments of the invention may also include a contactor that includes a diffuser for creating a fluidized bed of sorbent, a clear water overflow for allowing removal of the aqueous stream with at least a portion of a target pollutant removed, and a recycle stream for controlling velocity through the diffuser.

Embodiments of the invention may also include a contactor that includes sorbent that has been precipitated on an active or inactive substrate, sorbent comprising co-precipitated metal oxides, and sorbent including one or more integrated foreign cations.

In yet another embodiment the invention comprises a solid contactor element comprising metal oxide sorbent formed by the process of; a) providing a metal containing solution; b) providing a aqueous oxidizing solution, the oxidizing solution being prepared to have Eh and pH values within a polyatomic ion stability area, metal ion stability area, or a metal oxide stability area or to move solution conditions initially into the polyatomic ion stability area, metal ion stability area, or a metal oxide stability area when contacted with the metal containing solution; c) feeding the metal containing solution and the aqueous oxidizing solution into at least one continuous flow reactor, the solutions being fed either separately into the continuous flow reactor where they mix to form a combined mixed processing solution or being premixed and fed as a combined mixed processing solution; d) heating the combined mixed processing solution to process temperature; e) monitoring and adjusting combined mixed processing solution temperature, Eh value, pH value, molarity, and pressure within the continuous flow reactor so as to rapidly and adaptively move combined mixed processing solution conditions into and maintain processing solution conditions within the metal oxide stability area; f) maintaining combined mixed processing solution conditions within the metal oxide stability area as the combined mixed processing solution travels through the continuous flow reactor so as to produce metal oxides with a loading capacity and/or valence state at least as great as virgin metal oxides of the same species; g) filtering the metal oxides from the solution; h) compacting the metal oxides with a mechanical compactor into a solid contactor element of a desired configuration.

Yet another embodiment of the invention comprises a solid contactor element comprising manganese dioxide sorbent formed by the process of; a) mixing a heated metal containing solution and a heated aqueous oxidizing solution in a precipitation vessel to form a solution mixture, the heated aqueous oxidizing solution being prepared so as to have Eh and pH values within a polyatomic ion stability area, metal ion stability area, a metal oxide stability area, or a co-precipitation stability area of an aqueous solution heated to a temperature at or near boiling temperature at atmospheric pressure and being heated to a temperature at or near the boiling temperature; b) monitoring and adjusting the temperature, Eh value and pH value of the solution mixture so as to rapidly move mixture conditions into and to maintain them within the metal oxide stability area or co-precipitation stability area; c) maintaining the solution conditions within the metal oxide stability area or co-precipitation stability area so as to produce metal oxides having high loading capacities and/or high average oxidation states; d) filtering the metal oxides from the solution; and e) compacting the metal oxides with a mechanical compactor into a solid contactor element of a desired configuration.

Embodiments of the invention may also include a solid contactor element that includes sorbent that has been precipitated on an active or inactive substrate, sorbent comprising co-precipitated metal oxides, and sorbent including one or more integrated foreign cations.

Yet another embodiment of the invention comprises a system for personal protection comprising a respirator adapted for contacting breathing air containing a target pollutant with a sorbent, wherein the sorbent removes at least a portion of said target pollutant from breathing air, said sorbent material comprising metal oxides formed by the process of; a) mixing a heated metal containing solution and a heated aqueous oxidizing solution in a precipitation vessel to form a solution mixture, the heated aqueous oxidizing solution being prepared so as to have Eh and pH values within a polyatomic ion stability area, metal ion stability area, a metal oxide stability area, or a co-precipitation stability area of an aqueous solution heated to a temperature at or near boiling temperature at atmospheric pressure and being heated to a temperature at or near the boiling temperature; b) monitoring and adjusting the temperature, Eh value and pH value of the solution mixture so as to rapidly move mixture conditions into and to maintain them within the metal oxide stability area or co-precipitation stability area; and c) maintaining the solution conditions within the metal oxide stability area or co-precipitation stability area so as to produce metal oxides having high loading capacities and/or high average oxidation states.

Yet another embodiment of the invention comprises a system for personal protection comprising a respirator adapted for contacting breathing air containing a target pollutant with a sorbent, wherein the sorbent removes at least a portion of said target pollutant from breathing air, said sorbent comprising a metal oxide formed by the process of; a) providing a metal containing solution; b) providing a aqueous oxidizing solution, the oxidizing solution being prepared to have Eh and pH values within a polyatomic ion stability area, metal ion stability area, a metal oxide stability area, or a co-precipitation stability area or to move solution conditions initially into the polyatomic ion stability area, metal ion stability area, metal oxide stability area, or co-precipitation stability area when contacted with the metal containing solution; c) feeding the metal containing solution and the aqueous oxidizing solution into at least one continuous flow reactor, the solutions being fed either separately into the continuous flow reactor where they mix to form a combined mixed processing solution or being premixed and fed as a combined mixed processing solution; d) heating the combined mixed processing solution to process temperature; e) monitoring and adjusting combined mixed processing solution temperature, Eh value, pH value, molarity, and pressure within the continuous flow reactor so as to rapidly and adaptively move combined mixed processing solution conditions into and maintain processing solution conditions within the metal oxide stability area or co-precipitation stability area; and f) maintaining combined mixed processing solution conditions within the metal oxide stability area or co-precipitation stability area as the combined mixed processing solution travels through the continuous flow reactor so as to produce metal oxides with high loading capacities and/or high average oxidation states.

DETAILED DESCRIPTION OF PREFERRED EMBODIMENTS

The following definition will be useful in understanding the various embodiments of the invention disclosed herein.

"Metal oxide stability area" or "stability area," as used herein, refers to the region of thermodynamic stability for metal oxides at their valence states delineated by Eh and pH values for aqueous solutions (also referred to as a "metal-water system") at specified temperatures, pressures and molarities or, phrased alternatively, the domain of metal oxide stability for an aqueous solution. More specifically, it refers to the region or domain delineated by Eh and pH values for aqueous solutions at specified temperatures, pressures and molarities in an electrochemical stability diagram, such as presented by Pourbaix diagrams and their equivalents, such as the Latimer Diagram or the Frost Diagram.

"Metal nitrates," as used herein, refers to and includes the various forms of metal nitrate compounds, regardless of chemical formula, that may be formed through the chemical reaction between $NO_X$ and a metal oxide sorbent and includes hydrated forms as well.

"Metal sulfates," as used herein, refers to and includes the various forms of metal sulfate compounds, regardless of chemical formula that may be formed through the chemical reaction between $SO_X$ and a metal oxide sorbent and includes hydrated forms as well.

"$MnO_2$ stability area," as used herein, refers to the metal oxide stability area for $MnO_2$.

"Other metal oxide stability area," as used herein, refers to the metal oxide stability area of a second metal that may be co-precipitated with a first metal.

"Co-precipitation stability area," as used herein, refers to a metal oxide stability area corresponding to the area of overlap or intersection between a metal oxide stability area of a first metal and a metal oxide stability area of one or more other metal oxides that are to be co-precipitated.

"Polyatomic ion stability area," as used herein, refers to the stability area of a metal containing polyatomic ion.

"Permanganate stability area," as used herein, refers to the stability area for the permanganate anion, represented by the formula $yMnOx*zH_2O$ where y is foreign cation.

"Metal ion stability area," as used herein, refers to the stability area of a metal cation.

"Manganese ion stability area," as used herein, refers to the stability area for the manganese cation.

"Foreign cations" or "foreign metal cations," as used herein refers to cations of secondary metals, or of non-metal cations.

"Regenerated metal oxides," as used herein, refers to loaded or reacted metal oxides that have been processed according to the methods of the invention in which a heated aqueous oxidizing solution is mixed with a heated slurry of loaded metal oxides (with or without a preoxidation rinse) to form a mixture or a heated aqueous oxidizing solution to which loaded metal oxides are added (with or without a preoxidation rinse) to from a slurry mixture, the mixtures being adjusted and maintained so as to be within the metal oxide stability area.

"Pretreated metal oxides," as used herein, refers to virgin or unreacted metal oxides that have been processed according to the methods of the invention in which a heated aqueous oxidizing solution is mixed with a heated slurry of virgin metal oxides to form a mixture or a heated aqueous oxidizing solution to which virgin metal oxides are added to from a slurry mixture, the mixtures being adjusted and maintained so as to be within the desired metal oxide stability area.

"Precipitated metal oxides," as used herein, refers to metal oxides formed or newly formed by precipitation from a mixture of a heated metal salt solution and a heated aqueous oxidizing solution or a mixture formed by addition of a metal salt to a heated aqueous oxidizing solution, the mixtures being adjusted and maintained so as to be within the desired metal oxide stability area.

"Metal containing solution," as used herein, refers to a metal containing solution selected from the group consisting of a slurry of virgin metal oxides, a regeneration slurry containing rinsed reacted metal oxides, a slurry of loaded metal oxides, and a metal salt solution containing disassociated metal cations. Metal containing solutions may contain one or more metal oxides and/or one or more disassociated metal salts.

"Manganese containing solution," as used herein, refers to a metal containing solution where the metal is manganese.

"Aqueous oxidizing solutions" as used herein refers to an aqueous solution containing an oxidant or oxidizer. The aqueous oxidizing solution may contain a premixed solution containing both oxidant and base.

"Primary metal," as used herein, refers to a metal being processed to form a metal oxide, a primary metal oxide, incorporating one or more foreign cations.

"Secondary metal," as used herein, refers to a metal processed with a primary metal but outside of the metal oxide stability area for the secondary metal so as to provide foreign metal cations.

"Combined mixed process solution" as used herein, refers to a mixture of a metal containing solution and an aqueous oxidizing solution which may further contain foreign cations.

"Target pollutant," as used herein, refers to the pollutant or pollutants that are to be captured and removed from a gas or aqueous stream. Examples of gas borne target pollutants that may be removed with a metal oxide sorbent include, but are not limited to, oxides of nitrogen ($NO_X$), oxides of sulfur ($SO_X$), mercury (elemental, oxidized and particulate forms), mercury compounds, $H_2S$, totally reduced sulfides (TRS), mercaptans, chlorides, such as hydrochloric acid (HCl), carbon monoxide (CO), volatile organic compounds (VOC), and other heavy metals present in utility and other industrial process and waste gas streams. Examples of aqueous borne pollutants that may be removed with a metal oxide sorbent include, but are not limited to, arsenic ($As^{+3}$ and $As^{+5}$), lead mercury, and chromium.

"Reacted" or "loaded," as used interchangeably herein, refers in conjunction with "oxides of manganese," "metal oxides," and/or "sorbent" to oxides of manganese, other metal oxides, or sorbent that has interacted with one or more target pollutants in a gaseous or aqueous stream whether by chemical reaction, adsorption or absorption. The term does not mean that all reactive or active sites of the sorbent have been utilized, as all such sites may not actually be utilized.

"Unreacted" or "virgin," as used interchangeably herein, refers in conjunction with "oxides of manganese," "metal oxides," and/or "sorbent" to oxides of manganese, metal oxides, or sorbents that have not interacted with target pollutants in a gaseous or aqueous stream.

"Nitrates of manganese," as used herein, refers to and includes the various forms of manganese nitrate, regardless of chemical formula, that may be formed through the chemical reaction between $NO_X$ and the sorbent and includes hydrated forms as well.

"Sulfates of manganese," as used herein, refers to and includes the various forms of manganese sulfate, regardless of chemical formula that may be formed through the chemical reaction between $SO_X$ and the sorbent and includes hydrated forms as well.

"Reaction product," as used herein, refers to and include the products formed during the interaction of a sorbent, e.g., oxides of manganese, other metal oxides, or combinations thereof, and a target pollutant whether by chemical, catalytic, or other reaction mechanism.

Applicants have developed methods of producing newly precipitated metal oxides, of treating commercially available virgin metal oxides, and of regenerating loaded metal oxides, or reacted metal oxides through processing in a continuous flow reactor or a batch oxidation vessel that results in the production of metal oxides useful, amongst other applications, as sorbents for pollutant removal. Metal oxides so produced may exhibit high or increased loading capacity and/or valence states as compared to reacted and virgin metal oxides of various forms, including a variety of commercially available metal oxides. Applicants have additionally developed a system and process for cyclically loading with target pollutants and regenerating metal oxide sorbents, such as manganese oxide or metal oxide compounds, utilizing batch processing or a continuous flow reactor that results in the production of useful byproducts.

Applicants have further found that metal oxides can be precipitated with controlled introduction of one or more foreign cations, e.g., $K^+$, $Na^+$, into their crystalline structure to desirably impact one or more of the physical or reactive properties or characteristics of the metal oxides and sorbents produced according to various embodiments of the methods of the invention. Controlled co-precipitation of two or more species of metal oxides (e.g., iron oxide and manganese oxide) as a metal oxide compound can also be achieved, with or without incorporated foreign cations. Further still, Applicants have found that the precipitation methods of various embodiments of the invention can be utilized to coat a variety of different substrates of varying sizes, shapes and dimensions. Such substrates may be either reactive or inert and may include, by non-limiting example, substrates such as metal oxide particles, activated carbon particles, metal filtration media, polymeric or other non-metallic filtration media to name a few. The metal oxides of these precipitated coating may also incorporate foreign cations or may be co-precipitated metal oxides. Precipitation onto substrates provides sorbents or articles useful for numerous applications, including pollutant removal applications.

In various embodiments, the methods of the invention as disclosed herein may be utilized to process a variety of metal oxides. Metal oxide that may be processed in the methods and systems of the invention include, but are not limited to, those of metals known representative and transition metals, such as iron, titanium, barium, lithium, magnesium, sodium, potassium and aluminum, to name a few. Further, rare earth metals, alkali metals, noble metals and semi-conductive metals may also be processed in the methods and systems of the invention. The aforementioned metals may be utilized to form metal oxides, co-precipitated metal oxides or to provide foreign metal cations to be incorporated into metal oxides. Metals of general interest are those with cations from which metal oxides can be precipitated to form metal oxides or that provide foreign metal cations that enhance the removal ability of a first or primary metal oxide or that themselves form stable metal oxides alone or in a metal oxide compound. For some applications, it is particularly beneficial if the meta oxide is one that will form either soluble or thermally decomposable metal salts when reacted with target pollutants in a gas stream. Metal oxides that can yield reactions products with these desired properties include, but are not limited to, both representative metals and transition metals. Of, the transition metals those from the fourth period of the periodic table are particularly well suited. Generally, suitable metal oxides include, but are not limited to, oxides of any one of the following metals: magnesium, calcium, scandium, chromium, manganese, iron, nickel, copper, zinc, aluminum, yttrium, rhodium, palladium, silver, cadmium and combinations thereof. These and other metals may form high valence metal oxides themselves or be integrated into the lattice structure of a primary metal oxide through controlled addition during embodiments of methods of the invention. If the metal cations are not oxidized to a high valence state in the process, they may still be useful as foreign metals in a hydroxide or lower valence metal oxide form. Other metals that may be useful in some form as a foreign metal include but are not limited to cobalt, platinum, molybdenum, vanadium, and nickel.

Embodiments of Applicants' invention may be employed to convert metal containing solutions to high purity metal oxides with high valence values, strong affinity for target pollutants, and other desirable characteristics by controlling the reactions with attention to a metal oxide stability area. The metal oxide stability area refers to the region or domain delineated by Eh and pH values for aqueous solutions at specified temperatures, pressures and molarities in an electrochemical stability diagram, such as presented by Pourbaix diagrams and their equivalents, such as the Latimer Diagram or the Frost Diagram. By understanding the metal oxide stability area and maintaining solution conditions so that the solution conditions spend little to no time in regions of the Pourbaix diagram where undesirable side products are stable or can be formed, Applicants can predictably create or engineer metal oxides with superior characteristics, such as target pollutant capture capability or loading capacity, as described throughout this specification.

Metal oxides produced by the methods and systems of the invention are useful for various applications including removing pollutants from gaseous streams. Applicants have developed systems and methods to exploit this attribute for, among other applications, pollutant removal from industrial gas streams. For example, Applicants have developed the Pahlman Process™ Technology that removes $NO_x$ and $SO_2$, among other pollutants, from flue gases of industrial furnaces, boilers for electrical generators, and other similar air emission sources. Applicants have also applied the ability of these metal oxides to remove pollutants from gaseous streams to create superior sorbents for filtration media used in personal respirators.

Metal oxides produced by the various embodiments of the invention are also useful in aqueous pollutant removal. The metal oxides can effectively remove difficult to capture pollutants and possess high loading capacity. Pollutants such as arsenic, present in water as arsenite ($As^{+3}$) and arsenate ($As^{+5}$) among other forms, hardness such as calcium compounds and magnesium compounds, and other metallic and non-metallic aqueous borne pollutants can be removed by embodiments of the invention with high capture rates and long sorbent or filter media life.

Methods of Applicants' invention may be carried out in batch reactor systems or a continuous flow reactor system. Without being bound by theory, Applicants believe that the processing of loaded and virgin metal oxides and the precipitation of newly formed metal oxides according to the invention in a heated aqueous solution system within a continuous flow reactor system, as well as a batch reactor system, maintained within the desired metal oxide stability area may beneficially affect a number of characteristics of the metal oxides. Such characteristics include, but are not limited to, one or more of particle size and shape, crystalline structure or morphology, pore volume, porosity, composition, surface area (BET), bulk density, electrochemical or oxidation potential, single and/or multiple foreign cations concentration, pollutant loading or removal capacity, and valence states.

Batch reactor system embodiments of the invention involve mixing heated oxidizing solutions having the desired pH-Eh-temperature combination at atmospheric pressure, with a source of metal ions to produce the desired metal oxides. This mixing may take place in a continuously stirred reactor vessel or some other batch reactor and the pH, Eh, and solution temperature, may be monitored and adjusted to ensure that solution conditions remain favorable for the production of the desired metal oxides and solution conditions are rarely if ever favorable for the production of undesirable side products. Embodiments of Applicants' invention may be carried out using continuous flow reactors, which allows for processing at elevated temperatures and at pressures above atmospheric. In either batch or continuous flow reactor systems, molarity may also be monitored and adjusted in methods.

Methods of the invention in various embodiments entail mixing or contacting a metal containing solution with an aqueous oxidizing solution, the aqueous oxidizing solution initially being prepared to have Eh and pH values within a polyatomic ion, metal ion, co-precipitation, or a metal oxide stability area or to move solution conditions initially into the polyatomic ion, metal ion, co-precipitation or a metal oxide stability area when contacted with the metal containing solution at process temperatures and pressures. Once reaction begins, the solution parameters are monitored, and adjusted to move and/or to maintain conditions within the metal oxide stability area or co-precipitation stability area. The metal containing solution may be the filtrate from rinsing of metal salt reaction products from reacted sorbent or may be prepared by dissolving metal salts in aqueous solutions. Solution containing metal cations may also be prepared by leaching of metal values from metal containing materials, e.g., commercially available metal oxides, crushed metal ore, or in situ ore bodies with leach mining. Some metal oxides occur naturally in an insoluble oxide form which must first be reduced through the use of a reducing agent, and reacted with an anion to form a soluble metal salt or to provide disassociated metal cations in solution.

The aqueous oxidizing solution must be able to provide the required electrochemical (oxidizing) potential (Eh) at the specified temperature, pressure and molarity and within the specified pH ranges to provide an Eh-pH combination to achieve stable aqueous solution system equilibrium within the selected stability area, e.g., with manganese as the metal, permanganate, manganese ion, co-precipitation or $MnO_2$ stability area. Suitable oxidizers to name a few include, but are not limited to, persulfates, such as potassium peroxidisulfate ($K_2S_2O_8$), sodium peroxidisulfate ($Na_2S_2O_8$), and ammonium peroxidisulfate (($NH_4)_2S_2O_8$), chlorates, such as sodium chlorate ($NaClO_3$), perchlorates such as sodium perchlorate (NaClO4), permanganates, such as potassium permanganate ($KMnO_4$), oxygen ($O_2$) or air, ozone ($O_3$), peroxides, such as $H_2O_2$, organic oxidizers, such as peroxyacetic acid ($C_2H_4O_3$), and hypochlorites, such as sodium hypochlorite (NaOCl). Other oxidizers suitable for use in the methods of the invention will be apparent to those skilled in the art; it being understood that the electrochemical potential (Eh) of the preheated aqueous oxidizing solution, and therefore the effectiveness of the methods of the invention, depends, in part, upon the strength of the oxidizer and/or the concentration of the oxidizer in the solution. The oxidant may also be purchased commercially or produced in and fed from an electrolytic cell.

The pH of the solutions of the various embodiments of the invention is monitored and is adjusted through the controlled addition of acids and bases. Examples of useful bases include but are not limited to alkali or ammonium hydroxides, potassium hydroxides, and sodium hydroxides. Examples of useful acids include but are not limited to sulfuric, nitric, hydrochloric and perchloric acid to name a few. Applicants have found it useful to match the cations of the oxidant and base. For example, where the oxidant is a persulfate, such as potassium peroxidisulfate ($K_2S_2O_8$), the pH could be adjusted with a compatible or suitable base, such as potassium hydroxide (KOH). If sodium peroxidisulfate is used ($Na_2S_2O_8$), a compatible base would be sodium hydroxide (NaOH); and with ammonium peroxidisulfate (($NH_4)_2S_2O_8$), ammonium hydroxide (($NH_4OH$) would be a compatible base. The acids or bases and other process additives are generally commercially available and those skilled in the art would be able to readily identify compatible process additives useful within the scope of the invention.

In the methods and systems disclosed herein, the conditions or parameters of aqueous systems are maintained within a metal oxide stability area or co-precipitation stability area, and sometimes starting initially within a metal ion or polyatomic ion stability area. This is done with regard to electrochemical (oxidizing) potential (Eh) range and pH range at the prescribed system temperature at ambient or elevated atmospheric conditions (pressure) in order to provide an Eh-pH combination to achieve stable solution equilibrium, as defined by the, metal oxide stability area or co-precipitation stability area as delineated in, for example a Pourbaix Window diagram.

Applicants have found that metal oxides can also be processed using the methods of the invention by first preparing an aqueous oxidizing solution with Eh and pH values that are either in the polyatomic ion, metal ion, or co-precipitation stability area or that moves the solution initially into the polyatomic ion, metal ion, or co-precipitation stability area when contacted with a metal containing solution under process temperatures and pressures.

Figure 12:
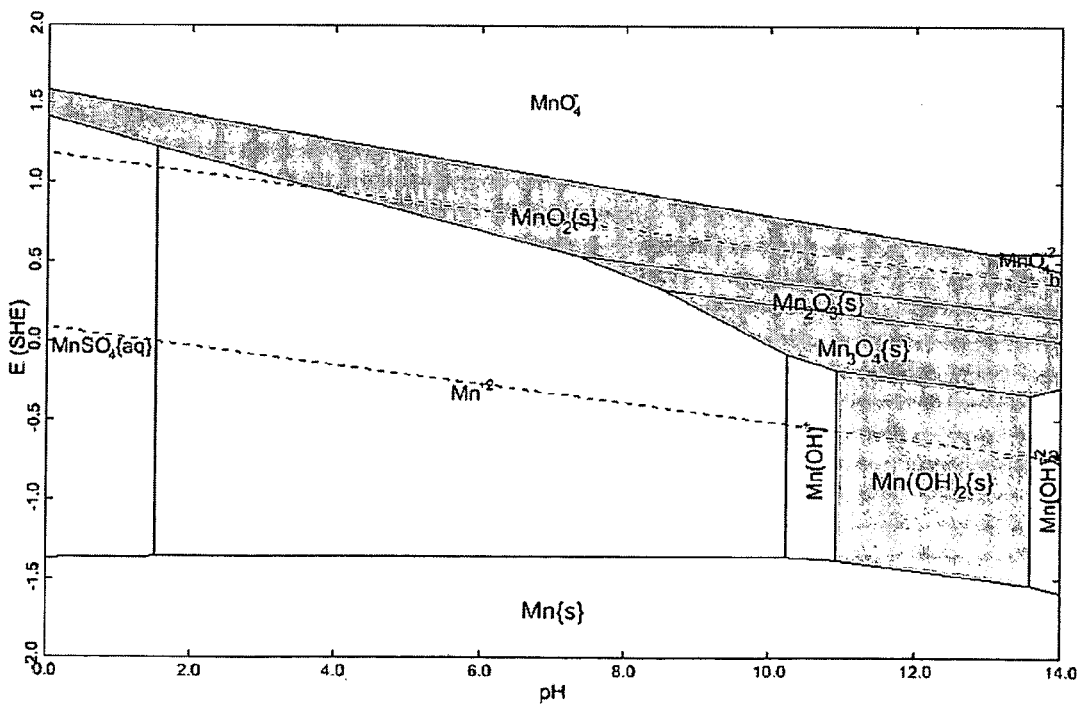
FIG. 12 is a Pourbaix diagram for a manganese-water system of 10-6 mole/liter manganese ion concentration.

With reference to FIG. 12, this can be more easily understood by using manganese as a specific example. A characteristic of most oxides of manganese species is non-stoichiometry; that is, most oxides of manganese molecules or $MnO_2$ species typically contain on average less than the theoretical number of 2 oxygen atoms, with numbers more typically ranging between 1.5 to 2.0. The non-stoichiometry characteristic is thought to result from solid-solution mixtures of two or more oxide species, and exists in all but the beta ($\beta$), or pyrolusite, form of manganese dioxide. Oxides of manganese having the formula $MnO_X$ where X is about 1.5 to about 2.0 are particularly suitable for dry removal of target pollutants from gas streams. However, the most active types of oxides of manganese for use as a sorbent for target pollutant removal usually have the formula $MnO_{1.7\ to\ 1.95}$, which translates into manganese valence states of $\pm 3.4$ to $\pm 3.9$, as opposed to the theoretical +4.0 state. It is unusual for average valence states above about 3.9 to exist in most forms of oxides of manganese. Oxides of manganese may also include bound waters of hydration or waters of crystallization that create various hydrated forms of oxides of manganese molecules. Oxides of manganese processed by the invention may include co-precipitated other metal oxides or foreign cations, represented by the formula $yMnO_x 2H_2 0$ where y is a foreign cation. The formula $MnO_2$, as used herein, symbolically represents all varieties of manganese dioxide including those with valence states ranging from +3 to +4, or $MnO_{1.5-2.0}$, coprecipitated oxides of manganese, oxides of manganese with foreign cations, and oxides of manganese including bound water. All chemical formulas used throughout are to be interpreted with a similar breadth of definition of species, and where chemical formulas are used as they are to be considered as encompassing the various forms of the compounds described and not to be limited to the single species with the exact stoichiometric composition of the chemical formula.

Referring now to FIG. 12, if the solution conditions are initially in the polyatomic ion stability area for permanganate ($MnO_4^-$), after mixing of the two solutions, the pH of combined mixed process solution may, for example, be allowed to drop from alkaline down into the acidic range, moving the solution into the $MnO_2$ stability area from the permanganate stability area. If the solution conditions are initially in the manganese ion (metal ion) stability area, after mixing of the two solutions, the pH of the combined mixed process solution may be allowed to rise from the acidic into the alkaline range and, as long as Eh of the solution is maintained at a high enough value to prevent formation of lower valence metal oxides, the solution will move into the $MnO_2$ stability area from the manganese ion stability area. These techniques can be employed in the various embodiments of the invention to produce processed metal oxides of desired oxidation state and to avoid formation of lower metal oxides, such as $Mn_2O_3$ and $Mn_3O_4$. This increases the "yield purity" making the metal oxides useful, amongst other applications, as a sorbent for removing target pollutants from gas or aqueous streams. Further, this technique serves to minimize the oxidant utilization thus providing cost savings.

In this example, the polyatomic ion or permanganate stability area of the Pourbaix diagram of FIG. 12 is above that of the $MnO_2$ stability area and has a higher Eh level for a given pH level. The manganese ion stability area is below that of the $MnO_2$ stability area and has a lower Eh level. If solution conditions begin in the permanganate stability area, the process solution will develop the purple permanganate color and when, during the process, the pH drops moving the solution to enter into the $MnO_2$ stability window, will start precipitating $MnO_2$ sorbent. Whether solution conditions begin in the polyatomic ion stability area or the metal ion stability area, keeping solution conditions out of regions of the Pourbaix diagram associated with undesirable side products is highly beneficial in precipitation methods as this avoids formation of lower valence state metal oxides that have to be oxidized up to the desired oxidation state metal oxides which would result in depletion and consumption of oxidant; and therefore, less oxidant can be used. Therefore, Applicants have found that the batch oxidation and continuous flow reactor needs to be equipped with the appropriate systems and controls for rapid and adaptive controlling of the stream process conditions. This process can be used to pretreat virgin sorbent and to regenerate reacted sorbent and yields processed oxides of manganese with increased loading capacity and/or oxidation strength.

Figure 13:
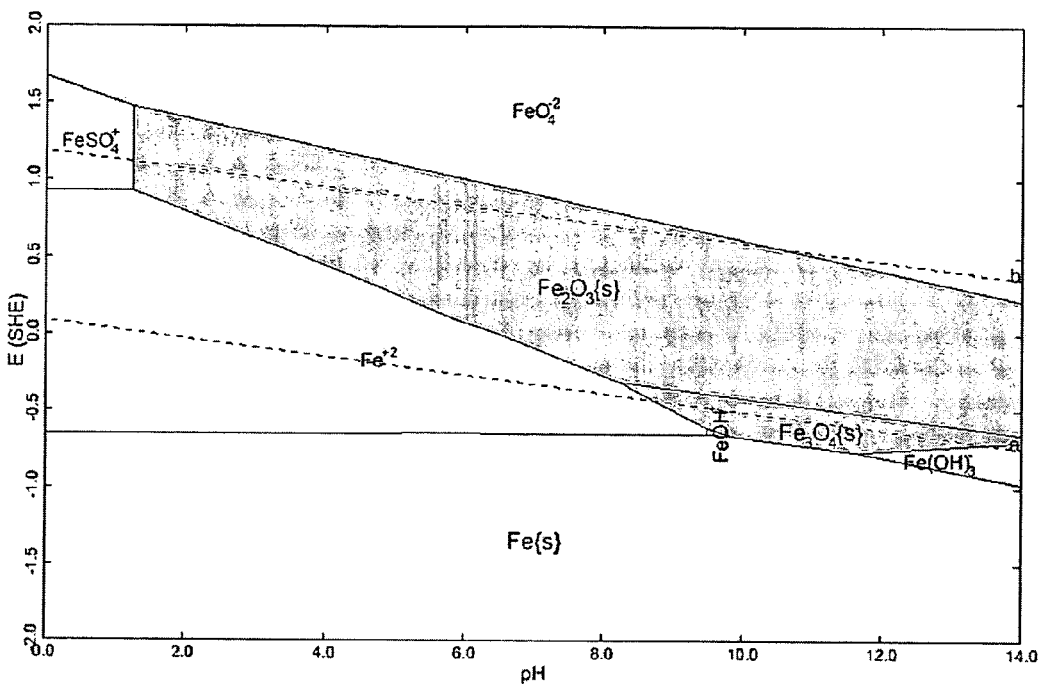
FIG. 13 is a Pourbaix diagram for an iron-water system.

This same technique can be utilized with other metal oxides, e.g., iron oxide. Referring to FIG. 13, the polyatomic ion stability area for $FeO_4^{-2}$ and the metal ion stability area for $Fe^{+2}$ are shown bordering the $Fe_2O_3$ area. The preceding discussion relative utilizing this technique where manganese is the metal is equally applicable to iron and other metals.

Although the following discussion focuses on principles applicable to the $MnO_2$ stability area, these principles will be understood by those skilled in the art to also be generally applicable to other metal oxide stability areas. The $MnO_2$ stability area for an aqueous system varies based upon the conditions of the system and may shift or drift as reactions in the aqueous system proceed. For example, changes in dissolved manganese ion concentration, oxidizer concentration, pH, Eh, solution temperature and pressure, and various dissolved ions may affect the boundaries of the domain or region of stability for $MnO_2$. The aqueous oxidizing solution within the reactor system of the invention are typically at temperatures near, at, or greater than boiling or 100° C. at atmospheric pressures and at pressures at or greater than atmospheric. The effects of such changes or different conditions upon the boundaries of the $MnO_2$ stability area on a Pourbaix Eh-pH diagram can be determined either by empirical data derived from experimentation or generated from theoretical calculations which can be carried out manually or with computer software programs known to those skilled in the art, such as HSC Chemistry distributed by Outokumpu Oy of Finland or OLI Systems, Inc. of New Jersey, USA. Software may also be written to determine the $MnO_2$ stability area as defined by other diagrams, such as the Latimer Diagram or the Frost Diagram.

Figure 11:
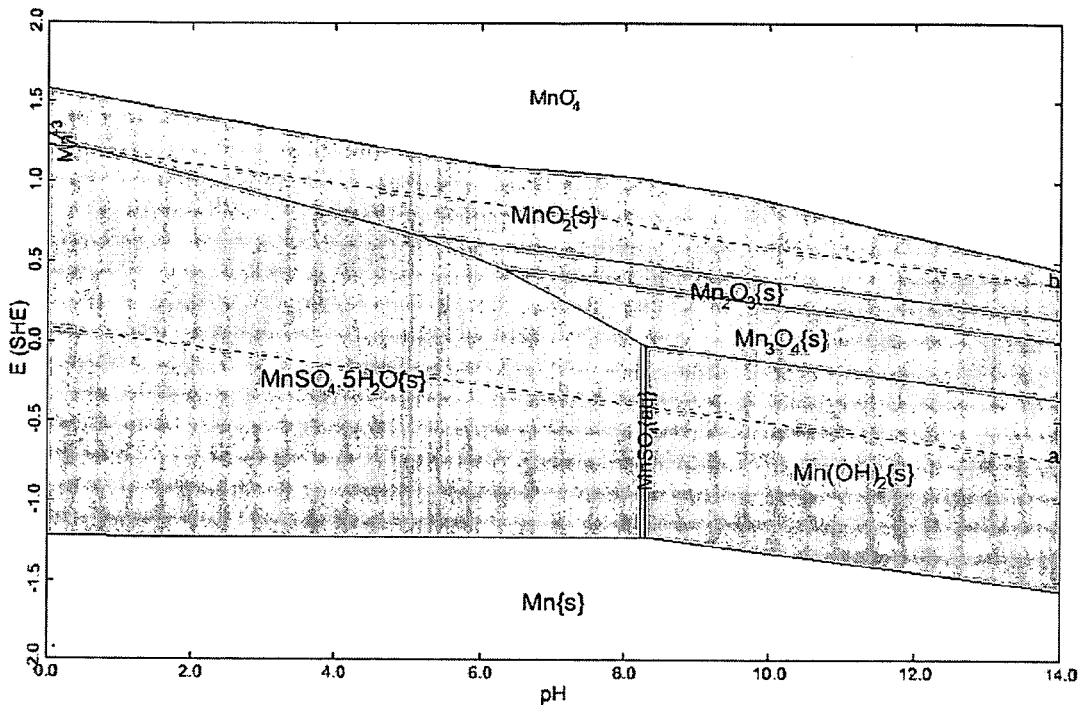
FIG. 11 is a Pourbaix diagram for a manganese-water system of 1 mole/liter manganese ion concentration.

With reference to FIGS. 11 and 12, the impact of system conditions on the $MnO_2$ stability area is illustrated with respect to Pourbaix Diagrams for aqueous systems at 25° C. and at ambient pressure at sea level. In FIG. 11, the ranges of pH and Eh values for thermodynamically stable aqueous solution systems of various manganese compounds are illustrated in graph form for aqueous solution systems at 25° C. and a 1 mole/liter manganese ion concentration. FIG. 12 similarly illustrates ranges of pH and Eh values for an aqueous solution system at 25° C. but at a $1.0\times 10^{-6}$ mole/liter manganese ion concentration and ambient pressure at sea level. The Pourbaix Diagrams depicted in FIGS. 11 and 12 were derived from the diagram presented in Atlas of Electrochemical Equilibria in Aqueous Solutions," Marcel Pourbaix, pages 286-293, National Association of Corrosion Engineers, Houston, Tex. A comparison of the boundaries of the two shaded areas on FIGS. 11 and 12 is illustrative of the different stability areas that exist under different system conditions. The Pourbaix Diagrams of FIGS. 11 and 12 are provided by way of illustration. It should be understood that such diagrams would represent different $MnO_2$ stability area regions at different temperatures, pressures and molarities and are not intended to represent a diagram reflecting process conditions within either a batch or continuous flow reactor operated in accordance with the methods of the invention. In fact, the methods of the invention can be carried out at ambient temperatures and pressures as well as at elevated temperatures and at pressures above atmospheric.

In the methods and systems disclosed herein, the conditions or parameters of aqueous solution systems within a reactor in accordance with embodiments of the invention are monitored and maintained relative to the metal oxide stability area (or co-precipitation or metal oxide stability area when other metals are processed) with regard to electrochemical (oxidizing) potential (Eh) range and pH range at the prescribed system molarity, temperature and pressure in order to provide an Eh-pH combination to achieve stable solution equilibrium, as defined by the metal oxide stability area as delineated in, for example a Pourbaix Diagram, such as those depicted in FIGS. 11-17.

In an embodiment of methods of the invention, the constituents of the aqueous solution within the continuous flow reactor are the metal containing solutions, along with the oxidizer or oxidizers in the aqueous oxidizing solution and the base or acids that may be added thereto which are mixed together to form a combined mixed process solution. During processing, the mixed process solution within the continuous flow reactor system must be moved to and maintained at or within the boundary area delineated by the prescribed combination of Eh and pH ranges as the solution moves down the reactor. In order to accomplish this, temperature, pressure, molarity, Eh, and/or pH adjustments must be made through the addition of oxidizer, base, acid or manganese and other ions as the solution moves through the continuous flow reactor. To this end, Applicants typically utilize a preheated aqueous oxidizing solution as described above containing an oxidizer also referred to interchangeably herein as an oxidant.

The methods and systems of the invention, whether for regeneration, pretreatment or precipitation, may involve and employ Applicants' recognition that metal oxides, e.g., oxides of manganese, iron oxides, or the metal oxide, processed in an aqueous continuous flow reactor system in which conditions and parameters such as but not limited to: temperature, pressure, pH, Eh, molar concentration of the constituents (molarity), and retention times are initially prepared to be in the polyatomic ion, metal ion, co-precipitation, or metal oxide stability area and thereafter monitored, adjusted and maintained within the metal oxide stability area will yield metal oxides having high pollutant loading capacities and/or high oxidation states and/or other desirable properties. In its various embodiments, the invention and the methods and systems thereof provide for rapid, adaptive and stable processing in a continuous flow reactor of metal oxides as compared to the methods and systems currently know in the art. Amongst other uses, metal oxides thus processed are suitable for use as a sorbent in dry and wet gaseous pollutant removal systems and are particularly suitable for use in dry pollutant removal systems. They are also useful as sorbents in aqueous applications, for example in the removal of Arsenic in water supplies in addition to being utilized in batteries or a variety of commercial, industrial and other applications, unrelated to pollutant removal, that incorporate or employ metal oxides.

Depending upon the conditions and constituents of the aqueous solution within the continuous flow reactor system, the pH range of the boundary may be acidic, near neutral, or basic. In short, processing may be carried out over the full pH spectrum. However, the oxidizer strength or concentrations required at the extremes of the pH spectrum may make such processing uneconomic though nonetheless achievable. As the reactions proceed, metal oxides are being produced and the oxidizer is being consumed, the system may tend to shift away from the desired pH range, in which case the addition of a suitable base or acid will help accomplish the necessary adjustment to maintain the aqueous solution within the continuous flow reactor system within the appropriate Eh-pH range of the metal oxide stability area required to predominantly produce the desired metal oxide or metal oxide compound.

Continuous flow reactors are known in the art and may be provided in various configurations and may be equipped with a number of components and utilized in the methods and systems of the invention. As shown in FIG. 1, a continuous flow reactor is show as a section of serpentine pipe and provided with an orifice 92, a static mixer 15 and a backpressure valve 94. It should be understood that the continuous flow reactors may be also be provided with a plurality of ports for introduction or injection of solutions for making adjustments in combined mixed process solution conditions at different locations along the lengths of pipe forming the continuous flow reactors. For example, a port 96 is shown in FIGS. 1-5, as an oxidant/base/acid addition. A plurality of ports 96 may be provided for addition of these and other constituents or for purging of process solutions from continuous flow reactors. Continuous flow reactors may be a single length of pipe, lengths of pipe with pipe "branches" or interconnected lengths of pipe equipped with diverter valves to direct the flow of process solutions. The branched pipe or interconnected lengths of pipe may be of different lengths allowing for process solutions to be directed from a main pipe length to longer or short pipe lengths when system parameters indicate that either longer or short processing residence times are required. Such configurations are one of several ways that residence time can be regulated or controlled in the systems and methods of the invention. It should therefore be understood that the continuous flow reactor depicted in the Figures is being provided solely for illustrative purposes.

Applicants have found it beneficial to maintain pH relatively constant during processing. Alternatively, the introduction of additional oxidizer to bring the system within the appropriate Eh range as pH drifts or shifts in the aqueous system may also beneficially accomplish the necessary adjustment. The aqueous solution within the continuous flow reactor system is, and therefore the methods and systems of the invention are, dynamic and adaptive with necessary adjustments being made not only by introduction of acid or base but with introduction of oxidizer along with changes in temperature, molarity, and pressure within the continuous flow reactor.

Although the following discussion focuses on an exemplary application of embodiments of the invention directed toward the production of oxides of manganese and the $MnO_2$ stability area, these principles will be understood by those skilled in the art to also be generally applicable to production of other metal oxides (also referred to as "metal oxide compounds") with attention to their particular metal oxide stability areas or co-precipitated metal oxides with attention to the co-precipitation stability area, or precipitation onto a substrate. As previously noted, oxidant may be provided in an aqueous oxidizing solution containing only an oxidant with base being separately provided. However, Applicants have found it useful to utilize an aqueous oxidizing solution created by premixing the oxidant and base solutions in specific quantities thereby creating a premixed solution of oxidant and base oxidizing solution termed "premixed oxidant/base solution". This premixed oxidant/base solution is prepared with the desired pH-Eh combination and can be prepared, maintained, or adjusted by increasing or decreasing the amounts or molarity of oxidant, acid, base, constituent concentrations, temperature, and/or pressure adjustment, as appropriate, so that the conditions are adjusted to remain within the $MnO_2$ stability area when the aqueous oxidizing solution is contacted with the manganese containing solution.

Through their understanding of the relationships between the system parameters of the $MnO_2$ stability area and application thereof to conditions of a given aqueous system within a continuous flow reactor, Applicants are able to achieve stable and controlled regeneration, pretreatment, and precipitation so as to rapidly and adaptively yield oxides of manganese having equal or increased loading capacity when compared to the untreated commercially available EMD and CMD oxides of manganese (NMD, EMD, and CMD) or when compared to loaded oxides of manganese. At a given pH, Eh, temperature, pressure, and molar ranges within the $MnO_2$ stability area, the desired manganese valence state (theoretically close to +4) will exist. Thus, there is no propensity for Mn compounds at or close to +4 valence state to degrade to +3 or +2 valence states. However, if conditions are not maintained within the $MnO_2$ stability area such degradation may occur.

Applicants have found that oxides of manganese regenerated or pretreated or precipitated (newly formed) within a continuous flow reactor from an aqueous oxidizing solution that is contacted or mixed with a manganese containing solution and subsequently that are maintained within the $MnO_2$ stability area will exhibit a Mn valence state of close to +4 and exhibit target pollutant loading capacities equal to and/or greater than (increased) the loading capacities of virgin or loaded oxides of manganese.

Though preheating is a desirable and sometime required step, it may not be required for aqueous solution systems processed in a continuous flow reactor according to the methods of the invention as long as the time required to bring the aqueous solutions up to their desired temperature does not cause the formation of undesirable or untargeted constituents. With monitoring of Eh, pH, temperature, pressure, and molar concentrations an operator can make necessary adjustments in order to maintain or return the process solution conditions in a continuous flow reactor to within the $MnO_2$ stability area. Such monitoring and adjusting can also be automated utilizing electronic probes or sensors and controllers as discussed later herein below.

In the various embodiments of the invention disclosed herein, the systems in which the methods of the invention are carried out all have common or corresponding components that are substantially the same. Though referred to, in appropriate instances by slightly different terms (for purposes of clarity) and being identified with corresponding but different reference numbers in the figures and the disclosure herein below, their operation and function will also be understood to be substantially the same and equivalent. To the extent that there are operational or functional differences, they are identified and discussed as appropriate. Common system components include a continuous flow reactor in which regeneration, pretreatment and precipitation are carried out; agitation devices such as static mixers and probes for temperature, pressure, Eh, pH, and TDS (total dissolved solids) measurement with which the continuous flow reactor and other system components may be equipped. The continuous flow reactor is also equipped with a heating unit, such as a heater or heat exchanger (not shown in the figure hereof) for adding heat to and maintaining the temperature of the solutions in the vessels. In one such embodiment, a jet-cooker design which incorporates steam injection of the process streams, e.g. oxidant/base premix and metal containing stream can be employed and additional process streams such as secondary metal containing solution for introduction of foreign cations may similarly be injected. Those skilled in the art of jet-cooker design and operation can configure the continuous flow reactor to use steam as a primary heat source and to provide adequate mixing and contacting of the solutions at point of contact. Steam may not only be used for controlling molarities but also to control temperature in the continuous flow reactor. This is useful because a separate heat exchanger does not have to be utilized and temperature can also be controlled with a backpressure valve at the end of the continuous flow reactor.

When regenerating oxides of manganese with the methods of the invention, reacted sorbent is processed in a preheated premixed oxidant/base aqueous solution within the continuous flow reactor under controlled conditions, specifically within the $MnO_2$ stability area, to produce regenerated oxides of manganese. The regeneration methods of the invention can be understood with reference to FIGS. 1-3 which depict different possible embodiments of a regeneration system 10 of the invention in block flow.

Figure 2:
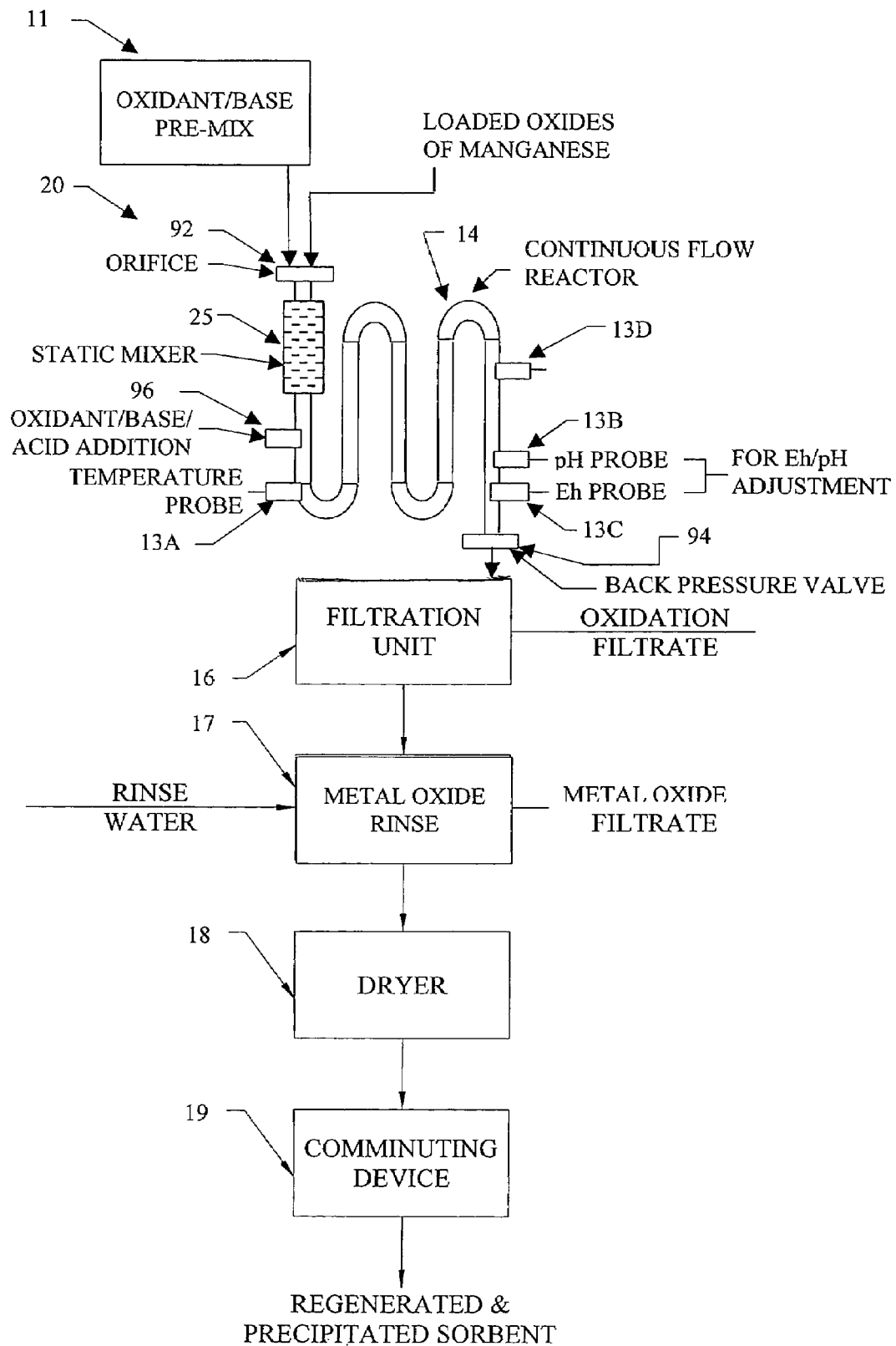
FIG. 2 is a block flow diagram of a system and process according to the invention.
Figure 3:
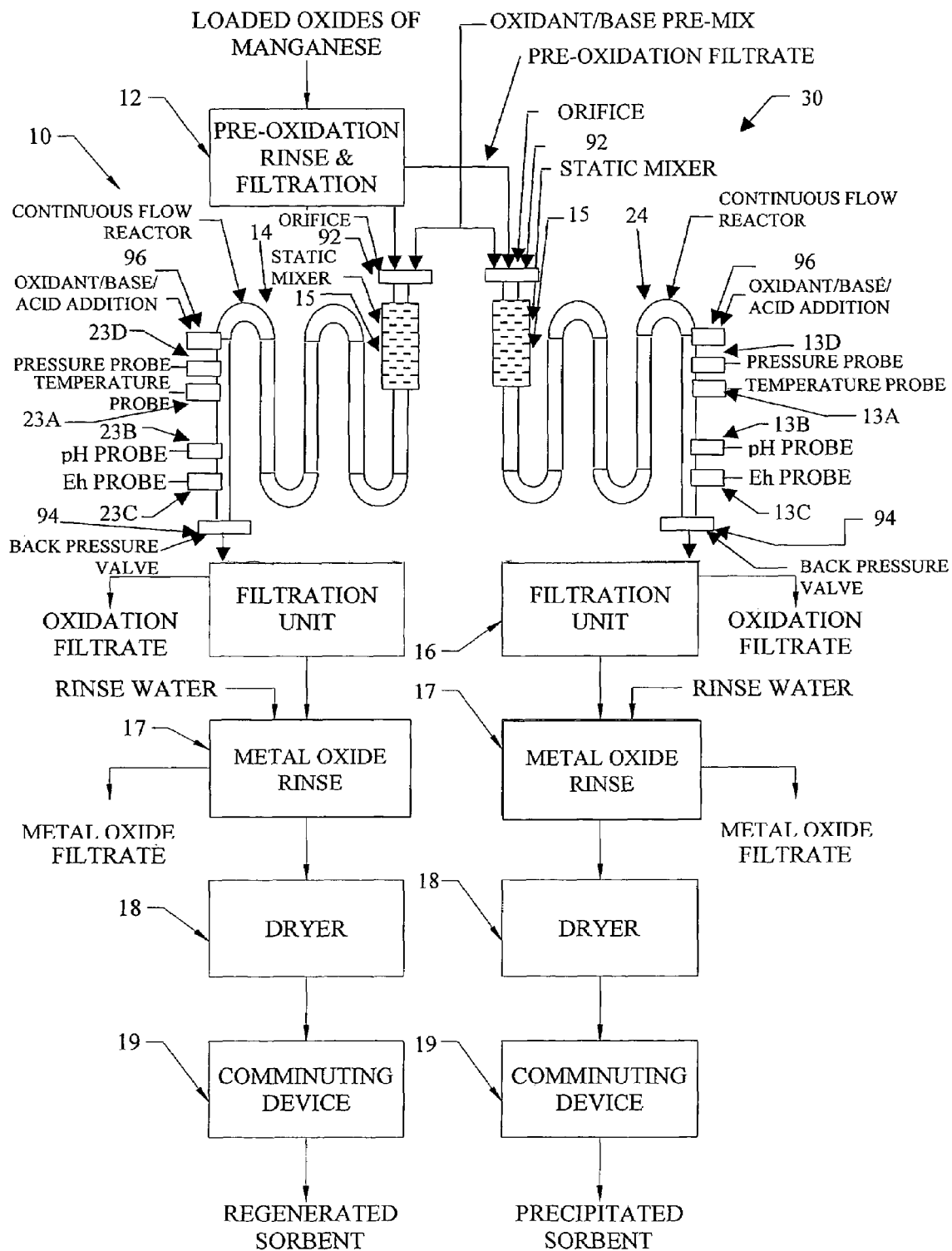
FIG. 3 is a block flow diagram of a system and process according to the invention.

Turning to FIG. 1, loaded oxides of manganese or loaded sorbent is rinsed or washed with an aqueous solution in the pre-oxidation sorbent rinse 12 of regeneration system 10 (without the precipitation subsystem 30 shown in FIG. 3). The rinse step serves to wash away reaction products from the surface of reacted oxides of manganese sorbent particles along with impurities and very fine particulate matter. Regeneration, however, may be conducted without the rinse step as discussed with reference to FIG. 2 herein below. Following rinsing, the rinsed sorbent is separated from the rinse solution to provide rinsed sorbent or rinsed oxides of manganese or sorbent and a pre-oxidation filtrate.

Filtration may be carried out using any of a variety of suitable filtration techniques and devices known to those skilled in the art. A separate filtration device may be used following pre-oxidation rinse 12 or the filtration device may be incorporated in and part of pre-oxidation rinse 12. The filtrate will contain recoverable values, such as cations and anions from disassociated reaction products. For example, where the reaction products are manganese salts, such as manganese sulfate ($MnSO_4$) and manganese nitrate ($Mn(NO_3)_2$),: $Mn^{+2}$, $SO_4^{-2}$, $NO_3^{-1}$, spectator ions, suspended solids or other particulates. As discussed later herein below with reference to FIGS. 3, 5 and 6, these values can be recovered from the pre-oxidation filtrate through oxidation and precipitation of the $Mn^{+2}$ ion as a solid precipitated oxides of manganese; and with further processing the sulfate or nitrate anions can be recovered and formed into useful and marketable by-products, e.g., fertilizers, chemicals or explosive products or routed for disposal as required.

After rinsing and separation, an appropriate quantity of water is added to the rinsed sorbent to create a rinsed sorbent slurry capable of being pumped and introduced or conveyed to continuous flow reactor 14 which is equipped with at least agitation and mixing device 15, shown as static mixer 15 in FIG. 1. Any of various static mixing or agitation devices known to those skilled in the art to be suitable for mixing solutions or solid-liquid slurries so as to keep the solid oxides of manganese particles generally suspended in solution as they move down continuous flow reactor 14 can be utilized.

As illustrated in FIG. 1, the continuous flow reactor 14 is equipped with temperature, probe 13A, pH probe 13B, Eh probe 13C and pressure probe 13D. These probes are utilized to measure their respective parameters in the solutions or slurries processed in continuous flow reactor 14 and may be in electronic communication with a controller as later discussed herein with reference to FIG. 8 and equally applicable to FIGS. 7 and 9.

Continuous flow reactor 14 is depicted in FIG. 1 with a single static mixer 15 and a single orifice 92. It should be understood that continuous flow reactors may be provided with a plurality (two or more) of agitation and mixing devices and orifices to assure proper and continuous mixing and/or to allow introduction of additional amounts of premixed oxidant/base solution and rinsed sorbent slurry as needed. The premixed oxidant/base solution and rinsed sorbent slurry may be separately introduced or introduced after prior mixing of the two at different points along the continuous flow reactor 14. The rinsed sorbent slurry is mixed with a preheated premixed oxidant/base aqueous solution from oxidant/base premix vessel 11 to form a slurry, referred to herein as the regeneration slurry. The two process streams, the rinsed sorbent slurry and the premixed oxidant/base solution, are both metered into the continuous flow reactor separately or as a regeneration slurry, and depending upon configuration or process design may first enter through orifice 92. Orifice 92 provides a pressure drop in the system which aids in the creation of oxides of manganese particle characteristics useful in target pollutant capture. The resulting mixture or regeneration slurry is monitored and/or adjusted, as necessary, by addition of oxidant, acid, or base concentrations, with temperature, and/or pressure adjustment, as appropriate, so that the conditions are adjusted to remain within the $MnO_2$ stability area.

Prior to introduction into the continuous flow reactor, both the premixed oxidant/base aqueous solution and the rinsed sorbent slurry may be preheated. For example for some applications, the solution and slurry may be preheated to temperatures above ambient. For other applications they may be preheated to temperatures that are at least at or near 100° C. or to such higher temperature as appropriate as the oxidant can tolerate without significantly decomposing. Within the limits of oxidant decomposition sensitivity, the aqueous oxidizing solution can be preheated to temperatures approaching processing temperatures at given operating pressures within continuous flow reactor and as required to be within the $MnO_2$ stability area. In this and all other embodiments utilizing a continuous flow reactor of the method according to the invention, the two solutions can alternately be heated to temperatures in excess of 100° C. before being brought into contact. However, certain oxidants used in the Applicants' invention tend to decompose at temperatures in excess of 100° C., thereby causing the undesirable occurrence of oxidant decomposition prior to the sought after reaction with manganese ions while other oxidants do not decompose at substantially elevated temperatures and may be heated to useful temperatures in excess of 100° C. prior to mixing. The manganese containing solution, the rinsed sorbent slurry, and the aqueous oxidizing solution, the premixed oxidant/base solution may be introduced without heating and subsequently heated as they enter continuous flow reactor 14 by a heating unit incorporated into continuous flow reactor 14. Further, for those oxidants sensitive to elevated temperatures, once the aqueous oxidizing solution contacts and is mixed with the manganese containing solution to form the combined mixed process solution, reactions in the continuous flow reactor have begun, temperatures can be elevated above the temperature at which the oxidant would decompose as this may then facilitate or accelerate process chemistry.

Just as temperatures may be elevated within the continuous flow reactors in the methods of the invention, pressures may also be elevated above atmospheric conditions. Backpressure valves may be incorporated at the end of the continuous flow reactor. This valve serves several functions. The valve may be adjusted manually or automatically. External controls may also be incorporated to adjust the valve automatically to a pre-set set point. By moving the valve to a more closed position the pressure may be increased and likewise by opening the valve within the continuous flow reactor the pressure decreased. These positions also have an effect on temperature within the continuous flow reactor. A more closed valve position will increase temperature and a more open valve position will decrease temperature. The position of the valve works in conjunction with an external heating apparatus to control temperature and pressure within the continuous flow reactor. Valve design may include but is not limited to diaphragm, ball, or slide valves. The use of back pressure valves for regulating and controlling system pressures is known to those skilled in the art. Their use and adaptability for application in a continuous flow reactor would be readily understood by the skilled artisan as well as use of a controller to make pressure adjustments.

Regeneration of the rinsed slurry may be carried out at various process temperatures as required in order to maintain the aqueous solution system with the $MnO_2$ stability area as other system parameters shift during processing. Applicants have found that processing temperatures in excess of 100° C. may be utilized in processing oxides of manganese sorbent within the continuous flow reactor, as long as solutions and slurries are maintained within the $MnO_2$, or appropriate metal stability window. There may be heating units, such as heat exchangers or other devises known to those skilled in the art of heating solutions, at different points along various lengths of a continuous flow reactor.

Determining which parameter adjustments to make is a matter of engineering or operator choice as long as the adjustment moves system conditions into or maintains them within the $MnO_2$ stability area with manganese as the metal or within the appropriate stability area for other metal oxides or co-precipitated metal oxides.

The preheated aqueous premixed oxidizing/base solution provides the required electrochemical (oxidizing) potential (Eh), within the specified temperature, pressure, and pH range to yield regenerated oxides of manganese having high loading capacities and/or high oxidations states. Through use of static mixers, the regeneration slurry in continuous flow reactor 14 is continuously mixed and the pH of the slurry is adjusted by appropriate means, e.g., addition of acid or base.

The regeneration slurry of oxides of manganese are allowed to remain within the continuous flow reactor for a time sufficient to achieve an increased oxidation state and/or a target pollution loading capacity equal or greater than that of virgin oxides of manganese sorbent originally utilized to capture target pollutants. Applicants have found that oxidation strength and/or load capacity of the $MnO_2$ tends to increase with an optimum retention time determined for a specific temperature, pressure, pH, Eh, and molar concentrations, as does the production of $MnO_2$. With sufficient retention time substantially all of the oxides of manganese contained in the regeneration slurry will be regenerated, until the aqueous solution will contain substantially only $MnO_2$ and useful by-products, such as potassium or sodium nitrates or sulfates for example, left in solution before exiting the continuous flow reactor.

Retention times can be increased to the desired duration by adding to or routing the combined mixed process solution through additional pipe lengths of a continuous flow reactor, changing the pipe diameter, slowing down the injection rate of the solutions, changing concentrations of process solution constituents or by other means known to those skilled in the art of continuous flow reactor design and operation. If monitoring indicates that processing is complete, the combined mixed process solution can be purged from continuous flow reactor 14. Continuous flow reactors may be provided with multiple flushing ports, (not shown) for this purpose or to vacate the process solution for any reason or for general routine maintenance and cleaning of a section of pipe forming a continuous flow reactor.

Retention times may also be regulated or controlled by changing input molarities or concentrations of chemical constituents. Adjusting the amounts of manganese or other metal, whether in a slurry or disassociated ions in solution, or the amounts of oxidant can vary required processing time and thus retention time. For example, if the manganese containing solution has high concentrations of manganese values, the amount of oxidant may be increased thereby reducing the retention time required to for the desired end product. Similarly, if a slower processing time is desired (increased retention time) the amount of oxidant may be decreased, but preferably not below a concentration needed to complete processing of manganese values to $MnO_2$.

Applicants have found that with an optimal regeneration slurry retention time the portions of the solid rinsed oxides of manganese particles that have had their reactivity or target pollutant loading capacity reduced, through lowering of valance state, are oxidized up to valance states close to +4.

At the end of the continuous flow reactor is a backpressure valve 94 or other device known in the art, which controls the pressure within the continuous flow reactor. Just as temperatures may be elevated within a continuous flow reactor, pressure may also be elevated in excess of atmospheric pressure, monitored, regulated and controlled to desired processing pressures and adjusted according to process dynamics. Valve 94 in conjunction with heating units allows the temperature and pressure to be raised and maintained within the pipe to the appropriate processing temperature and pressure as defined by the $MnO_2$, or as appropriate, other stability area. The regeneration slurry exiting backpressure valve 94 or similar device or from flushing points is routed to a wash and rinse process where the $MnO_2$ sorbent is separated and filtered from the solution leaving a filtrate and regenerated oxides of manganese filter cake. Filtration can be preformed by techniques known to one skilled in the art of filtration, such as but not limited to hydroclones, drum filter, moving bed filter, or a filter press.

Separation of the regenerated oxides of manganese and the oxidation filtrate may be performed at a minimal temperature preferably close to about 100° C., and more preferably close to the operating temperature in continuous flow reactor 14. This separation may less preferably be performed at temperatures below the minimal temperature. Allowing the solution containing regenerated oxides of manganese and the aqueous oxidizing solution to cool to temperatures below the solubility temperatures for residual or spectator ions in solution, for example, but not limited to $K^{+1}$ and $SO_4^{-2}$ can result in the precipitation of solid salts such as $K_2SO_4$. So as a practical matter, temperatures above the solubility temperature of residual ions may be the minimal desirable temperature. Through experimentation, it has been recorded that allowing salts at certain levels to precipitate with the regenerated oxides of manganese sorbent lowers the target removal efficiency and loading rates and should therefore be avoided. The separated regenerated sorbent or regenerated oxides of manganese or other metal oxides are then further rinsed with water to wash away any remaining spectator ions.

In FIG. 1, this is illustrated as two separate steps: 1) filtering and separating the regenerated oxides of manganese from the regeneration slurry in filtration unit 16 to provide an oxidation filtrate; and 2) rinsing the separated, regenerated sorbent with water to wash away remaining spectator ions in the regeneration rinse 17.

Any of a variety of suitable filtration techniques and devices known to those skilled in the art may be utilized for this purpose. It should be noted that the filtration and rinsing step could be carried out in combined filtration and rinsing equipment known to those skilled in the art. Further, as with the pre-oxidation rinse, the filtration unit 16 may alternatively be incorporated into and as an integral part of continuous flow reactor 14. The rinsing of the metal oxides leaving the continuous flow reactor should be of sufficient duration and with sufficient volume of water as to remove disassociated ions associated with the oxidizer, base, and acid in the aqueous oxidizing solution to a suitable level. The presence of these ions in the regenerated sorbent in excessive amounts may negatively impact the loading capacity or removal efficiency of the regenerated oxides of manganese. This is not to say that regenerated oxides of manganese that are not so rinsed will be ineffective for removal of target pollutants because in fact they may be so utilized without the rinse or with less than thorough rinsing and good removal rates can be achieved. However, the regenerated oxides of manganese may be more efficiently utilized following rinsing. This is equally applicable to oxides of manganese pretreated or precipitated according to the methods of the invention.

Various measurement techniques and devices known to those skilled in the art can be employed to determine the level or concentration of such ions in rinse water and thereby determine whether the oxides of manganese have been adequately rinsed. Such techniques include measurement of conductivity, resistivity, total dissolved solids (TDS) or other indicators of the level of disassociated ions and/or dissolved solids and fine particulates in a solution, such as specific gravity or density or chemical analysis. By way of example and not limitation, TDS measurements of the oxidation filtrate taken by Applicants have been in the range of 80,000-200,000 ppm, representing the disassociated ions from the oxidant, base or acid and other possible dissolved solids or fine particulates associated with the regeneration. The rinse step should generally being designed to remove such ions, solids and particulates from the regenerated oxides of manganese to an acceptable level or tolerance. Where precision is required the vessel or apparatus in which the rinse and/or filtration is carried out should be equipped with an appropriate probe for monitoring or measuring conductivity, resistivity, TDS level or other indicator of the mount of dissolved solids and particulates in solution which may generally be referred to as a TDS probe and coupled with or part of a TDS controller or TDS control element. The TDS controller in response to an input from the TDS probe can regulate or control the level or duration of the rinse and/or filtration step by signaling the termination of the rinse and/or filtration step once the desired TDS set point has been reached.

Continuous flow reactors may also optionally be provided with TDS probes in electronic communication with controller 67 (FIG. 8) or a TDS controller. TDS levels are an indicator of the concentration of manganese and other ions in the process solution in the continuous flow reactor. TDS level data allows a controller, such as controller 67, to calculate manganese ion molarity and determine the required Eh and pH at process temperatures and pressures required to precipitate oxide of manganese. Phrased alternatively, TDS level data can help determine the $MnO_2$ stability area for given conditions in the process solution in a continuous flow reactor or the required Eh and pH level of the aqueous oxidizing solution to be mixed with a manganese containing solution.

With monitoring of such measurements, the rinse step can be carried out until the oxidation filtrate reaches the desired level based upon the measurement technique employed. Through a series of regeneration cycles and loading cycles, the acceptable level or tolerance for the given use to which the regenerated oxide will be put can be determined, as well as the volume, flow rate and duration of the rinse in order to establish or standardize operating procedures. Although lowering the TDS of the filtrate generally favorably impacts target pollutant removal efficiency and loading rates, Applicants have found that oxides of manganese prepared according to the methods of the invention may be utilized for target pollutant removal with or without the rinsing step. Applicants have achieved adequate target pollutant removal with regenerated oxides of manganese that is not rinsed prior to use as a sorbent, but have seen better removal at measured TDS levels in the filtrate of less than 100,000 and even better performance at less than 10,000.

In some of the various embodiments of methods according to the invention, invention, metal oxide sorbent exits either the continuous flow reactor or the batch process and is directed to a metal oxide rinse 17. During this stage of the process, the processed metal oxides or sorbent can be rinsed to a specified level of total dissolved solids (TDS), as measured in the metal oxide filtrate. As earlier mentioned, it has been found that the level to which the sorbent is rinsed affects the removal capabilities of the sorbent produced. For example, $NO_x$ removal and utilization of the sorbent appears to improve with sorbent that has been rinsed to a lower TDS value, below about 10,000 ppm or more preferable below about 5,000 ppm. Whereas for $SO_x$ higher removal and utilizations were achieved with sorbent that had not been rinsed to low TDS values, ranging between about 10,000 ppm to about 30,000 ppm. As noted, sorbent or metal oxides may be processed with higher or lower TDS rinse values; however, at higher levels sorbent utilization and/or removal efficiencies may diminish for some applications. During target pollutant capture where the target pollutant is $SO_x$, the sulfate species bound to the manganese oxide sorbent as manganese sulfate can act as a catalyst for additional target pollutants and can assist in removing higher quantities of target pollutants, thus increasing sorbent utilization. For example, the manganese sulfate reaction products bound on the surface of the manganese dioxide sorbent during pollutant removal have been seen to act as a catalyst for certain species of mercury (Hg) present in some industrial flue gas streams. With sorbents prepared according to the disclosed methods, Applicants' conducted tests utilizing a Pahlman Process™ pollutant removal system showing that after the sorbent had reached its capacity for NOx and SOx capture, the partially loaded sorbent still oxidized 100% of elemental mercury ($Hg^0$) to its oxidized form oxidized mercury ($Hg^{+2}$). The sulfates were serving as a catalyst in the reaction converting elemental mercury ($Hg^0$) to oxidized mercury ($Hg^{2+}$). Therefore, regulating the TDS level in the effluent stream directly controls the concentration of sulfates contained with the sorbent, which could allow the operator to manipulate utilization and reactions occurring during pollutant capture.

Returning to FIG. 1, the wet regenerated oxides of manganese, if being utilized in a dry target pollutant removal system such as of the Pahlman Process™ Technology, is first routed for drying to a dryer 18, referred to as sorbent dryer 18 in the figure. Oxides of manganese may be introduced into pollution removal systems as a dry powder, a wet filter cake, or slurry by a slurry or spray feeder. There are current spray drying applications, such in the dry lime absorbers that utilize this induct drying technology and those familiar with the art of spray drying would be familiar with the technology. In dry removal systems, the wet filter cake and sprayed slurry may be "flash dried" upon contact with industrial gas streams which may be introduced at elevated temperatures into the pollutant removal systems. For such other applications the drying step may not be necessary and the wet or moist filter cake may be conveyed to a filter cake feeder. Similarly, with injection, slurry, spray or spray injection feeders, once adequately rinsed, the regenerated oxides of manganese need not be further filtered or separated. With addition of such amount of water as necessary, a sorbent slurry may be formed. The sorbent can then be conveyed to the slurry feeder. In duct drying, spray drying or flash drying can also have the affect of increasing the sorbents utilization. In the spray drying process, water soluble target pollutants can get dissolved in the surface water and as the surface water evaporates, leaving the target pollutant in contact with the sorbent, thereby positively affecting target pollutant capture. Once again, the benefits of spray drying or flash drying that are known to those skilled in the art, apply to the applicants' invention as well.

However, when the oxide of manganese sorbent is to be introduced as a dry particulate or powder, both drying and comminuting to size the oxides of manganese particles is typically performed. Dryer 18 may be a kiln or other suitable dryer used for such purposes and known to those skilled in the art. Dryer 18 may utilize waste heat generated by combustion which is transferred or exchanged from combustion or process gases at an industrial or utility plant. When drying is required the temperature should be below the thermal decomposition temperature of oxides of manganese but sufficiently high so as to drive off surface water or moisture without removing any waters of hydration or waters of crystallization. Temperatures around 100° C. to 160° C. have been found to be adequate for this purpose. Drying can be conducted at lower temperatures but drying time may be uneconomically extended; and at higher temperatures, which can be utilized in Applicants' invention, short drying time will have to be closely observed so as to avoid thermal decomposition of the oxides of manganese, driving off structural water, or undesired damage to the crystalline structure of the oxides of manganese.

In another embodiment of the regeneration methods of the invention, loaded sorbent is processed without a pre-oxidation rinse. This is illustrated in FIG. 2, where the loaded sorbent first is mixed with an adequate quantity of water to form a loaded sorbent slurry and metered, through appropriate means known to those skilled in the art, directly into orifice 92 leading into continuous flow reactor 14, referred to herein as continuous flow regeneration/precipitation reactor 14, of regeneration system 10 without a pre-oxidation rinse. The system 10, as depicted, includes at least one static mixer 15, probes 13A-13D, filtration unit 16, rinse 17, dryer 18, and comminuting device 19. In the interest of avoiding undue repetition, Applicants note that the components of system 10 in FIG. 2, absent the pre-oxidation rinse 12, are essentially the same components as that of system 10 in FIG. 1 and that the function and operation of the corresponding system components will be the same in both embodiments of the systems and of the methods of the invention as depicted in FIGS. 1 and 2. The statements made above regarding the corresponding counterpart components and process steps in regeneration system 10 of FIG. 1 and operating conditions and parameters (temperature, pressure, Eh, and pH) are equally applicable to the components of system 10 of FIG. 2 and therefore they are not repeated here. Further, in this embodiment, the method proceeds in substantially the same manner as described above with reference to FIG. 1 following the pre-oxidation rinse 12 where the rinsed sorbent slurry is introduced or mixed with the oxidant/base solution and introduced into continuous flow reactor 14. However, in this embodiment, the dissociated ions of the reaction products are retained and processed in the same continuous flow reactor 14, as the solid oxides of manganese particles upon which the reaction products formed. Thus, in addition to the solid oxides of manganese, the regeneration slurry being processed in reactor 14 will also contain disassociated reaction product ions.

If the reaction products are manganese salts, e.g., manganese sulfate ($MnSO_4$) and manganese nitrate ($Mn(NO_3)_2$), then $Mn^{+2}$, $SO_4^{-2}$, $NO_3^{-1}$, spectator ions, suspended solids or other particulates will be in the regeneration slurry solution. While the solid oxides of manganese are being regenerated, the $Mn^{+2}$ ions are at the same time being precipitated out of solution as newly formed oxides of manganese. As in the regeneration method illustrated in FIG. 1 and discussed above, the solution temperature and pressures are maintained and controlled to be within the boundaries of the $MnO_2$ stability window at the prescribed operating or processing temperature and pressure. Similarly, the regeneration slurry is metered through the orifice and conditions in the slurry are monitored and adjusted with respect to temperature, pressure, Eh, and pH, as necessary, to move and maintain conditions within the $MnO_2$ stability area as processing proceeds in continuous flow reactor 14. The end product is a combination of regenerated and precipitated oxides of manganese having high oxidation states and/or high or increased pollutant loading capacities. The solid sorbent particles may, in part, serve as substrates on to which newly formed $MnO_2$ is precipitated. In all other respects processing and handling of the combined regenerated and precipitated sorbent follows that as above described with regard to FIG. 1.

When a pre-oxidation rinse is employed as in FIG. 1, the pre-oxidation filtrate contains the disassociated reaction products, including $Mn^{+2}$ ions, which can be precipitated out of solution as oxides of manganese without solid oxides of manganese particles being present in the solution. This is depicted in FIG. 3 where the pre-oxidation filtrate is shown being directed to a continuous flow reactor 24 of precipitation subsystem 30. The precipitation subsystem 30, as depicted includes, the continuous flow reactor 24 equipped similarly to continuous flow reactor 14, with at least one static mixer or mixing device 15, and probes 13A-13D; filtration unit 16; rinse 17; dryer 18 and comminuting device 19. As previously discussed above with reference to the systems of FIGS. 1 and 2 and the methods practiced therein, the components of the continuous flow reactor subsystem 30 and steps of the method of the invention carried out therein are substantially the same though numbered differently and in a some instances termed differently. Nonetheless, the corresponding system components of the earlier discussed embodiments of the systems of the invention shown in FIGS. 1 and 2 and the steps of the methods as described herein above are substantially the same. The statements made above regarding the corresponding counterpart components of regeneration systems shown in FIGS. 1 and 2 and operating conditions and parameters (temperature, pressure, Eh, and pH) are equally applicable to the components of the precipitation subsystem 30 of FIG. 3 and the steps carried out therein. Therefore, they are not repeated here in order to avoid undue repetition. Further, in this embodiment the method proceeds in a similar manner as described above with reference to FIG. 1 following the pre-oxidation rinse 12 or with reference to FIG. 2. The obvious difference being that no solid oxides of manganese are initially present in the pre-oxidation filtrate and oxidant/base pre-mixed solution being processed in continuous flow reactor 24.

The pre-oxidation filtrate is heated to or maintained at the operational temperatures of about 100° C. or greater, prior to introduction into continuous flow reactor 24 and is combined with a preheated aqueous premixed oxidizer/base solution in the continuous flow reactor 24 is to form a precipitation solution. Utilizing the probes 13A-13D, precipitation solution temperature, pressure, pH, and Eh are respectively monitored and controlled. As precipitation proceeds, temperature, pressure, pH, and Eh adjustments, as previously described herein above, can be made as necessary to move and/or maintain precipitation solution conditions within the $MnO_2$ stability area as $MnO_2$ precipitation proceeds. The resultant precipitated oxides of manganese whether dried and comminuted or utilized as a filter cake or slurry will have oxidation states and/or loading capacities equal to or greater than the oxides of manganese originally utilized and upon which the reaction products were formed.

Another embodiment of the invention relates to the pre-treatment of virgin oxides of manganese, whether of the NMD, EMD or CMD type, to increase their loading capacity and/or their valence state. This means that oxides of manganese that otherwise might not be economical for use as a sorbent in, for example, the Pahlman Process™ Technology or other pollutant removal system or for other commercial applications due to poor loading capacity or low valence states may be made viable for such uses. The method of this embodiment can be understood with reference to FIG. 4. In this figure, system 10, as depicted, includes a continuous flow reactor 14 equipped similarly to previously discussed continuous flow reactors with at least one static mixer or appropriate agitator 15, probes 13A-13D, filtration unit 16, rinse 17, dryer 18, and comminuting device 19, as in FIGS. 1-3. In the interest of avoiding undue repetition, the components of system 10 in FIG. 4, absent the pre-oxidation rinse 12, are the same components as that of system 10 of FIGS. 1-3 and that the function and operation of the corresponding system components will be the same in both embodiments of the systems and of the methods of the invention as depicted in FIGS. 1-4. Further, the statements made above regarding the corresponding counterpart components and process steps in regeneration system 10 of FIG. 1 and operating conditions and parameters (temperature, pressure, Eh, and pH) are equally applicable to the components of system 10 of FIG. 4 and therefore they are not repeated here. Further, in this embodiment the method proceeds in substantially the same manner as described above with reference to FIG. 1 following the pre-oxidation rinse 12 where rinsed loaded oxides of manganese are made into slurry, specifically a rinsed sorbent slurry, by the addition of an appropriate quantity of water and introduced into the continuous flow reactor 14.

Applicants have found that the loading capacity and/or valence state of virgin oxides of manganese, both naturally occurring (NMD) and synthetic (EMD and CMD) can be increased through pretreatment according to this method. Following the processing steps of the embodiment of the method of the invention depicted in FIG. 1 following the pre-oxidation rinse, as previously discussed above, excepting that a sorbent slurry of virgin oxides of manganese is being introduced into continuous flow reactor 14 instead of the sorbent slurry of rinsed loaded oxides of manganese being introduced into the continuous flow reactor 14. The resulting pretreated oxides of manganese may be rinsed, dried and comminuted, as appropriate as described above.

Figure 5:
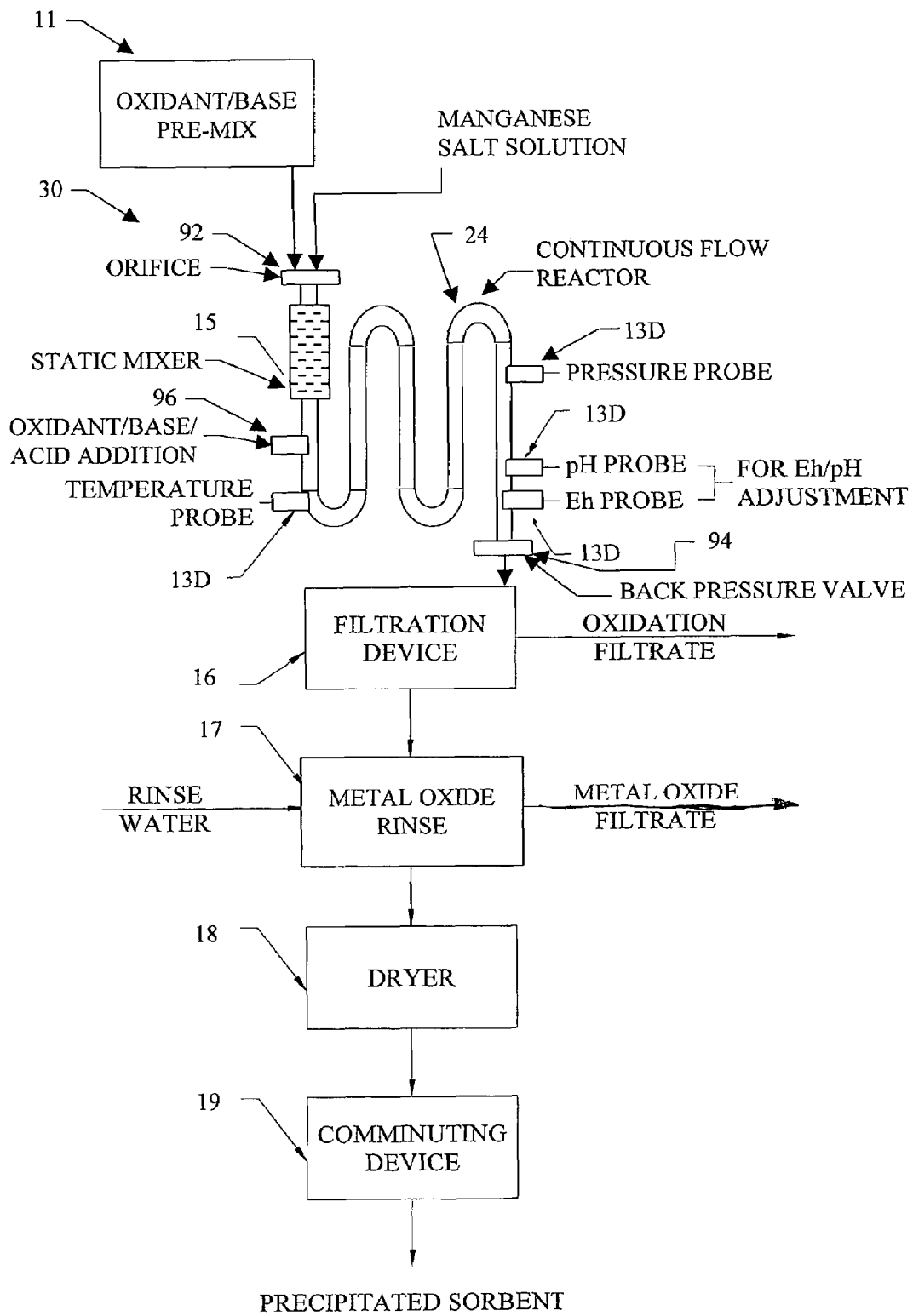
FIG. 5 is a block flow diagram of a system and process according to the invention.

Yet another embodiment of a method of the invention can be understood with reference to FIG. 5, which depicts a precipitation system 30 according to the invention. The operation of this system is substantially the same as precipitation subsystem 30 depicted in FIG. 3. The precipitation system 30, as depicted, includes a continuous flow reactor 14 equipped with at least one static mixer or agitator 15, probes 13A-13D, filtration unit 16, rinse 17, dryer 18, and comminuting device 19. Again, as previously discussed above with reference to the other embodiments systems of the invention employing a continuous flow reactor 14 and the methods practiced therein, the components of the precipitation system 30 and steps of the method of the invention carried out therein are substantially the same though numbered or termed differently in some instances. Nonetheless, the corresponding system components of the earlier discussed embodiments of the systems of the invention employing a continuous flow reactor and the steps of the methods as described herein above are substantially the same. The statements made above regarding the corresponding counterpart components of regeneration systems 10 as applied to the precipitation subsystem 30 and operating conditions and parameters (temperature, pressure, Eh, and pH) are equally applicable to the components of precipitation system 30 of FIG. 5 and the steps carried out therein. Therefore, they are not repeated here in order to avoid undue repetition. Further, in this embodiment, the method proceeds in a similar manner as described above with reference to FIGS. 1 following the pre-oxidation rinse 12 with specific reference to precipitation subsystem 30 depicted in FIG. 3. Again, no solid oxides of manganese are initially present in solution in the continuous flow reactor 24.

In FIG. 5, preheated aqueous premixed oxidant/base solution and heated manganese salt solution are introduced into continuous flow reactor 24 and form a precipitation solution. The preheated premixed oxidant/base solution is so prepared as to have conditions that, when added at or before the orifice plate, move the precipitation solution into the $MnO_2$ stability area. The preheating of the constituent solutions prior to mixture serves to avoid or minimize the precipitation of lower oxides of manganese. Utilizing the probes 13A-13D, temperature, pressure, pH, and Eh are respectively monitored and thereafter adjusted and maintained within the $MnO_2$ stability area by introduction of additional oxidizing solution and base or acid and with temperature and pressure adjustment, all as necessary. The resultant precipitated oxides of manganese whether dried and comminuted or utilized as a filter cake or slurry will have high or increased loading capacities and/or valence state that are equal to or greater than that of commercially available NMD, EMD and CMD.

Precipitated oxides of manganese, whether formed in precipitation subsystem of FIG. 3 or FIG. 5 may be filtered, decanted or otherwise collected and dried. If further oxidation of the precipitated oxides of manganese is required, the drying step may be carried out in oxidizing atmosphere. Alternatively, in accordance with the methods of the invention, an additional oxidizer, as previously described may be introduced into continuous flow reactor 24 while the oxides of manganese are being formed and precipitated. For example air or oxygen can be bubbled through or a persulfate or other suitable oxidizer may be used. As the oxidation and precipitation of the manganese ions occurs as previously discussed in this application, the newly precipitated oxides of manganese have a valence state close to 4+ and an oxidation strength in the range of 1.5 to 2.0, preferably 1.7 to 2.0, and has a BET value ranging from about 1 to 1000 $m^2/gr$. With comminuting, oxides of manganese particles can be sized for industrial and chemical application uses and particularly a particle size ranging from 0.5 to about 500 microns and be sent to the sorbent feeder for reuse in removal of target pollutants.

Figure 4:
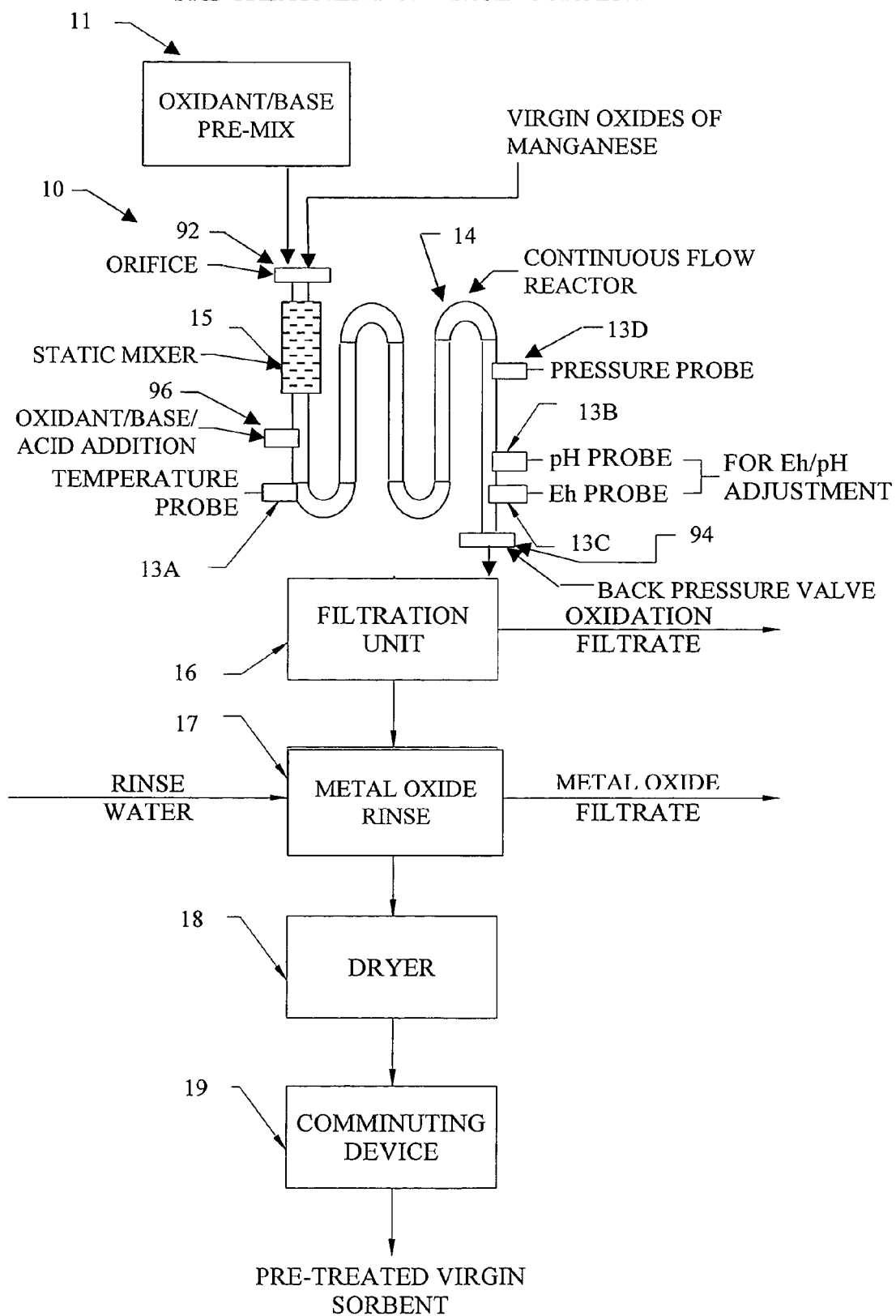
FIG. 4 is a block flow diagram of a system and process according to the invention.

During processing according to the invention, valuable and recoverable anions, such as sulfate, nitrate, and chloride will be present in filtrates, for example in the pre-oxidation, oxidation filtrate and regeneration filtrate as shown in FIG. 1, the oxidation and regeneration filtrates shown in FIG. 2, the oxidation and precipitation filtrates shown in FIG. 3, and the oxidation and pretreatment filtrates shown in FIG. 4. The filtrates from the water used in the rinses may be utilized for a number of cycles before the spectator ion concentrations reach levels meriting their recovery.

When using oxides of manganese to capture $SO_X$ and/or $NO_X$, sulfate, and nitrate, reaction products and their corresponding anions will be present in filtrates. They may also be present as well as other anions and cations from the oxidizers, acids and bases used. Sulfate and nitrate byproducts as well as others that may be formed from other spectator ions formed, separated or processed from the various filtrates.

Ion exchange can be utilized as a mechanism for the separation and recovery of useful sulfate and nitrates. The dissolved sulfates and nitrates of manganese in the pre-oxidation filtrate can be processed in anion exchangers, permitting the recovery manganese cations and separation of the sulfate and nitrate anions. To accomplish this separation, the pre-oxidation filtrate, containing dissolved sulfates and nitrates, is passed across or through a bed or column of an anion exchange resin that has an affinity for at least one of the two anions to remove those anions. The resin will absorb the anion, for instance the sulfate, while permitting the nitrate to pass through the bed or column. Additionally, the solution stripped of sulfate can then be passed across or through a second bed or column of yet a second anion exchange resin having an affinity for the nitrate thereby capturing the nitrate. After the resin is loaded, the vessel or vessels containing the resin can be taken off-line and the resin therein stripped of the captured anion and recovered for reuse.

Suitable anion exchange resins and vessels are known to and readily identified by those skilled in the art. For purposes of illustration, the anion exchange resin may have a halogen, for example a chloride, in the exchange position on the resin. By passing a solution contain manganese cations and sulfate and/or nitrate anions over the resin chloride anions are eluted and exchanged for sulfate and/or nitrate anions. The solution, after passing through the anion exchanger or exchangers in series, will contain manganese chloride from which manganese carbonate or manganese hydroxide is precipitated with the addition of a soluble carbonate or hydroxide compound; and oxides of manganese as previously described in the discussion of the production of oxides of manganese from the pre-oxidation filtrate. The sulfates and/or nitrates loaded on the resin can in turn be eluted with a solution containing chlorides of potassium, sodium or ammonium in order to generate useful sulfates and nitrate by-products for marketing or further processing. The filtrates and rinse solutions left over after precipitate formation can be utilized for this purpose.

The solubility of manganese nitrate is greater than 1.5 times the solubility of manganese sulfate. Solubility of the nitrate is 61.7 mass percent of solute at 250° C., whereas the solubility of sulfate is 38.9 mass percent of solute at 250° C. (Handbook of Chemistry and Physics.) Fractional crystallization, a separation technique known to those skilled in the art, can take advantage of the solubility difference to isolate nitrates of manganese and sulfates of manganese from the pre-oxidation filtrate. The filtrate may be cooled and/or evaporated to cause the crystallization of the lesser soluble manganese sulfate which can then be harvested as solid crystals. The solution remaining can be recycled to pre-oxidation rinse 12 for reuse. Once the concentration of manganese nitrate is sufficiently high, the solution after crystallization of sulfates is further cooled and/or evaporated to crystallize the nitrates which can then be harvested as solid crystals. Alternatively, the solution can be processed with hydroxides or carbonates, as previously described herein above, to generate oxides of manganese and marketable nitrate by-products.

Another variation upon the methods of the invention would utilize the difference in thermal decomposition temperatures of nitrates and sulfates of manganese. Nitrates of manganese are reported to decompose at temperatures between 140° C. to 450° C. to form NO and oxides of manganese. However, sulfates of manganese are understood to liquefy at elevated temperatures but in the presence of trace amounts of a reducing agent, e.g., carbon monoxide or hydrogen, they decompose to $SO_2$ and MnO which when further heated in an oxidizing atmosphere form oxides of manganese. Reacted sorbent loaded with both nitrates and sulfates of manganese may be heated, prior to introduction into either continuous flow reactor 14 or pre-oxidation rinse 12, in an oxidizing atmosphere whereupon manganese oxide is formed and nitrogen dioxide and/or sulfur dioxide are desorbed and captured. If both reaction products are to be thermally desorbed, the reacted sorbent may be heated to and maintained at a first temperature at which nitrates of manganese, primarily, if not exclusively, desorb. The temperature could then be elevated to desorb the sulfates of manganese loaded on the sorbent. Whether one or both reaction products are desorbed, the oxides of manganese may then be processed in continuous flow reactor 14 as described herein above and the desorbed gas or gases captured and further processed. If the nitrates are first thermally desorbed, the sorbent may be routed either through a pre-oxidation rinse or routed directly to an oxidation vessel 14. The recovery of useful sulfate by-products would be as previously described from either a pre-oxidation filtrate or an oxidation filtrate.

Figure 10:
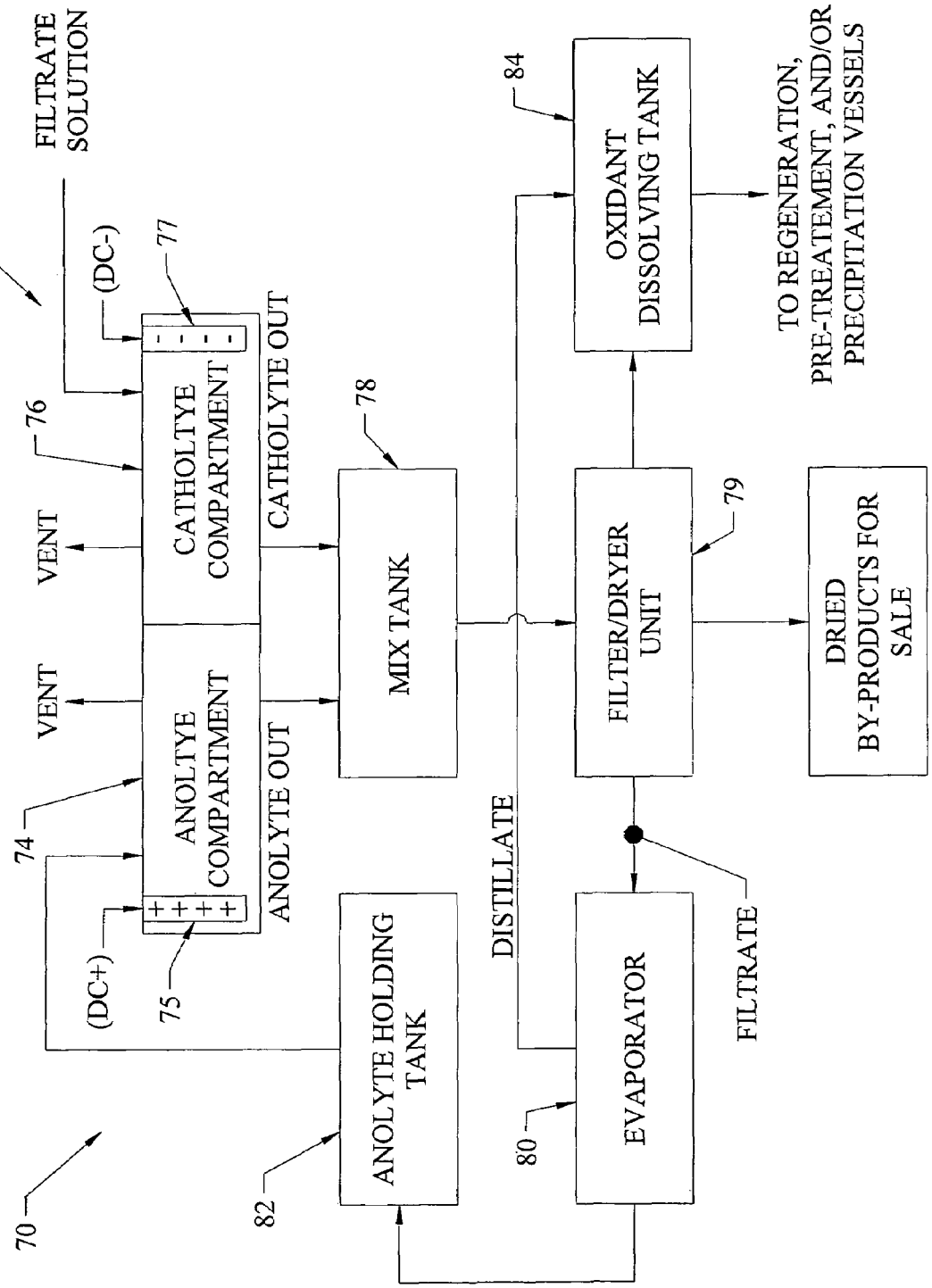
FIG. 10 is a block flow diagram of an electrolytic cell by-products production system and process according to the invention.

As previously mentioned oxidizer or oxidizing solutions can be formed on-site in an electrolytic cell utilizing process streams generated in the methods of the invention. FIG. 10 depicts electrolytic cell 72 used for oxidant production and by-product production along with other beneficial integrated functions that may be used in the Pahlman Process™ Technology or other pollutant removal system. Given the cost of oxidants and the ion values left in the process streams of the invention, it would be useful and highly advantageous to produce oxidants or oxidizers on-site in electrolytic cell 72 and not purchase them for one time use as it would be prohibitively expensive.

As illustrated in FIG. 10, the Electrolytic Cell and By-Products diagram, oxidant production system 70 includes electrolytic cell 72. Electrolytic cell 72 has an anolyte compartment 74 with a vent, a positively charged anode 75, a catholyte compartment 76 with a vent, a negatively charged cathode 77, a diaphragm (not shown) dividing the anolyte compartment 74 and the catholyte compartment 76. Oxidant production system 70 further includes a mixing tank 78, a cooler (not shown), a filter/dryer unit 79, an evaporator 80, an anolyte holding tank 82 and oxidant dissolving tank 84.

Figure 6:
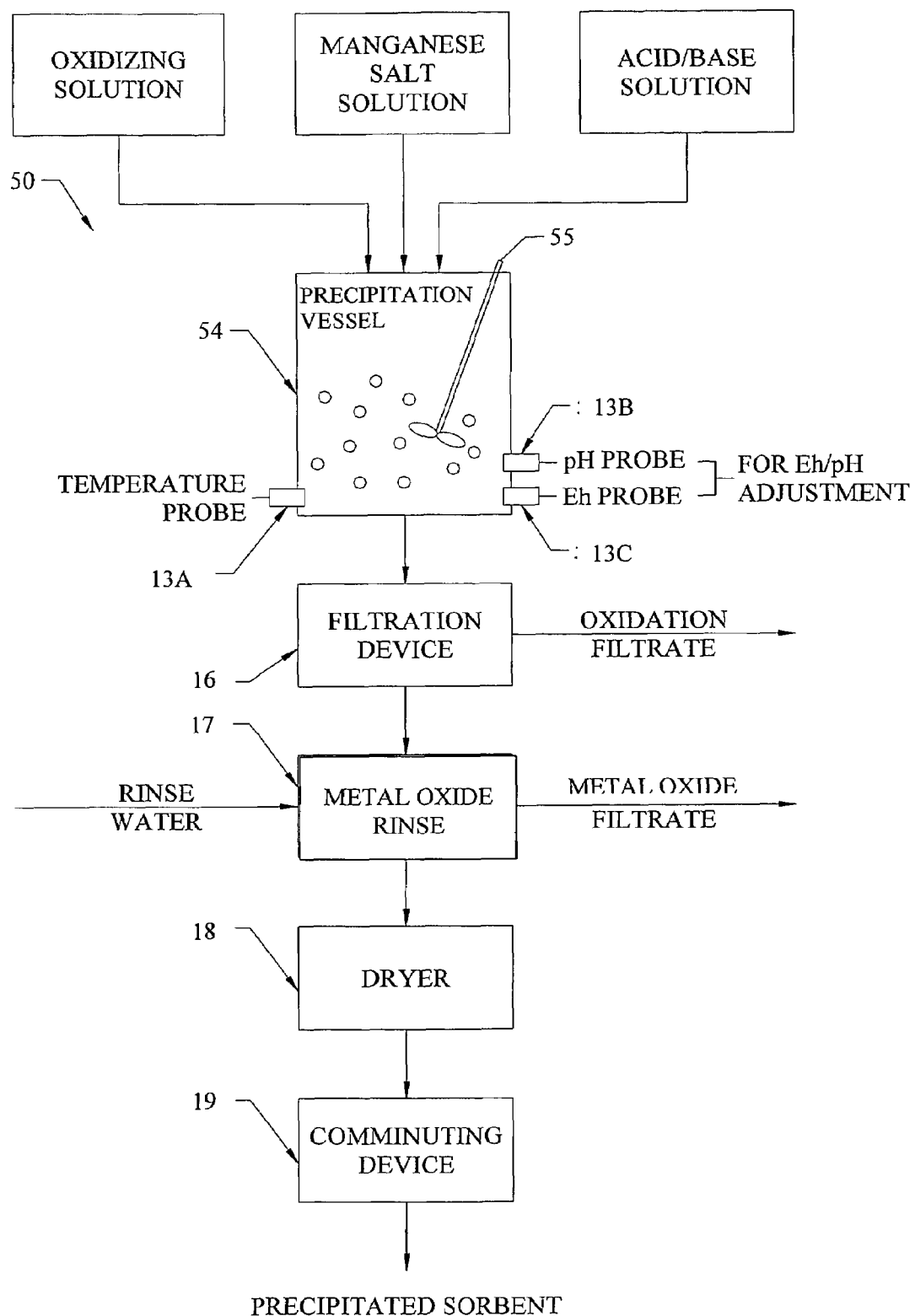
FIG. 6 is a block flow diagram of a system and process according to the invention.
Figure 7:
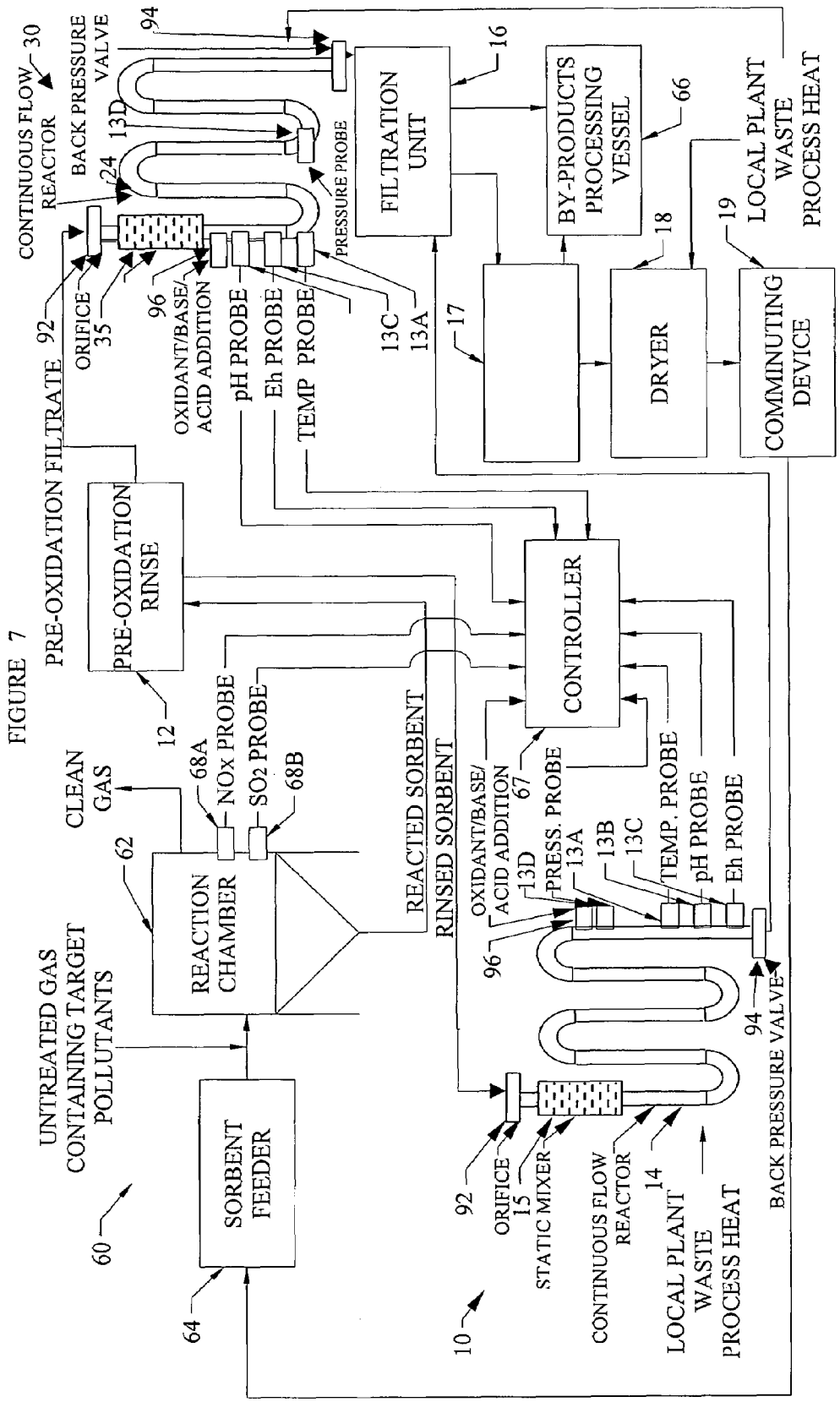
FIG. 7 is a block flow diagram of system and process according to the invention with electronic controls.
Figure 8:
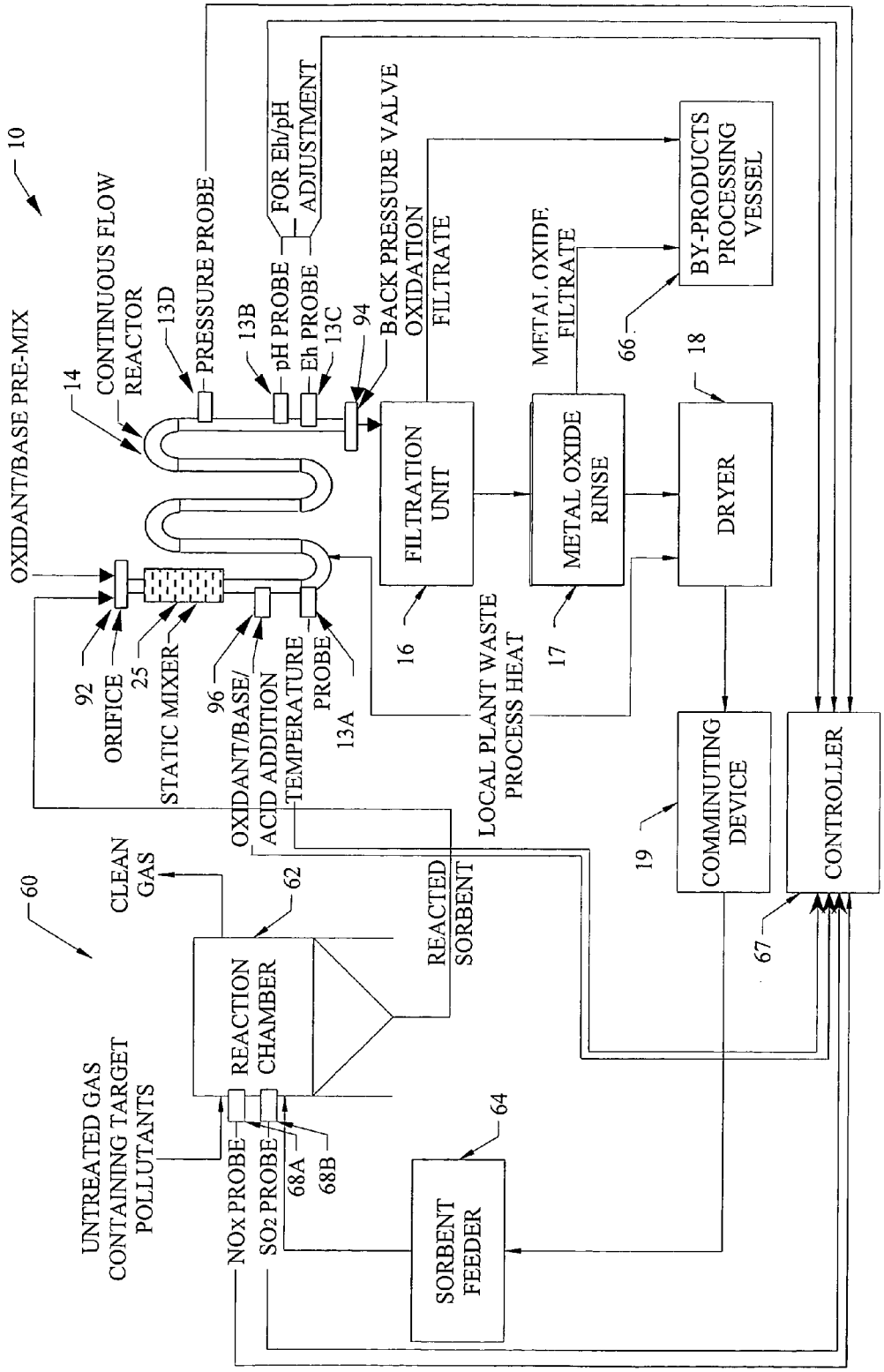
FIG. 8 is a block flow diagram of system and process according to the invention with electronic controls.
Figure 9:
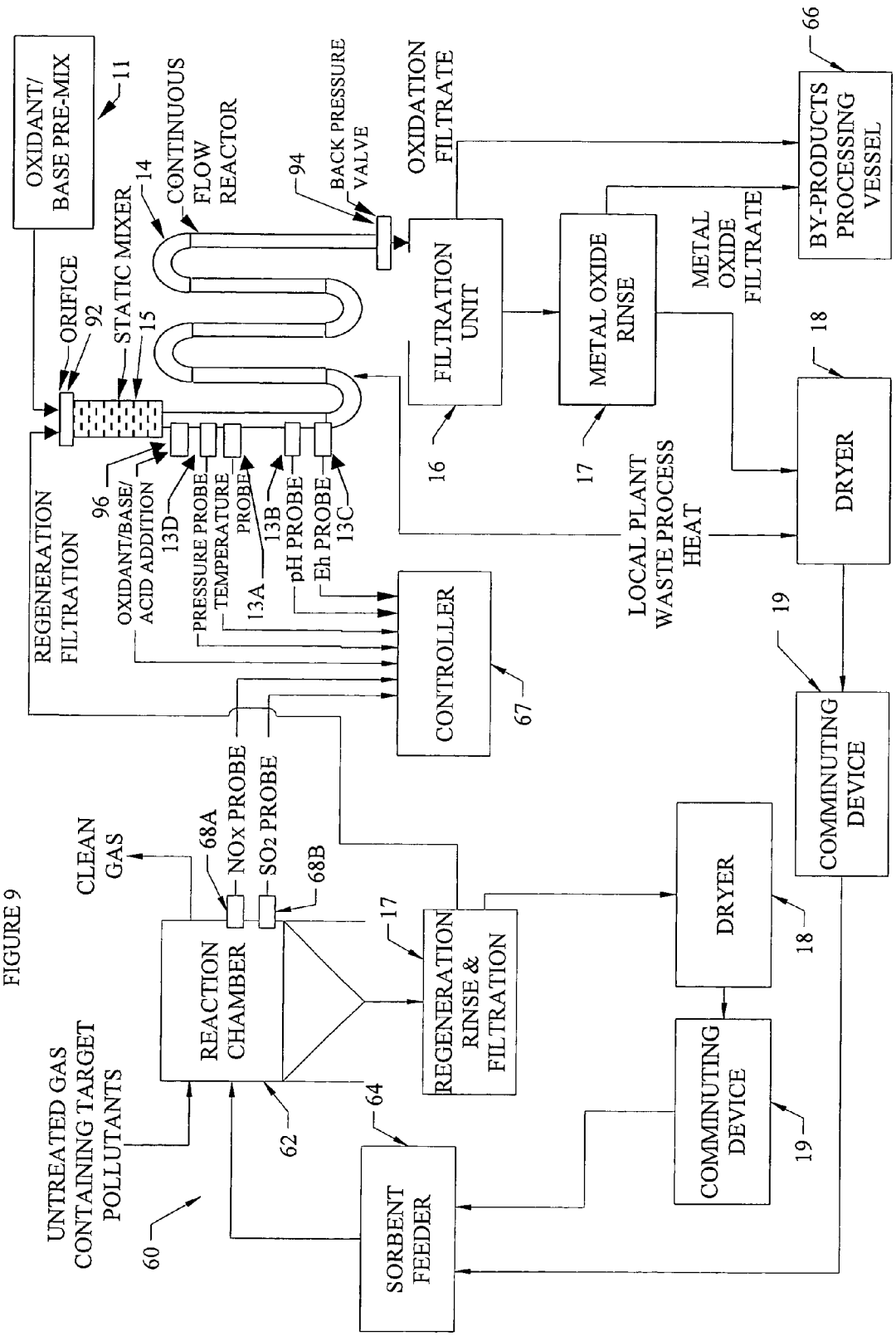
FIG. 9 is a block flow diagram of system and process according to the invention with electronic controls.

Filtrate solutions containing useful values, such as those shown coming from the rinses and filtration units in FIGS. 1-9 and shown being directed to by-products processing vessel 66, in FIGS. 7-9, may contain ions from reaction products, such as sulfates, nitrates, and chlorides, from oxidants, bases and acids, and other constituents such as heavy metals. The filtrate solution, containing sulfate anions for example, is routed to the catholyte compartment 76 where it comes in contact with the cathode 77 that is negatively charged with a direct current (DC) voltage. At the same time, a solution of ammonium sulfate contained within the anolyte holding tank 82 is routed to the anolyte compartment 74 where it comes in contact with the anode 75 that is positively charged with a direct current (DC) voltage.

The ammonium sulfate is purchased and brought in to charge the anolyte compartment and is a closed loop that will from time to time need makeup. In electrolytic oxidation, the sulfate ($SO_4^{-2}$) anion component of the ammonium sulfate $(NH_4)_2SO_4$ within the anolyte compartment 74 is converted to an ammonium persulfate $(NH_4)_2S_2O_8$. Some of the now free ammonium ions migrate across the diaphragm to the catholyte compartment 76. There will be migration or leakage of cations and anions across the diaphragm that is between the positively charged anolyte compartment 74 and the negatively charged catholyte compartment 76. Nearly all the potassium sulfate ($K_2SO_4$) that is formed from interaction between the potassium cation from previous additions of potassium hydroxide (KOH) in the system and the stripped sulfate anion from the manganese sulfate ($MnSO_4$) within the catholyte compartment 76 passes through to the mixing tank 78. There will also be ammonium sulfate or ammonium hydroxide mixed with the potassium sulfate leaving the catholyte compartment 76 depending upon the pH. An acid and or base may be introduced to the catholyte compartment 76 to adjust pH and is also used to adjust mass balances of cations and anions. Heavy metals, such as mercury and arsenic as an example, amongst many other kinds of metals, present in the filtrate will be plated out on the cathode or, depending upon the pH of the solution, could precipitate out as an oxide.

Both the anolyte compartment 74 and the catholyte compartment 76 are continually being filled and continually drained. The anolyte compartment 74 drains into the mixing tank 78 and the catholyte compartment 76 drains into the mixing tank 78. Ammonium persulfate $((NH_4)_2S_2O_8)$ from the anolyte compartment 74 mixes with potassium sulfate ($K_2SO_4$) from the catholyte compartment 76 within the mixing tank 78. The electrolytic cell 72 and the mixing tank 78 are cooled with a cooler (not shown) to around 15° C. Solutions entering and exiting the electrolytic cell 72 will be within a few degrees of 15° C. One may choose to run the electrolytic cell 72 at higher temperatures but there is reduced efficiency. Due to the solubility differences of ammonium persulfate and potassium persulfate it is possible to precipitate out the potassium persulfate as it has a much lower solubility than ammonium persulfate. The liquor containing crystals of potassium persulfate and ammonium sulfate in solution is routed to the filter/dryer 79 and the potassium persulfate crystals are separated from the liquor.

The potassium persulfate crystals may then be dried for sale and a portion of the potassium persulfate crystals may be routed to the oxidant dissolving tank 84. Distillate from the evaporator 80 is routed to the oxidant dissolving tank 84 to dissolve the potassium persulfate crystals and make a solution that may then be routed for use in sorbent regeneration, pretreatment, and or precipitation according to the invention. The solution of ammonium sulfate that has been separated from the potassium persulfate in the filter/dryer 79 is routed to the evaporator 80. Through evaporation, the concentration of the ammonium sulfate is increased to an acceptable point that provides for a high degree of conversion efficiency into an ammonium persulfate in the anolyte compartment 74. The high concentration of ammonium sulfate solution in the evaporator 80 is routed to the anolyte holding tank 82 to be further routed to the anolyte compartment 74 of the electrolytic cell 72 in a continuing cycle. A polarizer may be used in the anolyte compartment 74 to increase anode efficiency such as but not limited to $NH_4SCN$.

During the electrolytic process there is electrolysis of water into hydrogen at the cathode and oxygen at the anode. These compounds will exit the vents of their respective compartments of the electrolytic cell 72. By adjusting the parameters of the electrolytic cell 72, it is possible to decompose nitrate ions $NO_3^{-1}$ and vent them from the electrolytic cell or allow them to pass through the cell unchanged. Other compounds, including but not limited to, chlorides and fluorides that are found in industrial process gas streams that get removed in the sorbent capture and regeneration system may be vented from the catholyte compartment 76 or the anolyte compartment 74 during the operation of the electrolytic cell as a gas or allowed to pass through depending on the operating parameters of the e-cell. This is one way to separate them from the by-products that are being created, although not the only way. This would avoid having to separate anions that are not compatible to by-product operation and sales. It is desirable to use acids and bases that have compatible ions and cations. For example, potassium hydroxide would be used with potassium persulfate or potassium sulfate. Likewise, a compatible acid to go with these would be sulfuric acid ($H_2SO_4$). This greatly aids in by-product separation from pregnant liquors. Other types of electrolytic cells may be incorporated in the process to form oxidants. Such electrolytic cells include, but are not limited to, an undivided cell without a diaphragm which may be used to produce persulfates and other oxidants or a multiple divided cell with several diaphragms may be used. Those skilled in the art of electrolytic cells would be able to select a cell design most beneficial to the particular oxidant being produced, to the economics of production, and to the maintenance requirements.

Applicants use sulfate containing filtrate solution and ammonium sulfates for purposes of illustrative explanation of the operation and method of production in an electrolytic cell. It should be understood that the filtrate may contain different ion constituents from which different oxidants, such those earlier identified herein, may be made. Again, attention to compatibility may ease processing when certain by-products are to be formed.

The above-described oxidant production methods may be combined with other processing steps to produce useful and marketable by-products from the values in the filtrates and rinse solutions routed to a by-products vessel. For example, manganese oxides or useful salts may be produced. The ability to produce oxidants from the process streams may eliminate or reduce cost of purchasing commercially available oxidants for use in the methods of the invention.

A derivation of an electrolytic cell, an internal electrolytic cell may optionally be installed within the tube or pipe of the continuous flow reactor section before the backpressure regulator or similar device and downstream of the static mixer. This optional use of electrolytic cell technology could be applied to all embodiments of the Applicant's invention that utilize a continuous flow reactor for the precipitation regeneration and pretreatment of oxides of manganese. Operation of the internal electrolytic cell would be conducted as one skilled in the art of electrolytic process would have knowledge. There would be cathodes and anodes within the tube or pipe of the continuous flow reactor and, as consistent with the first embodiment, the continuous flow reactor can be maintained and controlled to specific temperature, pressures, pH, Eh, molarities, and viscosity set points that serve to keep the conditions within the continuous flow reactor within the $MnO_2$ stability window and conducive to sorbent flowing through the reactor. The high current directed across the cathodes and anodes helps provide beneficial characteristics to the sorbent particle, increases the yield of $MnO_2$ and increases sorbent loading capacity and/or oxidation strength. A benefit of integrating an internal electrolytic cell into a continuous flow reactor is that less oxidant may be required to provide the necessary solution Eh and oxidant could also be regenerated in situ. An added benefit would be lower equipment costs for moving sorbent and solutions in the process. The polarity of the cathodes and anodes can be reversed at a particular frequency if necessary to prevent and/or release any sorbent buildup; or as in EMD production in electrolytic cells, an automatic electrode cleaning device may be installed.

Use of sonic energy during processing, particularly during precipitation may favorably affect the performance of the metal oxides produced in the various embodiment of the invention. As an example, a custom sonic probe manufactured for the continuous flow reactor was used in one experiment to produce sorbent. A fixed frequency was utilized and sorbent was produced according to the differing embodiments of the Applicants invention. An $MnO_2$ sorbent was produced using potassium as the foreign metal cation. The surface area as measured in square meters per gram according to the B.E.T. method was 373 $m^2/gr$. Producing the same sorbent under the same conditions without sonication resulted in a reduction in surface area to 263 $m^2/gr$. Not to be limited by the example, if the target pollutant capture with metal oxide sorbent is primarily a surface area reaction mechanism than increased surface area would lead to increased sorbent utilization, as is the case in NOx and Sox pollutant capture rates. Sonic energy, as applied industrially, includes the range from ultrasonic, which is short-wave, high-frequency (greater than 20,000 Hz.) energy, to infrasonic, which is long-wave, low-frequency (less than 20 Hz.) energy. All forms of sonic energy are transmitted as pressure waves, and are usually generated by specialized devices or transducers that convert electricity into sonic energy within the desired frequency range.

Industrial applications of ultrasonic energy include agitation of liquid solutions for applications such as solvent parts cleaning for example. Infrasonic acoustic energy, for example, is used to loosen material in dry powder transport systems, to promote smooth flow and prevent stoppage of the material, or to remove filter cake from bag-type filters; it is not typically used in liquid applications. These and other applications of such technology may also be methods of transferring energy to a solution, gas, or solid material, without raising its temperature. Sonic energy can be utilized in embodiments of both batch and continuous flow reactor methods of metal oxide precipitation from a metal salt, metal oxide regeneration, and virgin metal oxide treatment according to the invention.

There are many commercial manufacturers of ultrasonic equipment such as small or laboratory scale ultrasonic equipment like those available from the Cole-Parmer Instrument Company and large scale equipment, such as high pressure and /or high temperature devices available from Misonix.

With the application of sonic energy in the form of ultrasonic or infrasonic waves has improvements in sorbent activity or loading capacity can be achieved. The application of sonic energy during processing of metal oxides may be doing all or some of the following actions: (1) enhancing agitation during sorbent processing in the continuous flow reactor to improve reaction rates and enhance mixing; (2) promoting rapid dissolution of reaction products from loaded sorbent surfaces during regeneration; (3) increasing dissolution rates of chemicals used in the processing of metal oxides; (4) altering structural development of crystal structure during and following precipitation from solution; (5) breaking up large metal oxides crystal formations; and increasing surface area without decreasing particle size. In the methods and systems of the invention, sonic energy would be generated by specialized devices or transducers and directed which may optionally be incorporated into the vessels or continuous flow reactor, for example. Such sonication devices may be used and incorporated into other system components, such as oxidant, acid or base vessels or vessel in which manganese salts are mixed with water prior to precipitation processing.

The precipitation methods of the invention may also be carried out in the presence of a magnetic field to enhance sorbent characteristics. Metal oxides and foreign metal cations have paramagnetic properties that can be manipulated in a magnetic field to enhance or facilitate incorporation of foreign metal cations into the crystalline structure of metal oxides. This may result in high surface areas and greater pollutant capture rates and/or loading capacity, to name a few of the benefits of precipitation in the presence of magnetic fields. The use of magnetic fields may be conducted concurrently along with other process applications or steps, such as sonication by way of non-limiting example.

In addition to forming metal oxides in a continuous flow reactor, Applicants have developed systems for preparing metal oxides of the invention using batch processing system. As further discussed below heated oxidizing solutions having the desired pH-Eh-temperature combination can be prepared and maintained or adjusted by increasing or decreasing oxidizer, acid or base concentrations and/or temperature adjustment, as appropriate, so that the initially adjusted or prepared to be in the polyatomic ion, metal ion, co-precipitation, and/or metal oxide stability area. With monitoring of Eh, pH, and temperature, an operator can make necessary adjustments in order to maintain or return the oxidizing solution to conditions within the metal oxide stability area or co-precipitation stability area. Such monitoring and adjusting can also be automated utilizing electronic probes or sensors and controllers as discussed later herein below.

As discussed with respect to the continuous flow reactor, the batch reaction systems of the invention may be used in regeneration, pretreatment and precipitation of desired metal oxides. Precipitation will be the focus of the discussion of the batch systems, but all of these processes are carried out with the use of similar oxidation vessels; agitation devices and probes for temperature, Eh and ph measurement with which the oxidation vessels are equipped, filtration units, and rinses. The oxidation vessels are also equipped with a heater (not shown in the figure hereof) for adding heat to and maintaining the temperature of the solutions in the vessels. For applications requiring dried oxides of manganese, a dryer would be another common component. And, for applications requiring the oxides of manganese to be comminuted and sized, a comminuting device would be another common component. These components are further discussed herein below.

For this example, manganese will be used as an exemplary metal with the understanding that other metals may be processed with similar attention to stability areas and the other aspects of the invention. Turning to FIG. 6, a manganese salt solution is added to a precipitation vessel 54 that is equipped with an agitator 55, also referred to herein as an agitation means 55. Any of various agitation devices known to those skilled in the art to be suitable for agitating, mixing and stirring the solid-liquid slurries so as to keep the solid oxides of manganese particles that are formed generally suspended in the solution can be utilized. As illustrated in FIG. 6, vessel 54 is optionally equipped with temperature probe 13A, pH probe 13B, and Eh probe 13C. These probes are utilized to measure their respective parameters in the heated aqueous oxidizing solution and may be in electronic communication with a controller to provide automatic control of the system. The manganese salt solution may additionally include foreign metal cations which may be added as other metal salts in the desired concentrations that can either be dispersed through the structure of the primary metal oxide, in this example oxides of manganese, or co-precipitated as a metal oxide compound if conditions are allowed to move into a co-precipitation stability area of oxides of manganese and of the metal or metals of the foreign cations.

In the vessel 54, the manganese salt solution is mixed with a heated oxidizing aqueous solution therein. The heated aqueous oxidizing solution is preferably preheated to temperatures at or near the boiling point of aqueous solutions at atmospheric pressure. For example, at sea level, this would be about 100° C. Precipitation may be carried out at temperatures ranging from about 90° C. to about 110° C., with temperatures between 95° C. to about 108° C. being preferred, and temperatures between about 100° C. to about 105° C. being more preferred at sea level atmospheric pressures. The solution temperature should be maintained unless a temperature adjustment away for near boiling is required in order to maintain the aqueous solution system with the $MnO_2$ stability area as other system parameters shift during processing. The oxides of manganese may also be precipitated within an enclosed system so that the temperature may be increased above 100° C. and the pressure may be above atmospheric. Determining which parameter adjustments to make is a matter of engineering or operator choice and may be based upon economic considerations as long as the adjustment moves system conditions into or maintains those conditions within the $MnO_2$ stability area.

For the manganese salt solution, the heated aqueous oxidizing solution provides the required electrochemical (oxidizing) potential (Eh), within the specified temperature and pH range to yield precipitated oxides of manganese having high loading capacities and/or high oxidations states. Under agitation, the slurry formed in the precipitation vessel 54 is continuously mixed and the pH of the slurry is adjusted by appropriate means, e.g., addition of acid or base. The precipitated oxides of manganese are allowed to remain within the slurry for a time sufficient to achieve an increased oxidation state and/or a target pollution loading capacity equal or greater than that of virgin oxides of manganese. At or near the sea level atmospheric pressures, a sufficient time may be between about a couple of minutes to about 70 minutes or more, preferably between about 1 minute to about 45 minutes, and more preferably between about 1 minute to about 10 minutes. This time may vary in enclosed systems operated at temperatures above 100° C. and pressures above atmospheric. Such processing times are rapid compared to the hours and tens of hours of sometimes staged processing of prior art methods. At atmospheric pressures, Applicants have found that an optimal time for the solid rinsed oxides of manganese to remain in the precipitation vessel 54 is approximately 10 minutes, during which time the precipitated oxides of manganese are oxidized up to valance states close to +4. A deviation of two to three minutes above or below 10 minutes is near enough to optimal to provide precipitated oxides of manganese having oxidation states and/or loading capacities particularly suitable for use as a sorbent for target pollutant removal and other useful applications. It being understood that with greater deviations from the optimal time but yet within the above stated time ranges oxides of manganese suitable for pollutant removal (particularly when high loading capacity is not required) and for other uses may nonetheless be produced with the invention.

Once the metal oxides are removed from the batch reaction system oxidation vessel they may be processed in the same way as described above with respect to the metal oxides produced in the continuous flow reactor.

Embodiments of the methods of the various embodiments of the invention involve and employ Applicants' recognition that metal oxides processed in aqueous systems in which conditions and parameters are adjusted and maintained within the metal oxide stability area will yield metal oxides having high pollutant loading capacities and/or high oxidation states. Further, they employ Applicants' recognition that the desirable characteristics of metal oxides processed according to embodiments of the methods of the invention can be beneficially manipulated or adjusted with introduction of foreign cations into process solutions. The use of foreign metal cations in the sorbent precipitation methods of the invention lead to incorporation of these cations into the structure of the oxides of manganese and can change sorbent characteristics such as particle size, shape, bulk density, surface area (BET), pore volumes, porosity, crystalline structure, morphology, electrochemical or oxidation potential, valence state, and other sorbent characteristics beneficial to the removal of target pollutants. This is illustrated in later discussion of Example 1 and Table 2 below. More than one foreign metal cation maybe used depending upon the characteristics that are required in an application. Thus, with the methods of the invention, metal oxides can be engineered for optimal or specific requirement in different applications.

In its various embodiments, the invention and the methods and systems thereof also provide for rapid, adaptive and stable processing of metal oxides incorporating foreign cations; more specifically they provide for the precipitation of such metal oxides. Metal oxides thus processed are suitable for use as a sorbent in dry and wet gaseous pollutant removal systems, aqueous pollutant removal systems, respirators, batteries, and other applications demonstrated by Applicants or known to those skilled in the art.

Without being bound by theory, Applicants believe that processing metal oxides according to the invention in a heated aqueous oxidizing solution system maintained within a metal oxide stability area or co-precipitation stability area may beneficially affect a number of characteristics of the oxides of manganese, as an example. Such characteristics include, but are not limited to, particle size and shape, crystalline structure or morphology, porosity, composition, surface area (BET), bulk density, electrochemical or oxidation potential and/or manganese valence states. Some or all of these characteristics affect the performance of oxides of manganese in their various uses and, particularly, in their use as a sorbent for removal of gaseous pollutants.

Further, Applicants believe that with the introduction of foreign cations, metal and/or non-metal, into oxides of manganese, the characteristics can be further enhanced, adjusted, controlled or engineered. Foreign metal cations useful in the precipitation and co-precipitation of oxides of manganese according to the invention include, but are not limited to, those metals known as representative and transition metals, such as iron, titanium, barium, lithium, magnesium, sodium, potassium and aluminum, to name a few. Further, rare earth metals, alkali metals, noble metals and semi-conductive metals may also be processed in the methods and systems of the invention. Metal cations particularly useful in the co-precipitation method of the invention are those that enhance the removal ability of a first metal oxide or that themselves form stable metal oxides, second or other metal oxides, which in turn, preferably but not necessarily, form either soluble or thermally decomposable metal salts when reacted with target pollutants in a gas stream. Metal oxides that can yield reactions products with these desired properties include, but are not limited to, both representative metals and transition metals. Of, the transition metals those from the fourth period of the periodic table are particularly well suited. Suitable metal oxides include, but are not limited to, oxides of any one of the following metals: magnesium, calcium, scandium, chromium, manganese, iron, nickel, copper, zinc, aluminum, yttrium, rhodium, palladium, silver, cadmium and combinations thereof. These and other metals may form high valence metal oxides themselves or be integrated into the lattice structure of a primary metal oxide through controlled addition during embodiments of methods of the invention. If the foreign metals are not oxidized to a high valence state, they may still be useful as foreign metals in a hydroxide or lower valence metal oxide form. Other metals that may be useful in some form as a foreign metal include but are not limited to cobalt, platinum, molybdenum, vanadium, and nickel.

Other metals may be integrated with the primary or first metal oxides of embodiments of the invention in at least two ways: co-precipitation and through the controlled introduction of foreign cations into the metal oxides. Co-precipitation refers to precipitation of at least first and second metal oxides as a metal oxide compound. To accomplish this, solution conditions described in embodiments of the methods of the invention relating to metal oxide production are maintained in a region on the appropriate Pourbaix diagram where the metal oxide stability area of a first metal oxide overlaps with the metal oxide stability area or areas of one or more other metal oxides.

Figure 14:
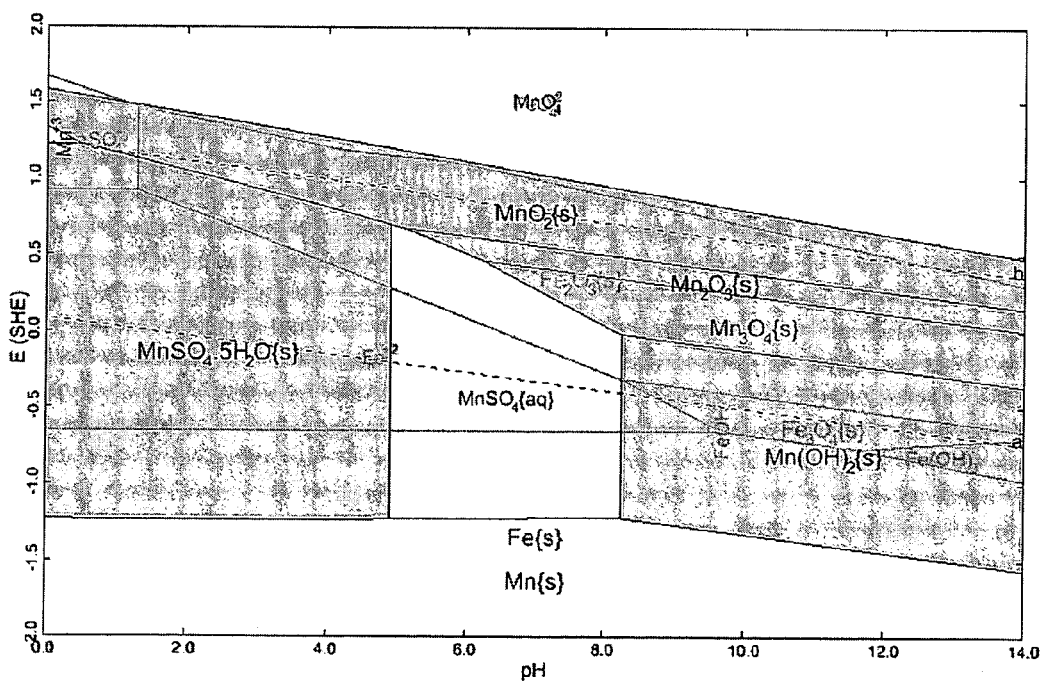
FIG. 14 is a Pourbaix diagram for a manganese-iron-water system.
Figure 15:
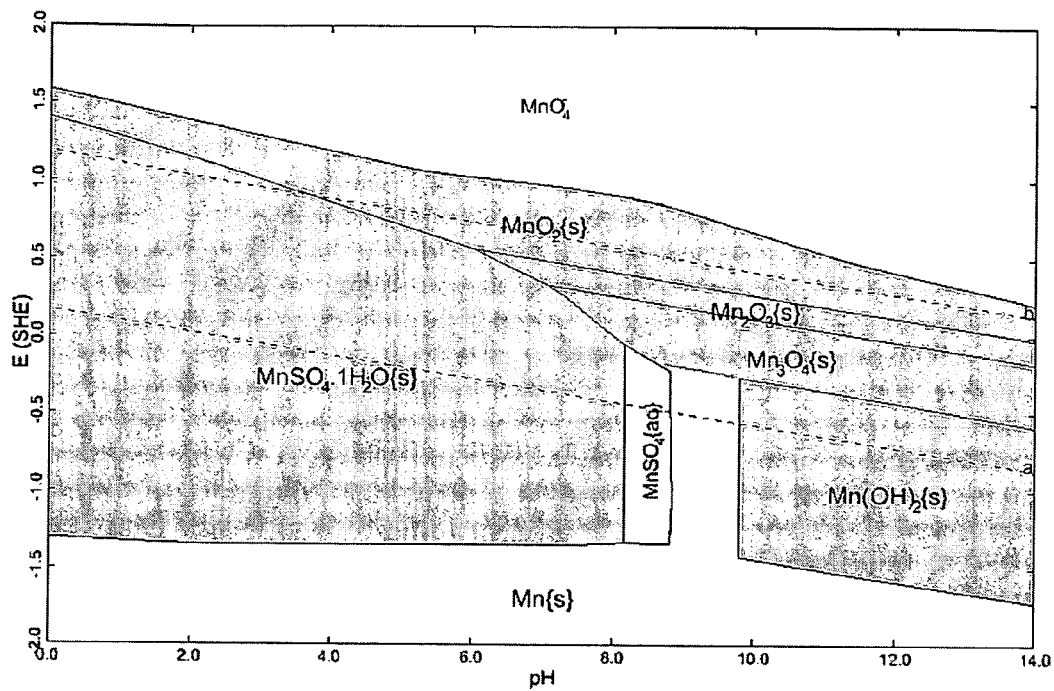
FIG. 15 is a Pourbaix diagram for a manganese-water system.
Figure 16:
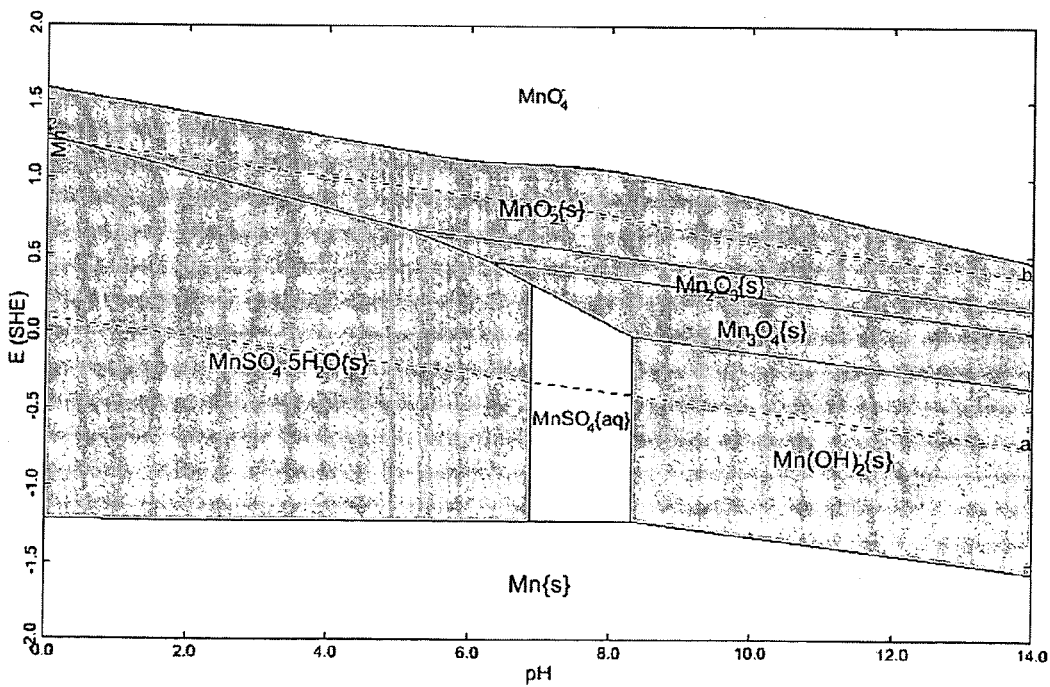
FIG. 16 is a Pourbaix diagram for a manganese-water system.
Figure 17:
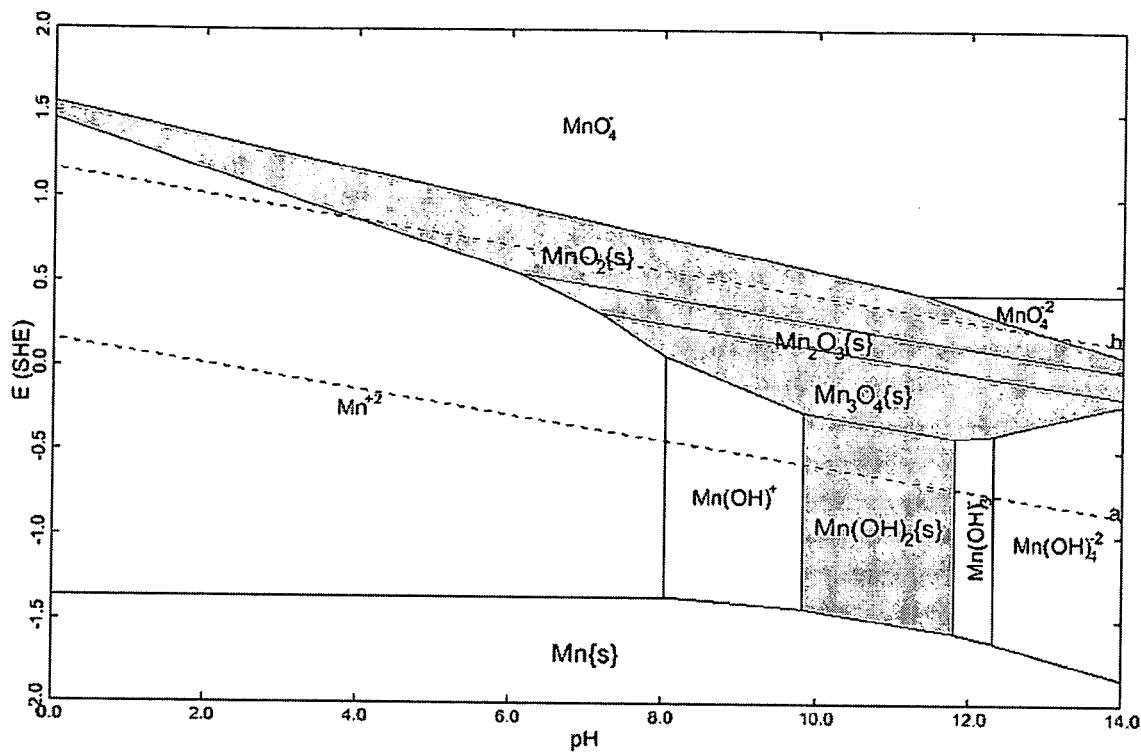
FIG. 17 is a Pourbaix diagram for a manganese-water system.

With reference to FIGS. 12-14, if one were to use iron and manganese, for example, there is a portion of the iron oxide ($Fe_2O_3$) stability area in its Pourbaix window of FIG. 13 that will also overlap the $MnO_2$ stability area in the Pourbaix window for $MnO_2$ of FIG. 12. The area of overlap is the co-precipitation stability area and can be seen in FIG. 14 as delineated by a light or gray line above "$MnO_2\{S\}$" and the lower dark or black line below "$MnO_2\{S\}$". More than one other metal cation can be used and multiple other metal oxide stability areas can be overlapped if one wants to form a metal oxide compound of more than two metal oxides, have more than one other metal oxide precipitated along with the first metal oxide. As an example, one may use aluminum and iron when co-precipitating $MnO_2$. These and other metal oxides may also be used as a substrate onto which $MnO_2$ or other metal oxide is precipitated and supported. When $MnO_2$ is precipitated onto a substrate such as particles of a second metal oxide, the substrate is added into the metal salt mixture from which the metal oxides are precipitated. Alumina or other metal oxides substrates of various sizes and shapes, e.g., particles, pellets or other structures may be used as substrates. The substrates may be mixtures of more than one metal oxide. Additionally, the substrate may be a filter medium or other structure that may be utilized for pollutant removal in different pollutant removal systems employing such filter media or structures, e.g., aqueous filtration systems for industrial or residential applications or respirators.

The incorporation of foreign metal cations occurs when foreign metal cations are bound within the primary metal oxide crystalline structure during precipitation. Sorbent particle size may also be controlled by using different foreign metal cations in the sorbent regeneration process as their presence in the solution and within the metal oxide crystalline structure can impact sorbent particle size. The atomic radius differs between metal cation species resulting in differing particle sizes in the oxides of manganese into which they are incorporated. Also, when spray dryer or spray injection type feeders are used in a gaseous pollutant removal system, adjusting nozzle atomizing air can produce different sorbent particle sizes. The use of foreign metal cations may provide for an increased utilization of the sorbent for gaseous or aqueous target pollutant removal, respirator applications, batteries, and other applications for metal oxides. It is also recognized that the presence of a foreign metal cation in the precipitation solution, while not necessarily being captured within the primary metal oxide structure, may nonetheless caused increased utilization due to its reactivity or presence within the combined mixed processing solution during precipitation. Increased utilization can be achieved by selecting which foreign metal cation or cations to use and/or increasing the amounts of the particular metal cations used within the metal oxide structure. Foreign metal cations can increase the reactive properties of the sorbent that are directly related to capturing targeted pollutants or sorbent utilization in other applications.

One example of the utility of foreign metal cations is the use of oxides of manganese in gaseous pollutant removal. By inserting specific foreign metal cations, such as titanium, into the $MnO_2$ structure the utilization ratios between $SO_X$ and $NO_X$ can be changed. The $NO_X$ utilization can be increased without increasing the $SO_X$ utilization. Thus, sorbent can be selectively engineered to increase its utilization or affinity for different pollutants, and may be selectively engineered to decrease its affinity or utilization for different pollutants. This makes for a more cost efficient pollution control system as depending upon what pollutants are to be captured. The pollutant with the lowest utilization will be the controlling factor in determining how much sorbent is used in the system. This will affect component sizing, thus reducing capital, and O & M costs. Selective engineering may also be advantageously utilized in dual-stage or multi-stage removal systems where different pollutants are to be serially removed in different reaction zones and other applications not limited to gaseous pollutant removal.

In further embodiments, metal oxides are precipitated onto substrates according to the processing methods disclosed herein. These substrates could be chemically active or inert. Substrates useful in embodiments of the invention include, but are not limited to, activated alumina, activated carbon, silica, resin beads, and other metal oxides. The precipitation can take place in a continuous flow reactor or a batch reactor system. The substrate may be added to the metal source solution and acts as a seed surface upon which metal oxides may precipitate. The metal oxides may form as layers on the surface of the substrate, a solid-solid mixture of substrate and metal oxides on the surface of the particle, or a solid-solid mixture substantially throughout the produced particle. More than one substrate may be used at one time, and one or more substrates may be used with one or more metal oxides that are co-precipitated with attention to a co-precipitation stability area and/or with foreign metal cations that are introduced into the metal oxide in a controlled fashion.

One example of a useful application of substrates with the metal oxides of embodiments of the invention is the precipitation of oxides of manganese onto activated carbon for use in aqueous treatment media. The activated carbon in this example may act as a seed surface on which the precipitated oxides of manganese form. It is believed that oxides of manganese may form as a layer on the surface of the particle, a solid-solid mixture of activated carbon and oxides of manganese on the surface of the particle, or a solid-solid mixture substantially throughout the produced particle. This is largely dependent on the porosity of the original particle, the concentration of the manganese salt solution, and the reaction kinetics as influenced by the various reaction parameters. The resultant precipitated oxides of manganese whether dried and comminuted, utilized as a filter cake or slurry, or compacted into a solid contactor element and dried will have high or increased loading capacities and/or valence state that are equal to or greater than that of commercially available NMD, EMD and CMD. The precipitated oxides of manganese will also have a second active sorbent incorporated therein that may be active in removing other pollutants in aqueous streams known to be removed by activated carbons.

In another embodiment of the invention, the wet metal oxides may be compacted into a solid contactor element and then dried rather than being dried and comminuted after production. This compaction could occur after filtration but while surface water is still present on the wet metal oxides. An exemplary method of compacting the oxides of manganese is to feed the wet solid particles into an extrusion die and force them through the die with a feed screw. A feed screw may be a conveyor comprising a solid core and coaxial helical flights.

The extrusion die could be of any cross-sectional size desired, and a hollow cylindrical extrudate could be produced by having a cylindrical element extend through the die from the core of the feed screw. The extrusion die is preferably constructed of a hard material to resist abrasion by the metal oxides, and is preferably polished to a smooth finish for minimizing friction resistance while compacting the material. Backpressure to improve compaction of the material could be provided by designing the die with a slightly decreasing cross-sectional area to provide for compaction of the material as it passes through the die. Alternatively, backpressure could be provided by elements external to the die that restrict the movement of the extrudate from the die. Examples are rollers that apply resistance, strap arrangements that can be controllably constricted around the extrudate, or a controllable compression donut, each of which can control the rate of extrudate leaving the die and thus the compression pressure within the die. Alternatively, a feed auger that forces the material to be compacted into the feed screw could be used in conjunction with, or instead of, the exemplary backpressure controls just described, or others, to apply and control pressure within the extrusion die.

The compression of the material may be optimized around several performance parameters. First, the material should be sufficiently compacted so as to meet the demands of handling and the filtration environment without unacceptable levels of mechanical breakdown or sorbent attrition in the process. The material must also be sufficiently compacted so as to prevent channeling through the solid contactor element that would result in pollutant bypass or breakthrough and underutilization of the sorbent within the solid contactor element. Finally, the material must not be compressed to the point that its porosity is too low. This may result in excessive pressure drop across the solid contactor element, which can create excessive energy demand and operating cost, capital cost associated with more powerful pumps, and mechanical breakdown of the solid contactor element itself due to the pressure exerted upon it.

Factors that influence the ability to meet solid contactor element performance expectations with an extrusion type contactor include extrusion rate, heating and cooling rate, if applicable, dimensions of the extruder screw and die, intrinsic backpressure in the die, externally applied backpressure or feed pressure, particle size and crush resistance of the various materials, and others which will be obvious to those skilled in the art.

Alternatively, the metal oxides could be compacted by use of a pressurized mold or press combination. A hollow mold with an interior that is the desired shape of the solid contactor element is employed. The hollow mold has at least one opening. This mold may be filled with material to be compacted. A powered press sized to a tight tolerance with the mold opening compresses the material to form the solid contactor element. The solid contactor element can then be removed from the mold. Alternatively, the mold may be sized larger than the size of the ultimately produced solid contactor element. In this case the product of the mold may be machined to the desired shape, on a lathe for example.

Exemplary mold press operations include vertically oriented molds that are filled from the top and compressed from the top by the press. After compression the solid contactor element is ejected out the top of the mold by an ejector located at the bottom of the mold. In these embodiments, the mold diameter may be slightly larger at the top to allow for ejection of the molded product. Alternatively, horizontally oriented molds may be used that have openings on the top for addition of material. The mold also has a horizontally disposed opening through which the press enters. The press enters the mold from the side and pushes the material past the top opening, effectively closing off the top opening, and into a horizontally disposed mold where it is compressed. As the press is retracted the solid contactor element is pushed out of the mold and the next batch of material enters through the now open top opening.

If the metal oxides to be compacted contain excessive water, provision may be made in the compaction process for water removal. This may be accomplished through submicron sized holes in the extrusion die or compression mold. It may also be accomplished by a progressive sequence of compression through a die or a compression mold, a drying step, and then further compression. This sequence may be repeated if necessary. After the oxides of manganese are compacted, by whatever means, they may be further dried to form a solid contactor element.

A solid contactor element can be used in conventional water filtration systems, water bottles, or other applications and provides a convenient means to install and replace filtration media comprising highly active metal oxides. The filter element also provides for a simple pollution removal system with little to no migration of the sorbent through the treated water system due to the high mechanical integrity of the solid contactor element. Solid contactor elements can alternatively be formed with additional sorbent constituents with the metal oxides acting as a binder, from dry particulate metal oxides and an added binder, or from particulate metal oxides, additional sorbents, and an added binder and/or reinforcing materials as enabled by examples described below.

It has been found that the co-precipitation of foreign metal cations as described above can enhance the formation of a solid contactor element consisting essentially of metal oxides. Also, by inserting a specific metal cation into the metal oxide structure different adhesive qualities can be achieved. Sodium as an example yields a much more dense and hard solid contactor element than potassium. One may also achieve various ranges of compactness and adhesiveness by changing the amount and type of metal cation. Porosity, adhesiveness of materials used, hardness, brittleness, ductility, potential for material contraction, amounts and types of pollutants captured, and other parameters may be controlled by amounts of activated metal cations coprecipitated with the metal oxides used to make solid contactor elements. Similar changes in physical properties can be controlled by adding other constituents as described below in combination with coprecipitated foreign metal cations. Also, the precipitation of metal oxides onto active or inactive substrates allows for control of the same physical properties of the solid contactor element and may be used in combination with coprecipitated foreign metal cations and/or other added constituents to effect changes in physical properties.

In another embodiment, a separate binder may be added to dry or wet particulate metal oxides or sorbent mixtures. In one embodiment the binder could be a thermoplastic that is mixed, in particle form, with the particulate sorbent or a sorbent mixture. This mixture is then compacted as described above or in any other way known in the art. During the compaction, the temperature may be raised enough to melt the thermoplastic but not so high as to decompose or otherwise impact the desirable characteristics of the sorbent or other elements in the mixture. As the compacted filter element is formed it is cooled to set the thermoplastic and form a solid contactor element impregnated, or largely consisting of, metal oxides or a mixture of metal oxides and other sorbents. Suitable thermoplastics for use in this process include, but are not limited to, polyolefins such as polyethylene, polypropylene, polybutene-1, and poly-4-methyl-pentene-1; polyvinyls such as polyvinyl chloride, polyvinyl fluoride, and polyvinylidene chloride; polyvinyl esters such as polyvinyl acetate, polyvinyl propionate, and polyvinyl pyrrolidone; polyvinyl ethers, polyvinyl sulfates, polyvinyl phosphates, polyvinyl amines; polyoxidiazoles; polytriazoles; polycarbodiimides; copolymers and block interpolymers such as ethylene-vinyl acetate copolymers; polysulfones; polycarbonates; polyethers such as polyethylene oxide, polymethylene oxide, and polypropylene oxide; polyarylene oxides; polyesters, including polyarylates such as polyethylene teraphthalate, polyimides, and other thermoplastic derivatives that are preferably solid at room temperature. Alternatively a tackifier or liquid adhesive could be used in addition to or instead of a binder.

In another embodiment the solid contactor element may also be formed with other useful constituents included in the element. Examples of these include, but are not limited to activated carbons and aluminas, which may be added to act to remove additional pollutants; fiberglass, carbon, and other fibers to reinforce the structure; silica gel; and metallic particles such as iron, stainless steel, copper, aluminum, for example. Other examples include ion-exchange resin, ceramics, zeolites, diatomaceous earth, particles of resins and plastics such as polycarbonate, and non-thermoplastic polymer particles and fibers.

During the formation of solid contactor elements of the various types described, the compactor system may optionally include a means to mix the material to be compacted, a preheater or precooler to control the temperature of the material being fed to the compactor, heaters and/or coolers along the extrusion die or within the mold to control the temperature of the material as it is being compacted. Exemplary compactor systems may also include a bin to store the material that is to be fed into the feed screw or mold, and/or a feed auger to force material from the bin into the compactor feed screw or mold. These exemplary elements apply to the exemplary extrusion type compactor and the mold press compactor described above and should not be construed to limit the type of compactor employed in practicing methods of this invention to a certain type of compactor or to a compactor with certain elements.

In yet another embodiment of the invention, the metal oxides formed as described herein may be used to remove metals and other contaminants from aqueous streams or solutions such as drinking water supplies or processing streams. This invention relates in part to removal of metals from aqueous solutions using oxides of manganese or other metal oxides prepared according to the methods of the invention, e.g., oxides of iron, titanium, or aluminum to name but a few. These solutions may be drinking water supplies, industrial process or waste streams, or any aqueous medium where pollutant removal is desired. The sorbent synthesized or regenerated can be used as the removal medium by itself, it may be precipitated onto and/or within an inert substrate or another active sorbent substrate such as activated carbons or activated aluminas, it may be precipitated on a different metal oxide, or it may be co-precipitated with one or more different metal oxides. This allows exploitation of desirable sorbent particle characteristics such as surface area, pore size and volume, oxidation strength, and also allows the use of foreign metal cations which are either bound within the metal oxide structure or co-precipitated as a secondary oxide or as a substrate to enhance certain characteristics of the metal oxides when used in aqueous filtration systems. These beneficial characteristics lead to increased oxidation potential, amongst many other characteristics, for the metal oxides used in industrial and chemical applications. This includes the capture and removal of target pollutants, such as arsenic, lead, copper, chromium, to name but a few, in aqueous filtration systems utilizing metal oxides of embodiments of the invention as a sorbent. The precipitation of the sorbent onto and within another active sorbent also allows for the simultaneous removal of metals, for example by an oxides of manganese sorbent, and organic pollutants, for example by an activated carbon substrate.

Other embodiments of the invention and the methods and systems thereof provide for precipitation of highly active metal oxides such as oxides of iron and oxides of magnesium, for example, onto and/or within inert or active sorbent substrates. The precipitation of oxides of manganese onto and within another active sorbent granule, for example activated carbons or activated aluminas, allows for the simultaneous removal of metals that are removed by the metal oxides and organics that are removed by the activated carbon, for example.

In yet other embodiments of the invention, metal oxides are formed into an active solid contactor element that may be installed as a unit in and aqueous filtration system. This solid contactor element may be formed by compacting the sorbent itself into a filter element, compacting the sorbent with other active sorbents into a solid contactor element, or compacting the sorbent with a binder or tackifier material, possibly also with the inclusion of other active sorbents or reinforcing materials, for example.

With respect to the target pollutant arsenic, arsenic is found in water in two common forms or species, arsenite ($As^{+3}$) and arsenate ($As^{+5}$). Arsenite is the most difficult to remove in conventional systems, and a feature of the sorbent of the present invention is that its high oxidation capability converts arsenite to arsenate which is more easily removed from the water. This oxidation capability of the sorbent is useful in removing many metals from aqueous streams, arsenic being only exemplary. There are several technologies that can be used to achieve the new maximum contaminant level (MCL) for drinking water but many are effective for removal of only one of the arsenic species. With the use of sorbent formed according to the methods of the invention, Applicants have been able to effectively remove both of the two common arsenic species. Applicants have achieved arsenate and arsenite removal rates in excess of 95% for both species with sorbents prepared according to embodiments of the methods of the invention. Exemplary removal rates for iron-based and manganese-based sorbents produced in accordance with embodiments of the invention are displayed in Table 1.

TABLE 1

| Sorbent | Arsenic Species | % Removal |
| --- | --- | --- |
| Iron-Based | $As(+3)$ | >98.6% |
|  | $As(+5)$ | >98.4% |
| Manganese-Based | $As(+3)$ | >95.5% |
|  | $As(+5)$ | >98.4% |

In addition to removing both arsenic species and at higher removal rates than conventionally achieved, the processes of the invention have created sorbents that have the demonstrated ability to remove arsenic and hardness minerals to a level heretofore unachieved.

The metal oxides may be contacted with the metal or pollutant containing aqueous stream or medium in a number of fashions. For example the metal oxides particles can be fluidized or suspended in the aqueous medium within a continuous reactor. Such a reactor could be a vertical vessel with an inlet at the bottom for the metal containing water. The inlet could be configured so that the water enters the vessel at a high-velocity through a diffuser that creates a turbulent zone in the bottom region of the vessel. Metal oxides may be added to the vessel as a particulate powder but are preferably added as a slurry near the bottom of the vessel. The turbulence created by the aqueous stream entering through the diffuser suspends at least some of the metal oxides in the solution. The suspended metal oxides may create a fluidized bed in the lower portion of the vessel.

A clear water overflow could be located sufficiently high on the vessel such that the suspended metal oxides have disengaged from the water flow and clear water can overflow substantially free of entrained metal oxides. This is easily accomplished by optimizing the diffuser design, the cross-sectional area of the vessel, and the sorbent particle size as described above such that the velocity in the upper portion of the vessel is low enough that the metal oxides do not remain entrained. The so-called clear water overflow may have sorbent that carries over and that is then removed from the water stream by any solid-liquid separation technology known in the art.

Fresh sorbent can continuously be added to the vessel as just described, and reacted sorbents can continuously be removed from the vessel through an outlet located low enough in the vessel as to be in the fluidized bed portion. This stream may be continuous or intermittent and the oxides of manganese or other metal oxides and water may be further processed through filtration, centrifuging or other conventional solids/liquids separation process. The spent sorbent can be regenerated as described above. The system here is described as having one vessel, but there could be any number of vessels involved, in series or in parallel. A second vessel in series is an effective way of ensuring adequate disengagement of the metal oxides from the treated stream, for example.

The removal system could have a once-through flow of water with the water stream entering through the diffuser, contacting the sorbent, and leaving the vessel as a treated stream. The system could also be configured with a recycle loop so that water is taken from the vessel at a point above the zone containing the suspended sorbent and recycled through the diffuser. This recycle loop could also take water from the zone with the suspended sorbent since, aside from erosion impacts on equipment such as the pump and diffuser, it is not important that the recycle stream be essentially free of sorbent. This recycle stream could be useful in controlling the water velocity in the vessel during fluctuations in flow of the water stream to be treated. The recycle allows the operator to control the velocity of the water entering the vessel such that the velocity is high enough to suspend the sorbent and allow for sufficient contact of the sorbent with the target pollutants and low enough that there is not excessive carryover of sorbent with the treated stream.

While continuous reactors as just described may be used with the invention, it is also possible to batch treat water by adding the water to be treated and the sorbent to a vessel. The contents of the vessel can be agitated or stirred to provide adequate contact between the sorbent and the target pollutants in the aqueous. After a sufficient reaction time the treated water may be separated from the particulate sorbent by decanting, filtering, microfiltration, centrifuging, or by other solid/liquid separation means known in the art.

For some applications, the sorbent may be precipitated onto filters or other structures. Further, the sorbent may be provided in pellet or other forms much larger than fine powders or particulates. The sorbent maybe employed in a fluidized bed much like sand beds used in current water filtration plants. Systems that incorporate filters or those systems that do not have filters can be retrofitted to incorporate sorbent imbedded within a filter fabric or within a canister type filter. Filtering systems may be multiple stages such as carbon followed by sorbent to allow for multiple pollutants to be removed. This is of particular advantage for home point-of-use devices such as faucet attachments or shower attachments. Another application would be portable water bottle filters. These may also be multiple-stage filtration. For example, water maybe passed through a carbon stage followed by a sorbent stage and then a membrane type stage for filtration of microbial bacteria such as *cryptosporidium* or *giardia*. Sorbent may also be injected into the filtration pipe and allowed to contact pollutants within the water stream and then subsequently be filtered out and regenerated. Thus, sorbents formed by the processes of the invention may be utilized in a variety of commercial, industrial and residential applications in filtration systems known to those skilled in the art. Sorbent may also be formed into a solid contactor element comprised entirely of sorbent creating a heretofore unavailable product. Alternatively sorbent may be formed into a composite solid contactor element comprising one or more sorbents, a sorbent with a binder material, sorbent with a reinforcing structural material, or any combination of these elements and/or others described below. An example of a solid contactor element is a replaceable cartridge in a filter housing. A solid contactor element may be conceivably of any size, from several feet in diameter for industrial applications, to a size useful in a personal water bottle, to an even smaller size useful in laboratory equipment, for example.

In addition to such liquid-solid contactors as fluidized beds and batch vessels, the invention may also use fixed bed systems to remove target pollutants from water. Such a fixed bed system is well known in the art, and usually includes a vessel, a bed of the sorbent within the vessel, and a means of support for the sorbent bed. The water to be treated enters the vessel, passes through the bed where target pollutants are captured by the sorbent, and emerges from the vessel as a treated stream.

Fixed bed contactors often include, depending on the target pollutants to be removed, several different beds of sorbent or filter media. Such a contactor is referred to as a multi-media filter, even though chemical reactions, absorption, adsorption, and other interactions as well as physical filtration may be occurring. There may be, for example, a bed of ordinary sand as the first bed contacted by the water for removal by filtration of suspended solids. There may also be a bed or beds of activated carbon, activated alumina, or other media useful in removing unwanted constituents from an aqueous stream.

Fixed bed contactors may also employ sorbent material with a larger nominal size than the sorbent itself. This can be accomplished by forming solid contactor elements through compaction as disclosed above and loading several of them into a vessel to form a bed. As an example only, extrudate cylinders approximately 5/16" in diameter and 5/8" long could be formed by the compaction process previously described and loaded into a vessel to provide an easy to handle material which results in low overall pressure drop through the vessel due to the void spaces created by the larger particle size. Particles of this size and configuration may be "random loaded" where they are simply dumped into the vessel. When loaded in this configuration, they have a lower bulk density and associated pressure drop for a particular flow rate. These particles may also be "dense loaded" in a process where they are loaded into the vessel by means of a rotary spreader similar to those used in residential lawn fertilization. When a vessel is dense loaded the pressure drop increases, but more sorbent may be added to a vessel of a fixed size. Commercial operators of treatment systems may initially design the system for a random loaded operation and, if the need for more capacity should arise in the future, may dense load the vessel and upgrade pumps to expand the capacity of the system without the need for an investment in another vessel.

Sorbent of this larger nominal size may also be created by precipitating oxides of manganese or co-precipitating oxides of manganese with foreign metal cations onto substrates of the desired size and shape. The same precipitation or co-precipitation process may be used with other metal oxides such as oxides of iron. Activated aluminas and activated carbons, for example, are commercially available in a wide variety of sizes and shapes. These active substrates, as well as other active and inactive substrates, may be used to create the physical configuration of sorbent particle desired for the particular application.

Systems of fixed bed contactors may include more than one contactor, so that while water is being treated by one contactor another is being regenerated and prepared for reuse. This system may be arranged with common piping for a smooth on-line transition between vessels without interruption of the flow of the stream to be treated. This type of system may be configured such that when treating water, the water enters through the top of the vessel, and when regenerating the bed or beds, the regeneration fluid enters through the bottom. In this way the regeneration step also serves to "fluff" the bed or beds to reduce compaction caused during the treating process and to thus lower pressure drop through the bed.

The regeneration of a bed of sorbent may be done in situ in the fashion described above. That is a bed may be taken off-line, the loaded metal oxides can be rinsed while in the vessel, an ambient or heated aqueous oxidizing solution may be passed through the vessel, the solution being prepared so as to have Eh and pH values within the metal oxide stability area and with the heated oxidizing solution being monitored and adjusted so that solution temperature, Eh value and pH value are maintained within the metal oxide stability area until the metal oxides are regenerated so as to reestablish pollutant loading capacity and/or average oxidation states to an acceptable level. The filtrate depending upon the metal oxide used may now have the pollutant that was stripped from the metal oxide in a concentrated form. The oxidant, as an example, but not limited to, maybe hydrogen peroxide. This filtrate may now be routed to another vessel where ferric chloride or ferrous sulfate may be introduced to capture the pollutant and bind it for disposal. This process is advantageous as the pollutant is concentrated along with other suspended particles when the bed is regenerated and smaller amounts of the binding agent are used. This leaves the sorbent in situ and allows for repeated regenerations. Also, the oxidant breaks down into water and is not hazardous to drinking water. After this is complete the bed may be put back on-line when another bed is spent and the other bed can then be taken off-line and regenerated in the same manner. Alternatively, the metal oxide sorbent may be removed from the contact vessel and routed for regeneration as previously detailed hereinabove, utilizing either a batch or continuous flow reactor.

The use of foreign metal cations may provide for an increased utilization of the sorbent for target pollutant removal. Increased utilization can be achieved by selecting which foreign metal cation or cations to use and/or increasing the amounts of the particular metal cations used within the metal oxide structure. Foreign metal cations can increase the reactive properties of the sorbent which are directly related to capturing targeted pollutants or sorbent utilization. Applicants have found that by inserting specific foreign metal cations, such as titanium, into the metal oxide structure, the relative affinity for various pollutants may be modified. Thus, sorbent can be selectively engineered to increase its utilization or affinity for different pollutants, and may be selectively engineered to decrease its affinity or utilization for different pollutants. This will allow users to reduce the affinity for a benign component of the water stream while maximizing affinity for target pollutants. For example if the water to be treated has a high iron content, sorbent may be modified to reduce its affinity for iron relative to its affinity for arsenic if iron removal is not a goal of the system. This makes for a more cost efficient pollution control system as depending upon what pollutants are to be captured. The pollutant with the lowest utilization will be the controlling factor in determining how much sorbent is used in the system. This will affect component sizing, thus reducing capital, and O & M costs. Selective engineering may also be advantageously utilized in dual-stage or multi-stage removal systems where different pollutants are to be serially removed in different reaction zones.

The systems just described may be designed and sized to remove metals from drinking water at a municipal water plant or at a single residence. They may also be configured for use in industrial processing, wastewater treating, and any conceivable application for the claimed technology.

Yet another embodiment of the invention includes using the metal oxides in a personal protective respirator to remove pollutants and/or toxins from an air stream. The most common respirator is the half-mask respirator. Half-mask respirators may be either disposable or reusable. Disposable half-mask respirators guard against either particulates, gases and vapors, or both. The half-mask respirator for gases and vapors is disposed of when its filtering element is exhausted. This may occur when a user begins to smell or taste the chemical. Reusable half-masks rely on cartridges, some of which block out gases and vapors while others filter out particulates. The two types of cartridges are often used in tandem.

A variation on the reusable half-mask is the full mask, which protects the eyes and more of the face from splashes and flying particles than does the half-mask. Full masks also fit more snugly, minimizing the chance of leakage.

The full mask respirator includes a facepiece and a filter cartridge, sometimes also known as a "canister." Straps are used to secure the facepiece to a user's head. The cartridge may have a filter to remove particles, a sorbent material to remove certain chemicals, both, or other parts. When the user inhales, air is pulled through the filter. Full mask respirators may also be of the positive pressure type with filtered air being pressurized into the mask.

Advantages of respirators that remove airborne chemicals, also known as air-purifying respirators, are that they are less expensive and less complicated than other options.

In a typical disposable filter respirator, a user's inhalation causes air to flow through the inlet, through a particulate filter, through a filter that includes a bed of particulate sorbent, through another particulate filter (to trap sorbent dust) and through the outlet into the mask. When the particulate filter clogs or the sorbent becomes saturated, you must replace the cartridge.

Chemicals in the form of mists or vapors are largely immune to particulate filtration. The most common approach for removing an organic chemical is activated charcoal. Activated charcoals are widely used to adsorb odorous or colored substances from gases or liquids. The large surface area of activated charcoal gives it many bonding sites to which certain chemicals may attach and be trapped. An activated-charcoal filter will remove certain impurities while ignoring others.

Applicants have found that using the metal oxides of the invention, including metal oxides alone, co-precipitated metal oxides, metal oxides incorporating foreign cations, metal oxides precipitated onto or with a substrate such as, but not limited to, activated carbon, in a personal protective respirator cartridge creates a respirator capable of removing a wide variety of pollutants in a safe manner. Applicants further believe that such respirator cartridges will last much longer than conventional counterparts due to the high pollutant loading capacity of the sorbents of this invention.

In another embodiment of the invention, the metal oxides produced by embodiments of the invention are used in gaseous pollutant removal systems. The following example describes such a pollutant removal system integrated with a metal oxide production system. In this example, oxides of manganese are used to recover $NO_X$ and $SO_X$ from flue gases, it being understood that other this and other metal oxides may be used to recover these and other pollutants.

Turning to FIG. 8, the system 60 is a representation of pollutant removal systems in general and it should be understood that the system 60 could be a wet scrubbing removal system, a dry removal system or a combination thereof. System 60 as represented includes a reaction chamber 62 and a sorbent feeder 64 which contains and/or is configured to feed oxides of manganese to the reaction chamber 62. Depending upon the type of reaction chamber, oxides of manganese may be fed as a dry powder or dry particles, as slurry, or as a wet filter cake. Viewed as a representation of a Pahlman Process™ removal system, a stream of untreated gas containing target pollutants is shown entering into the reaction chamber 62. In this system 60, gas and sorbent oxides of manganese are introduced into the reaction chamber 62 and contacted under conditions and for a time sufficient to effect removal of the target pollutant(s) at a targeted removal efficiency rate for the target pollutant(s). It should be understood that the gas and the oxides of manganese may be introduced together or separately into reaction chamber 62, depending upon the type pollutant removal system and type of reaction chamber employed. Clean gas, gas from which a target pollutant has been removed, is shown to be vented from the reaction chamber 62. Loaded oxides of manganese will be removed from the reaction chamber, as dry reacted sorbent, a filter cake of reacted sorbent or a slurry of reacted sorbent and conveyed for regeneration and/or precipitation processing according to the invention with appropriate handling.

Described in greater detail, one of various embodiments of the Pahlman Process™ system may be viewed as being comprised of a feeder containing a supply of sorbent or oxides of manganese, at least one bag house configured to receive sorbent and a gas containing target pollutants, such as those identified herein above. Gas is introduced at temperatures ranging from ambient temperature to below the thermal decomposition or liquification temperature of manganese salt reaction products formed between the oxides of manganese and the target pollutant. Gases are introduced into the bag house and contacted with the sorbent for a time sufficient to effect capture of the target pollutant at a targeted pollutant capture rate. The target pollutant or pollutants are captured through formation of the reaction product between the target pollutant and the sorbent. The system will also include a controller for simultaneously monitoring and adjusting system operational parameters. The controller provides integrated control of system differential pressure and other operational parameters selected from the including, but not limited to, target pollutant capture rates, gas inlet temperatures, sorbent feeder rates and any combinations thereof. The controller regulates differential pressure within the system so that any differential pressure across the system is no greater than a predetermined level and the target pollutant is removed at the targeted pollutant capture rate set point.

The system may incorporate more than one reaction zone, both of which may be bag houses. Alternatively, the system may optionally incorporate a reaction zone upstream of a bag house into which gas and sorbent are introduced and subsequently directed to the bag house. Such optional reaction zones may be selected from the group of reaction zones that includes a bag house, fluidized bed, a pseudo-fluidized bed, a reaction column, a fixed bed, a moving bed, a serpentine reactor, a section of pipe or duct, an absorber, and a cyclone or multi-clone. When two reaction zones are thus connected and the gas stream contains at least two target pollutants, such as $SO_x$ and $NO_x$, for example, the first target pollutant may be captured or removed in the first reaction zone or substantially removed in the first reaction zone and the second target pollutant will be removed in the second reaction zone. This can be advantageously utilized particularly where the two reaction zones are bag houses to capture a first target pollutant such as $SO_x$ in the first reaction zone and a second target pollutant such as $NO_x$ or mercury in the second reaction zone. This would allow for separate regeneration of loaded sorbent having reaction products thereon from reaction between oxides of manganese and a single target pollutant or at least different target pollutants that are captured in the second bag house. Thus, if the target pollutants are $SO_x$ and $NO_x$ this would allow for separate regeneration and filtration of a $SO_x$ loaded sorbent and $NO_x$ sorbent with their respective reaction product ions being disassociated into separate pre-oxidation rinses with the resultant pre-oxidation filtrates also being separately processed to precipitate out oxides of manganese. The respective precipitation filtrates would then allow for separate production of sulfate by-products and nitrate by-products.

The system may also include three or more reaction chambers 62 connected to a common conduit with one or more diverter valve(s) positioned in the common conduit to direct the flow of gas to the first reaction chamber 62, to the second reaction chamber 62 and/or the third reaction chamber 62. The diverter valve(s) have variable positions that may include first, second and third positions, and so on in sequence. The conduit, diverter valve(s) and reaction chambers 62 are configured so that gas may be routed through any one of the reaction chambers 62, any two of the reaction chambers 62 in series, or all of the at least three reaction chambers 62 in series or in parallel, or any combination of series and parallel.

With reference to FIG. 8, a regeneration system 10 and precipitation system 30 substantially as depicted in FIG. 3 is illustrated in block flow and is connected to removal system 60. Continuous flow reactor 24 is equipped with temperature probe 13A, pH probe 13B, and Eh probe 13C, and pressure probe 13D; continuous flow reactor 14 is equipped with temperature probe 13A, pH probe 13B, Eh probe 13C, and pressure probe 13D all of which are in electronic communication with a controller 67. A premixed oxidant/base vessel (not shown) containing a preheated oxidant/base solution is configured to feed said solution to continuous flow reactor 24 and continuous flow reactor 14. Alternatively, preheated oxidant/base solution may be routed directly from an electrolytic cell 72, such as shown in FIG. 11, or the output of electrolytic cell 72 may be routed to the oxidant vessel. Loaded sorbent may conveyed directly from reaction chamber 62 to regeneration pre-oxidation rinse 12 or it may be directed to a loaded sorbent vessel (not shown) for holding and subsequently conveyed to rinse device 12. The pre-oxidation filtrate from rinse 12 is routed to the continuous flow reactor 24. The rinsed sorbent from pre-oxidation rinse device 12 is slurried as appropriate and routed to the continuous flow reactor 14.

The feeders (not shown) of the premixed oxidant/base vessel, oxidant/base/acid vessel, and loaded sorbent slurry vessels (not shown) are in electronic communication with the controller 67. The controller 67 is also in electronic communication with the Eh probe 13C, pH probe 13B, temperature probe 13A, and pressure probe 13D with which the continuous flow reactor 34 is equipped and Eh probe 13C, pH probe 13B, temperature probe 13A, and pressure probe 13D with which the continuous flow reactor 14 is equipped.

As illustrated, newly precipitated or virgin sorbent from the continuous flow reactor 24 and regenerated sorbent from the continuous flow reactor 14 is routed to filtration unit 16 for filtering. The sorbent is further routed to the rinse device 17 to be further rinsed. Alternatively, filtration unit 16 and rinse 17 may be combined into one device so as to remove filtrate and rinse in a combined operation. Also, sorbent from the continuous flow reactor 24 and the sorbent from continuous flow reactor 14 may each have its own filtration device and sorbent rinse device. Sorbent is then routed to the sorbent dryer 18 As illustrated, sorbent from sorbent dryer 18 is routed to comminuting device 19 and then to sorbent feeder 64 which in turn feeds the sorbent to reaction chamber 62. Alternatively, sorbent from dryer 18 may be routed directly to reaction chamber 62 or to a sorbent storage vessel prior to being directed to the feeder 64.

Reaction chamber 62 is equipped with optional target pollutant concentration readers or continuous emission monitors (CEMS) for $NO_x$ and $SO_2$, readers 68A and 68B, which are in electronic communication with controller 67. It should be understood the reaction chamber 62 may be equipped with other equivalent readers where different target pollutants are being captured.

The controller 67 interfaces with continuous flow reactor 24 probes 13A, 13B, 13C, and 13D; NOx and $SO_2$ readers 68A and 68B and the premixed oxidant/base vessel, and oxidant/base/acid vessel feeders and vessels (not shown) for measurement and adjustment of operational parameters within reactor 14 and 24. The controller 67 signals the addition of premixed oxidant/base, oxidant, acid, and/or base to continuous flow reactor 24 based upon the inputs received from the probes until the desired Eh/pH reading is obtained prior to addition of the pre-oxidation filtrate into the continuous flow reactor 24. Or controller 67 can be programmed with initial set points corresponding to predetermined amounts of chemical constituents to be added to process solutions based upon historical process data that has been retained. The static mixer or agitator 35 continuously agitates and mixes the combined mixed the solution as it travels through the pipe or continuous flow reactor. The temperature, pressure, pH, and Eh conditions in the continuous flow reactor 24 are monitored and adjusted continuously so as to maintain conditions within the $MnO_2$ stability area.

The controller 67 similarly interfaces with regeneration vessel 14 probes 13A, 13B, 13C, and 13D; $NO_X$ and $SO_2$ readers 68A and 68B and the premixed oxidant/base vessel, and oxidant/base/acid vessel feeders and vessels (not shown) for measurement and adjustment of operational parameters within the vessel 14. Thus, temperature, pressure pH, and Eh conditions in the regeneration slurry in continuous flow reactor 14 are monitored and adjusted continuously so as to maintain conditions within the $MnO_2$ stability area. Continuous flow reactor 24 and continuous flow reactor 14 may be run in parallel operation or alternating operation so as to be able to verify sorbent loading capability using, an optional feedback loop of the controller 67 and probes 68A and 68B.

The controller 67 contains a programmable logic controller (PLC) and other hardware components necessary for the operation of the controller such as a power supply, input and output modules that would communicate with the probes 13A, 13B, 13C, 13D of system 10; probes 13A, 13B, 13C, and 13D of system 30 and/or readers 68A and 68B, and with the premixed oxidant/base vessel, and oxidant/base/acid vessel feeders and vessels (not shown), and loaded sorbent feeder (not shown) and other components. The controller 67 receives inputs from the various probes and readers and converts them into ladder logic language that would be used by an internal control loop, such as a proportional integral derivative (PID) loop or derivation thereof, to individually and simultaneously monitor system operational parameters and to reconcile the inputs with predetermined or computer generated calculated set points for the operational parameters, such as temperature, pressure, Eh, and pH levels, sorbent loading and target pollutant removal or capture rate. As determined by computer logic, the controller 67 will send an output as necessary to any of the feeders of premixed oxidant/base vessel, and oxidant/base/acid vessel (not shown) signaling a feeder to cycle on or to change feeder rate so as to maintain or adjust system operational parameters to within the $MnO_2$ stability area for either continuous flow reactor 24 or continuous flow reactor vessel 14. The controller 67 may also contain an Ethernet card or other component that allows onsite or offsite remote display and operator interface and control as needed.

The controller 67 would be given a start command and direct the loaded sorbent feeder (not shown) to inject predetermined amounts of loaded sorbent into the pre-oxidation rinse device 12. The controller 67 would also signal injection of a predetermined amount of premixed oxidant/base solution to continuous flow reactor 24 and continuous flow reactor 14 while checking and or adjusting the Eh and/or pH of the solution prior to simultaneously feeding in the predetermined amount of pre-oxidation filtrate from the pre-oxidation rinse device 12 into continuous flow reactor 24 and a predetermined amount of rinsed sorbent slurry from the pre-oxidation rinse device 12 into continuous flow reactor 14. The Eh of the precipitation solution in continuous flow reactor 24 and of the regeneration slurry in continuous flow reactor 14 may further be adjusted by addition of an oxidizer in sufficient quantity as to raise the Eh to the desired level from an oxidizer vessel (not shown), containing a supply of oxidizer or aqueous oxidizing solution.

As determined by programmed controller logic, the controller 67 would also check, based on inputs received from precipitation reactor 24 and associated probes 13A, 13B, 13C, and 13D; and continuous flow regeneration vessel 14 and associated probes 13A, 13B, 13C, and 13D. Controller 67 may also check TDS levels base upon inputs received from an optional TDS probe, if provided, for verification and adjustment of molar concentrations of process solution constituents as needed. Conditions in the precipitation solution and in the regeneration slurry may further be adjusted by utilizing a heater or heat exchanger (not shown) to increase or decrease solution temperature; the pH, if needed, by increasing or decreasing the rate of base or acid feed; the Eh, if needed, by increasing or decreasing the oxidizer concentration of the aqueous oxidizing solution or oxidant/base pre-mixed solution; and the pressure, if needed, by controlling the backpressure valve 94

An optional, final quality control loop may be provided, as shown, utilizing the readers 68A and 68B to check the loading performance of the processed oxides of manganese sorbent by sending, for example, $SO_X$ and $NO_X$ readings back to the controller 67. As determined by controller logic, the controller 67 would then adjust continuous flow reactor 24 and/or continuous flow reactor 14 parameters, if needed, to provide precipitated oxides of manganese and regenerated oxides of manganese, respectively, capable of removing target pollutants at the targeted removal rates.

The same controller may also be used to control the entire operation of the removal system 60, the regeneration system 10 and the precipitation system 30 and their components as discussed above including, pre-oxidation rinse 12, filtration unit 16, rinse device 17, dryer 18, comminuting device 19, sorbent feeder device 64 and the by-products processing vessel 66, and electrolytic cell device (not shown but depicted in FIG. 11) or separate controllers may be provided for different components or group of components or functions.

With reference to FIG. 9, the regeneration and precipitation system 10 is depicted as integrated with removal system 60. In the interest of avoiding undue repetition, Applicants note that the operation and control of the integrated systems 10 and 60 with controller 67 can be understood as being substantially the same with respect to corresponding components, shown and not shown, as described immediately above with respect to the integrated systems 10, 30 and 60. The controller 67 will be in electronic communication with the probes of a single continuous flow regeneration/precipitation reactor 14; otherwise, the operation and functions of electronic control and communication is substantially the same as described. With reference to FIG. 10, this is equally applicable to the integration of systems 10 and 60 and the operation and function of electronic communication and control of the corresponding system components. Note that a variation of regeneration and precipitation method is illustrated. In FIG. 10, reacted sorbent is rinsed and filtered and routed to dryer 17. It is not directed to a continuous flow reactor but the pre-oxidation filtrate is routed to continuous flow reactor 14 where precipitation is carried out as previously described. This variation of the method of the invention can be used where the loading capacity oxides of manganese below the reaction product surface coating on the sorbent particles has not been so significantly diminished during pollutant removal as to required chemical regeneration. In such cases, it is sufficient to wash away the reaction products, dissolving and disassociating them into the rinse solution or pre-oxidation filtrate and the rinsed oxides of manganese can then be dried and comminuted if necessary prior to being reused to capture target pollutants. Applicants have found that where the gas stream contains primarily concentrations of $SO_X$ a regeneration rinse is often all that is required prior to reuse of the rinsed sorbent, with recovery of reaction product ions through precipitation and other processing.

In yet another embodiment, the continuous pollutant removal process may be operated with permanganate injection in order to provide additional means of metals removal in a pollutant removal system such as the Pahlman Process™ system. In such an embodiment, a slipstream is taken from the solution in the continuous flow reactor prior to the solution going from the permanganate region of the Pourbaix equilibrium diagram and into the $MnO_2$ region and routed to a spray drying nozzle. The permanganate containing slipstream can be injected into the pollutant removal system or upstream thereof and contacted with the target pollutant containing gas and entrained sorbent. Where after start up, the sorbent is being provided by one or more $MnO_2$ injection spray, the slip stream and $MnO_2$ may be injected at different stages from multiple nozzles or multiple injection points either separately or simultaneously, with the injections sequenced or coordinated, as necessary, to provide optimal utilization of the permanganates for metals removal. The permanganate may be injected in varying concentrations, as necessary, depending upon concentrations of mercury (elemental, oxidized or total mercury compounds) or other heavy metal compound in the gas stream. This will assist in converting metals from elemental or other reduced states into oxidized metals and lead further to capturing the oxidized mercury or other oxidized metals in a baghouse reactor, such as in a Pahlman Process™ pollutant removal system. The process of capturing mercury or other heavy metals may or may not depend upon oxidizing them with permanganate; and the capture of some but not necessarily all such pollutants may be aided by a permanganate injection. If metal oxides other than oxides of manganese are used as sorbents, potassium permanganate may be purchased and injected from a separate tank outside the system rather than use the slipstream of the $MnO_2$ continuous process. The tank concentration may be varied as required to maintain capture rates of mercury as necessary.

The permanganate, after capture in the baghouse and going through the regeneration process, will convert to a lower oxide of manganese as it is water soluble and stay within the system. This will create a closed loop process where none of the manganese is lost no matter what form it may be in. The metal oxide filter cake leaving filter press may be routed for further handling and processing such as drying and comminuting prior to introduction into a sorbent feeder and subsequently feed into or upstream of a baghouse reactor. Or the filter cake be conveyed to a filter cake feeder or mixed into a slurry and routed to a spray dryer or nozzles prior to the baghouse reactor.

Applicants have prepared specific illustrative examples which are discussed and summarized in the following discussion.

One on the key aspects of the various embodiments of the Applicants' invention is the ability to control specific metal oxide particle characteristics such as: particle surface area, bulk density, pore size, pore volume and other characteristics like particle density and nanofiber dimensions. These metal oxide characteristics affect the sorbent's ability to affect target pollutants thus affecting utilization and cost of the process. Large values for particle surface area means there are more potential reaction sites at the surface of the sorbent, so less particles need to migrate into the structure to be captured. Pores volume and size regulate how readily diffusion of mobile species like cations occurs. Pore volume and size are controlled with the addition of foreign cations. The cations can modify the lattice structure by increasing lattice defects during the nanofiber growth process. For example, this affect can lead to larger pore volumes and/or more pores with smaller volumes depending on how the structures stack together. These properties ultimately affect sorbent/pollutant reaction kinetics and utilization; therefore, to be able to manipulate these parameters is important. Bulk density is important for transportation purposes; for example, the sorbent needs to have a low bulk density so it can be adequately mixed by the flue gas to initiate reaction. All of these particle characteristics can be affected or controlled through the embodiments of the Applicants' invention by introducing metal cations of primary and secondary metal into metal oxides or metal oxide compounds and by precipitating the various metal oxides onto substrates.

EXAMPLE 1

As an illustrative example not intended to be limiting in scope, metal oxide based sorbents created with foreign cation addition techniques and metal precipitation onto substrates as detailed in the Applicant's invention using either the continuous flow reactor or batch processes are detailed in the following example. A series of metal oxide based sorbents were created and analyzed for specific particle characteristics. Table 2, provides a summary of the prepared metal oxide sorbents along with a summary of key particle characteristic data.

Eleven metal oxide sorbents were all produced in accordance to the methods of the Applicant's invention and utilized potassium persulfate ($K_2S_2O_8$) as the oxidant in the oxidizing aqueous solution and potassium hydroxide (KOH) and for pH control and are all labeled A-K in Table 2. Seven of the sorbents, labeled A-G, were prepared utilizing the Applicant's inventive concept of adding metal cations of primary and secondary metals to a newly precipitated metal oxide, in this case $MnO_2$. As to not be redundant and repetitive, metal oxide sorbent A will be described in detail, and it should be understood that all seven (A-G) were prepared in the same manner except for the addition of a different soluble metal salt. Turning now to sorbent A, a metal oxide soluble salt solution of 1/16 Mole $BaSO_4$ was added to 1.0 Mole solution of $MnSO_4$. Upon contacting the oxidizing aqueous solution and combined soluble metal salt solution, process parameters were controlled and maintained according to the methods of the Applicant's invention with respect to system temperature, pressure, Eh, and pH and controlled with respect to the systems metal oxide stability area. Sorbent A is thus composed of a primary metal oxide $MnO_2$ with incorporation of a primary metal cation, namely $Ba^{+2}$ and a secondary metal cation, namely $K^{+2}$. The $K^{+2}$ originating from the potassium persulfate ($K_2S_2O_8$) used to prepare the oxidizing aqueous solution and base (KOH) addition for pH control during processing. The remaining 6 sorbents B-G were prepared identically, with the exception of the soluble metal salt namely: $Li_2SO_4$, $CuSO_4$, $MgSO_4$, $Al_2(SO_4)_3$, $Ti_2(SO_4)_3$ and $Fe_2(SO_4)_3$. From looking at the particle analysis data in Table 2, it can be seen that through the addition of selected primary and secondary metal cations to the precipitated primary metal oxide, in this case $MnO_2$, important particle physical properties such as particle size, surface area, and bulk density can be controlled to optimize the sorbents target pollutant removal rates.

For four of the eleven metal oxide sorbents, labeled H-K as illustrated in Table 2, the practice of precipitating metal oxides onto insoluble substrates was demonstrated as outlined in the Applicants' invention. Sorbents H-K all started with 1.0 Mole of a soluble metal salt which was intended to be the primary metal oxide precipitate, in this case manganese sulfate ($MnSO_4$), and to that soluble metal salt solution ¼ Mole of one of the following substrates was respectively added: for sample "H", iron (III) oxide ($Fe_2O_3$), for sample "I", magnesium (II) Oxide (MgO) for sample "J" and titanium (IV) oxide ($TiO_2$), and for sample "K" aluminum (III) oxide ($Al_2O_3$). For metal oxide sorbents H-K the oxidizing aqueous solution and base addition for pH control was again potassium persulfate and KOH. It should therefore be noted that the primary metal oxide being precipitated on the various substrates was $MnO_2$, however, incorporation of a foreign cation, namely $K^{+2}$ was also taking place. Referring again to the particle analysis data in Table 2, it can be seen that the Applicants' method of precipitating a primary metal oxide onto an insoluble substrate along with the addition of selected foreign cations ($K^{+2}$) to the primary precipitated metal oxide, in this case $MnO_2$, important particle physical properties such as particle size, surface area, and bulk density can be engineered or controlled to optimize the sorbents target pollutant removal rates. For comparative purposes, a sorbent labeled as "baseline" is provided. The baseline sorbent was produced according to the methods of the invention with a 1.0 Mole solution of $MnSO_4$ and potassium persulfate supplied in the aqueous oxidizing solution and potassium hydroxide for Ph control.

TABLE 2

Metal Oxide Particle Data

| Sample ID | Foreign Cation | Substrate | Surface Area ($m^2/g$) | Particle Size (microns) | Bulk Density (g/cc) |
|---|---|---|---|---|---|
| Baseline | K | | 263 | 12.1 | 0.520 |
| Foreign Cation Addition | | | | | |
| A | Ba | | 157 | 12.4 | 0.434 |
| B | Li | | 246 | 13.4 | 0.447 |
| C | Cu | | 286 | 11.9 | 0.553 |
| D | Mg | | 318 | 11.6 | 0.445 |
| E | Al | | 330 | 13.2 | 0.338 |
| F | Ti | | 378 | 11.1 | 0.414 |
| G | Fe(III) | | 445 | 12.8 | 0.408 |
| Substrate Precipitation | | | | | |
| H | | $Fe_2O_3$ | 227 | 5.5 | 0.552 |
| I | | MgO | 314 | 22.1 | 0.359 |
| J | | $TiO_2$ | 315 | 12.8 | 0.463 |
| K | | $Al_2O_3$ | 365 | 15.9 | 0.473 |

EXAMPLE 2

As an illustrative example, metal oxide based sorbents created with foreign cation addition techniques and metal precipitation onto substrates as detailed in the Applicant's invention using either the continuous flow reactor or batch processes are detailed in this Example 2. In Example 2, a series of metal oxide based sorbents were created and tested for removal of various target pollutants. Table 3, provides a summary of the prepared metal oxide sorbents and target pollutant removal data.

The metal oxide sorbents 1-6 were all precipitated in accordance to the methods of the Applicant's invention and utilized potassium persulfate ($K_2S_2O_8$) and potassium hydroxide (KOH) and the oxidizing aqueous solution. Sorbent 1 was prepared utilizing the Applicant's inventive concept of adding a primary and secondary metal cation to a newly precipitated metal oxide, in the case $Fe_2O_3$. For Sorbent 1, a metal oxide soluble salt solution of 0.5 Mole $Fe_2(SO_4)_3$ and 1/32 mole $MnSO_4$ was prepared. Upon contacting the oxidizing aqueous solution and soluble metal salt solution, process parameters were controlled and maintained according to the methods of the Applicant's invention with respect to system temperature, pressure, Eh, and pH and controlled with respect to the systems metal oxide stability area. Sorbent 1 contains a primary metal oxide $Fe_2O_3$ with incorporation of a primary metal cation, namely $Mn^{+2}$ and a secondary metal cation, namely $K^{+2}$, from the oxidant and base into the crystalline structure. Sorbent 2 was prepared in the same manner as Sorbent 1, however, the soluble metal salt solution contained only 0.5 Mole of $Fe_2(SO_4)_3$. Therefore, Sorbent 2 was composed of a primary metal oxide $Fe_2O_3$ with incorporation of a foreign cation, namely $K^{+2}$, from the oxidant and base oxidizing aqueous solution and base addition for pH control during processing. Again, Sorbent 3 was prepared in the same manner as Sorbent 1, however, the soluble metal salt solution contained only 1.0 mole of manganese sulfate ($MnSO_4$). Sorbent 3, therefore, was composed of a primary metal oxide $MnO_2$ with incorporation of a foreign cation, namely $K^{+2}$, from the oxidant and base oxidizing aqueous solution and base addition for pH control during processing. As an illustrative example not intended to be limiting, the % potassium incorporated into the $MnO_2$ structure of Sorbent 3 was measured through compositional analysis to be 6.81% by weight with 18% structural water. As the compositional analysis indicates, it should be noted that the sorbent represented as $MnO_2$ can alternatively be represented as $K_yMnO_x*zH_2O$. Other metal oxides and metal oxide compounds incorporate foreign cations prepared by methods of the invention may be similarly analyzed and represented.

Sorbents 4-6 were prepared by utilizing the method in the Applicant's invention of precipitating metal oxides onto insoluble substrates. Sorbents 4-6 all started with a soluble metal salt, specifically manganese sulfate ($MnSO_4$), and added ⅛ Mole quantities, respectively, of iron (III) oxide ($Fe_2O_3$), aluminum (III) oxide ($Al_2O_3$), and titanium (IV) oxide ($TiO_2$) to the starting soluble metal salt solution. Sorbent 4 contained the ($Fe_2O_3$), Sorbent 5 contained ($Al_2O_3$), and sorbent 6 contained ($TiO_2$). For Sorbents 4-6 the oxidizing aqueous solution and base addition for pH control was again potassium persulfate and KOH. It should therefore be noted that the primary metal oxide being precipitated on the various substrates was $MnO_2$, however, incorporation of a primary foreign cation, namely $K^{+2}$.

Each of the six sorbents were tested for their ability to remove a target pollutant from water, in this case the two common forms of arsenic. Known concentrations of arsenite ($As^{+3}$) and arsenate ($As^{+5}$) were both spiked in an aliquot of typical drinking water. A known quantity of sorbent was then mixed with the contaminated aliquot and filtered. After filtering, the effluent water was tested for the presence of the contaminating arsenic ion using the induced coupled plasma (ICP) analytical technique. Removal percentages were then calculated and are presented in Table 2. In all cases, the metal oxide sorbent removed both forms of arsenic down to the detection limit of the analysis method.

The removal of water hardness, as represented by concentrations of calcium (Ca) and/or magnesium (Mg) ions present in the water samples, was also conducted on samples of Sorbents 1-3. Similar to the arsenic testing procedure, drinking water aliquots were spiked with known concentrations of Ca and Mg, mixed with a specified amount of sorbent, separated through filtration and the resulting liquid was tested for the presence of either cation. Cation detection was determined using standard titration analytical procedure. Removal percentages were than calculated and presented in Table 3. The degree of water hardness removal can be seen to vary for metal oxide sorbents produced by the different embodiments of the Applicant's invention.

Each sorbent removed both forms of arsenic to concentrations below the detection limits of the analytical equipment used. However, the degree of water hardness removal could be varied based upon both the type of metal oxide sorbent produced and the addition of different foreign cations into the primary metal oxides crystalline structure

TABLE 3

| Solution | Initial | Final | % Removal |
|---|---|---|---|
| Sorbent 1: 0.5 Mole $Fe_2(SO_4)_3$ and 1/32 mole $MnSO_4$ | | | |
| As[III] from $As_2O_3$ | 0.69 mg/L | <0.01 mg/L | >98.6% |
| As[V] from $AsHNa_2O_4$ | 0.61 mg/L | <0.01 mg/L | >98.4% |
| Ca Hardness (ppm) | 200 | 200 | 0% |
| Mg Hardness (ppm) | 160 | 160 | 0% |
| Sorbent 2: 0.5 Mole $Fe_2(SO_4)_3$ | | | |
| As[III] from $As_2O_3$ | 0.26 mg/L | <0.01 mg/L | >96.2% |
| As[V] from $AsHNa_2O_4$ | 0.61 mg/L | <0.01 mg/L | >98.4% |
| Ca Hardness (ppm) | 200 | 155 | 22.50% |
| Mg Hardness (ppm) | 160 | 140 | 12.50% |
| Sorbent 3: 1.0 Mole $MnSO_4$ | | | |
| As[III] from $As_2O_3$ | 0.082 mg/L | <0.04 mg/L | >95% |
| As[V] from $AsHNa_2O_4$ | 0.096 mg/L | <0.04 mg/L | >96% |
| Ca Hardness (ppm) | 200 | 50 | 75% |
| Mg Hardness (ppm) | 160 | 0 | 100% |
| Sorbent 4: 1.0 Mole $MnSO_4$ and 1/8 Mole $Fe_2O_3$ Substrate | | | |
| As[III] from $As_2O_3$ | 0.082 mg/L | <0.04 mg/L | >95% |
| As[V] from $AsHNa_2O_4$ | 0.096 mg/L | <0.04 mg/L | >96% |
| Sorbent 5: 1.0 Mole $MnSO_4$ and 1/8 Mole $Al_2O_3$ Substrate | | | |
| As[III] from $As_2O_3$ | 0.082 mg/L | <0.04 mg/L | >95% |
| As[V] from $AsHNa_2O_4$ | 0.096 mg/L | <0.04 mg/L | >96% |
| Sorbent 6: 1.0 Mole $MnSO_4$ and 1/8 Mole $TiO_2$ Substrate | | | |
| As[III] from $As_2O_3$ | 0.082 mg/L | <0.04 mg/L | >95% |
| As[V] from $AsHNa_2O_4$ | 0.096 mg/L | <0.04 mg/L | >96% |

EXAMPLES 3-5

As discussed, the ability of metal oxide based sorbents to remove target pollutants can be controlled through various embodiments of the Applicant's invention. One such embodiment is by introducing foreign metal cations into the primary metal oxides crystalline structure. These foreign metal cations can be introduced in multiple ways during the processes as detailed previously in the multiple embodiments of the invention, both in a batch or continuous flow reactor process. One such method for the introduction involves the metal cations associated with the specific oxidants and bases used to prepare the oxidizing aqueous solution and base for pH control. By way of non-limiting example, potassium ($K_2S_2O_8$) and sodium ($Na_2S_2O_8$) persulfates and potassium (KOH) and sodium (NaOH) hydroxides can supply a $K^{+2}$ or $Na^{+2}$ to the primary metal oxide. Foreign cation introduction can alternatively be accomplished by using a soluble metal salt solution, such as $K_2SO_4$ or $NaSO_4$, as utilized when levels of K and Na desired in the metal oxide are beyond those that could be achieved by the quantities of cations present as result of oxidant and base additions. Additional cations could alternatively be added, such as: $Ba^{2+}$, $Al^{3+}$, and $Mg^{2+}$, by using their soluble salt forms.

As previously noted, the precipitation should be carried out solely with a region of the primary metal oxide stability areas and not in a co-precipitation area of both the primary metal and the metal foreign cation, to avoid co-precipitation. If co-precipitation is desired, the processing should be carried within the co-precipitation stability area.

An additional embodiment of the Applicant's invention that allows control of the metal oxides' target pollutant removal property would be introducing various substrates into both the batch and continuous process. In the following example, manganese dioxide based sorbents were created according to methods of the invention and tested for their target pollutant utilization using a flue gas stream from a coal-fired utility boiler facility. The target pollutant laden gas stream was passed through a glass reactor containing several grams of a specified metal oxide sorbent that was prepared consistent with the methods outlined previously. In this case, the target pollutants were NOx and SOx. Specific removal capabilities of various metal oxide sorbents are expressed as the sorbents' utilization and calculated by taking moles of pollutant removed during the test period to a specified breakthrough level (in this case 90% removal) and dividing by moles of sorbent used in the reactor test (approximately 5.0 grams).

EXAMPLE 3

Three metal oxide sorbents were prepared using the introduction of the foreign cations associated with the specific oxidant and base. Specifically, the ammonium ($NH_4^+$) cation from ammonium persulfate and hydroxide, sodium ($Na^{2+}$) cation from sodium persulfate and hydroxide and potassium ($K^+$) from potassium persulfate and hydroxide. Testing results indicate that the $MnO_2$ metal oxide sorbent with an ammonium ($NH_4^+$) foreign cation bound into the crystalline structure has a $NO_x$ utilization that is 1.9 times greater than an identical $MnO_2$ metal oxide sorbent prepared with sodium ($Na^{2+}$) as the foreign cation bound into the crystalline structure. Additionally, the $MnO_2$ sorbent prepared with potassium ($K^+$) as the foreign cation bound into the crystalline structure exhibited NOx utilization 2.1 times greater than the $MnO_2$ sorbent with sodium ($Na^{2+}$) and 1.1 times greater than $MnO_2$ sorbent with ammonium ($NH_4^+$) as the foreign cation bound into the crystalline structure.

EXAMPLE 4

As an additional example, four manganese based metal oxide sorbents were prepared using the introduction of both a first foreign metal cation associated with the specific oxidant and base, in this case K, from the potassium persulfate and potassium hydroxide and additionally a second foreign metal cation introduced into the system through a soluble cation metal salt. ¼ Mole of the soluble cation salt was added to a 1.0 Mole solution of manganese sulfate ($MnSO_4$) and the process as operated and controlled according to the Applicants' invention with respect to temperature, pressure, Eh, and pH and maintained in the desired metal oxide stability area. The aqueous oxidizing solution was composed of 1.4 Moles of potassium persulfate ($K_2S_2O_8$) and potassium hydroxide was used for pH control. Specifically foreign cations added in the four samples include: barium ($Ba^{2+}$), iron ($Fe^{3+}$), magnesium ($Mg^{2+}$), and aluminum ($Al^{3+}$). The four metal oxide sorbents were then tested for their target pollutant removal and ranked according to their mass utilization. Testing was again carried out using a flue gas stream from a coal-fired utility boiler facility. A target pollutant laden flue gas stream was passed through a glass reactor containing several grams of each of the four metal oxide sorbents. In this case, the target pollutants were NOx and SOx. Specific removal capabilities of various metal oxide sorbents are expressed as the sorbents' utilization and calculated by taking moles of pollutant removed during the test period to a specified breakthrough level (in this case 90% removal) and dividing by moles of sorbent used in the reactor test (approximately 5.0 grams).

The manganese based metal oxide sorbent with barium ($Ba^{2+}$) added as a second foreign metal cation (K was the first foreign metal cation) had a $SO_x$ utilization that was 2.2 times greater than the manganese based metal oxide sorbent with iron ($Fe^{3+}$) added as the secondary foreign metal cation. Additionally, manganese based metal oxide sorbent with aluminum ($Al^{3+}$) added as a secondary foreign metal cation (K was the primary foreign metal cation) had a $NO_x$ utilization that was 1.6 times greater than the manganese based metal oxide sorbent with aluminum ($Al^{3+}$) added as a secondary foreign metal cation.

EXAMPLE 5

In an additional example, two manganese based metal oxides were precipitated onto substrates of aluminum ($Al_2O_3$) and magnesium (MgO). Precipitation of the manganese based metal oxides onto a substrate was carried out as specified above in the Applicants' invention. 1.0 Mole of manganese sulfate ($MnSO_4$) and ¼ Mole aluminum ($Al_2O_3$) for sample 1 and 1.0 Mole of manganese sulfate ($MnSO_4$) and ¼ Mole magnesium (MgO) for sample 2 was treated with the aqueous oxidizing solution, in this case composed of $K_2S_2O_8$ with pH control being accomplished with KOH was processed according to the invention as relating to control of temperature, pressure, molarity, Eh, and pH and within the metal oxides' stability area.

The two sorbents' mass utilization, where NOx was the target pollutant were determined in similar fashion as the foreign cation metal oxide manganese based sorbent as described above. It was found that the manganese based metal oxide sorbent prepared on the aluminum ($Al_2O_3$) substrate had a $NO_x$ utilization that was 1.2 times greater than the manganese based metal oxide sorbent prepared on magnesium a (MgO) substrate.

Therefore, it can be illustrated that application of the methods of the Applicants' invention can be utilized to produce metal oxide sorbents, both with foreign metal cations and on substrates with varying degrees of target pollutant loading rates, as expressed as mass utilization.

While exemplary embodiments of this invention and methods of practicing the same have been illustrated and described, it should be understood that various changes, adaptations, and modifications might be made therein without departing from the spirit of the invention and the scope of the appended claims.

What is claimed is:

1. A method for rapid and adaptive processing of metal oxides, comprising the steps of:
   a. providing a metal containing solution;
   b. providing an aqueous oxidizing solution, the oxidizing solution being prepared to have Eh and pH values within a stability area of an aqueous solution system, the stability area being selected from the group consisting of a metal oxide stability area, a metal ion stability area, and a polyatomic ion stability area for an aqueous solution system at process temperature and process pressure when the aqueous oxidizing solution is mixed with the metal containing solution;
   c. feeding the metal containing solution and the aqueous oxidizing solution into at least one continuous flow reactor, the solutions being fed either separately into the continuous flow reactor where they mix to form a combined mixed processing solution or being premixed and fed as a combined mixed processing solution;
   d. heating the combined mixed processing solution to process temperature;
   e. monitoring and adjusting the combined mixed processing solution temperature, Eh value, pH value, molarity, and pressure within the continuous flow reactor so as to rapidly and adaptively move combined mixed processing solution conditions into and/or maintain the combined processing solution conditions within the stability area; and
   f. maintaining the combined mixed processing solution conditions within the stability area as the combined mixed processing solution travels through the continuous flow reactor so as to produce metal oxides selected from the group consisting of regenerated metal oxides, pretreated metal oxides, precipitated metal oxides, and regenerated and precipitated metal oxides.

2. A method for rapid and adaptive processing of metal oxides, comprising the steps of:
   a. providing at least first and second metal containing solutions or a mixed metal containing solution of the at least first and second metals;
   b. providing an aqueous oxidizing solution, the oxidizing solution being prepared to have Eh and pH values within a co-precipitation stability area of an aqueous solution system for the at least first and second metals at process temperature and process pressure when the aqueous oxidizing solution is mixed with the at least first and second metal containing solutions;
   c. feeding the at least first and second metal containing solutions or the mixed metal containing solution and the aqueous oxidizing solution into at least one continuous flow reactor, the solutions being fed either separately into the continuous flow reactor where they mix to form a combined mixed processing solution or being premixed and fed as a combined mixed processing solution;
   d. heating the combined mixed processing solution to process temperature;
   e. monitoring and adjusting the combined mixed processing solution temperature, Eh value, pH value, molarity, and pressure within the continuous flow reactor so as to rapidly and adaptively move combined mixed processing solution conditions into and/or maintain the combined processing solution conditions within the co-precipitation stability area; and
   f. maintaining the combined mixed processing solution conditions within the co-precipitation stability area as the combined mixed processing solution travels through the continuous flow reactor so as to produce a co-precipitated metal oxide.

3. A method for rapid and adaptive processing of metal oxides incorporating foreign metal cations, comprising the steps of:
   a. providing a primary metal containing solution, the primary metal containing solution being a solution of a first metal salt;
   b. providing at least one secondary metal containing solution, the secondary metal containing solution being a solution of at least one secondary metal salt with the foreign metal cations being disassociated metal cations of the at least one secondary metal salt;

c. providing an aqueous oxidizing solution, the oxidizing solution being prepared to have Eh and pH values within a first metal stability area of an aqueous solution system, the stability area being selected from the group consisting of a first metal oxide stability area, a first metal ion stability area, and a polyatomic ion stability area for a polyatomic ion of the first metal for an aqueous solution system at process temperature and process pressure when the aqueous oxidizing solution is mixed with the metal containing solutions;

d. feeding the metal containing solutions and the aqueous oxidizing solution into at least one continuous flow reactor, the solutions being fed either separately into the continuous flow reactor where they mix to form a combined mixed processing solution or being premixed and fed as a combined mixed processing solution;

e. heating the combined mixed processing solution to process temperature;

f. monitoring and adjusting the combined mixed processing solution temperature, Eh value, pH value, molarity, and pressure within the continuous flow reactor so as to rapidly and adaptively move combined mixed processing solution conditions into and/or maintain the combined processing solution conditions within the first metal stability area but outside of a metal oxide stability area of the at least one secondary metal; and g. maintaining the combined mixed processing solution conditions solely within the first metal stability area as the combined mixed processing solution travels through the continuous flow reactor so as to produce first metal oxides incorporating foreign metal cations.

4. A method for rapid and adaptive processing of metal oxides incorporating foreign metal cations, comprising the steps of:

a. providing a metal containing solution, the metal containing solution comprising at least one disassociated primary metal salt and at least one disassociated secondary metal salt, the primary metal being a first metal and the foreign metal cations being disassociated metal cations of the at least one secondary metal salt;

b. providing an aqueous oxidizing solution, the oxidizing solution being prepared to have Eh and pH values within a first metal stability area of an aqueous solution system, the stability area being selected from the group consisting of a first metal oxide stability area, a first metal ion stability area, and a polyatomic ion stability area for a polyatomic ion of the first metal for an aqueous solution system at process temperature and process pressure when the aqueous oxidizing solution is mixed with the metal containing solution;

c. feeding the metal containing solution and the aqueous oxidizing solution into at least one continuous flow reactor, the solutions being fed either separately into the continuous flow reactor where they mix to form a combined mixed processing solution or being premixed and fed as a combined mixed processing solution;

d. heating the combined mixed processing solution to process temperature;

e. monitoring and adjusting the combined mixed processing solution temperature, Eh value, pH value, molarity, and pressure within the continuous flow reactor so as to rapidly and adaptively move combined mixed processing solution conditions into and/or maintain the combined processing solution conditions within the first metal stability area but outside of a metal oxide stability area of the at least one secondary metal; and f. maintaining the combined mixed processing solution conditions solely within the first metal stability area as the combined mixed processing solution travels through the continuous flow reactor so as to produce first metal oxides incorporating foreign metal cations.

5. A method for rapid and adaptive processing of metal oxide sorbents, comprising the steps of:

a. providing at least first and second metal containing solutions or a mixed metal containing solution of the at least first and second metals;

b. providing at least one secondary metal containing solution, the secondary metal containing solution being a solution of at least one secondary metal salt with foreign metal cations being disassociated metal cations of the at least one secondary metal salt;

c. providing an aqueous oxidizing solution, the oxidizing solution being prepared to have Eh and pH values within a co-precipitation stability area of an aqueous solution system for the at least first and second metals at process temperature and process pressure when the aqueous oxidizing solution is mixed with the at least first and second metal containing solutions and the at least one secondary metal containing solution;

d. feeding the at least first and second metal containing solutions or the combined at least first and second metal solution, the at least one secondary metal containing solution, and the aqueous oxidizing solution into at least one continuous flow reactor, the solutions being fed either separately into the continuous flow reactor where they mix to form a combined mixed processing solution or being premixed and fed as a combined mixed processing solution;

e. heating the combined mixed processing solution to process temperature;

f. monitoring and adjusting the combined mixed processing solution temperature, Eh value, pH value, molarity, and pressure within the continuous flow reactor so as to rapidly and adaptively move combined mixed processing solution conditions into and maintain the combined mixed processing solution conditions within the co-precipitation stability area; and g. maintaining the combined mixed processing solution conditions within the co-precipitation stability area as the combined mixed processing solution travels through the continuous flow reactor so as to produce a co-precipitated metal oxide incorporating foreign metal cations.

6. The method of any one of claims 1-5, further comprising:

providing a substrate sized to be fed into the continuous flow reactor; and feeding the substrate into the continuous flow reactor, the substrate being fed separately or mixed in one of the process solutions being fed into the continuous flow reactor; and wherein the metal oxides are precipitated onto the substrate.

7. The method of any one of claims 1-5, further comprising:

providing a metal oxide substrate in particle form, the substrate being sized to be fed into the continuous flow reactor;

feeding the substrate into the continuous flow reactor, the substrate being fed separately or mixed in one of the solutions being fed into the continuous flow reactor; and wherein the metal oxides are precipitated onto the substrate.

8. The method of any one of claims 1-5, further comprising the step of heating the combined mixed processing solution within the continuous flow reactor to a temperature at or above 100° C.

9. The method of any one of claims 1-5, further comprising the step of heating the combined mixed processing solution within the continuous flow reactor to a temperature above 100° C. after being fed into the continuous flow reactor, wherein the metal containing solution and the aqueous oxidizing solution are heated to a temperature of about 100° C. prior to being fed into the continuous flow reactor.

10. A method of rapid and adaptive processing of metal oxides, comprising the steps of:
   a. feeding a metal containing solution into a precipitation vessel containing a heated aqueous oxidizing solution, the solution being prepared so as to have Eh and pH values within a polyatomic ion stability area, a metal ion stability area, or a metal oxide stability area for an aqueous solution heated to a temperature at or near boiling temperature at atmospheric or higher pressure;
   b. monitoring and adjusting solution temperature, Eh value and pH value so as to rapidly move solution conditions into and to maintain them within the stability area; and
   c. maintaining the solution conditions within the stability area so as to produce metal oxides selected from the group consisting of regenerated metal oxides, pretreated metal oxides, precipitated metal oxides, and regenerated and precipitated metal oxides.

11. A method of rapid and adaptive processing of metal oxides, comprising the steps of:
   a. feeding at least first and second metal containing solutions or a mixed metal containing solution of the at least first and second metals into a precipitation vessel containing a heated aqueous oxidizing solution, the solution being prepared so as to have Eh and pH values within a co-precipitation stability area of an aqueous solution for the at least first and second metals when heated to a temperature at or near boiling temperature at atmospheric or higher pressure and the combined solution being heated to a temperature at or near the boiling temperature;
   b. monitoring and adjusting combined solution temperature, Eh value and pH value so as to rapidly move solution conditions into and to maintain them within the co-precipitation stability area; and
   c. maintaining the combined solution conditions within the co-precipitation stability area so as to produce co-precipitated metal oxide.

12. A method of rapid and adaptive processing of metal oxides incorporating foreign metal cations, comprising the steps of:
   a. providing a primary metal containing solution, the primary metal containing solution being a solution of a first metal salt;
   b. providing at least one secondary metal containing solution, the secondary metal containing solution being a solution of at least one secondary metal salt with foreign metal cations being the dissociated metal cations of the at least one secondary metal salt;
   c. feeding the primary metal containing solution and the at least one secondary metal containing solution into a precipitation vessel containing a heated aqueous oxidizing solution, the solution being prepared so as to have Eh and pH values within a first metal stability area, the first metal stability area being selected from the group consisting of a first metal oxide stability area, a first metal ion stability area, and a polyatomic ion stability area for a polyatomic ion of the first metal for an aqueous solution heated to a temperature at or near boiling temperature at atmospheric or higher pressure and the combined solution being heated to a temperature at or near the boiling temperature;
   d. monitoring and adjusting solution temperature, Eh value and pH value so as to rapidly move solution conditions into and to maintain them within the first metal stability but outside of a metal oxide stability area of the at least one secondary metal; and
   e. maintaining the combined solution conditions solely within the first metal stability area so as to produce first metal oxides incorporating foreign metal cations.

13. A method for rapid and adaptive processing of metal oxides incorporating foreign metal cations, comprising the steps of:
   a. providing a metal containing solution, the metal containing solution comprising at least one disassociated primary metal salt and at least one disassociated secondary metal salt, the disassociated primary metal salt being of at least one first metal and the foreign metal cations being disassociated metal cations of the at least one disassociated secondary metal salt;
   b. mixing the metal containing solution and a heated aqueous oxidizing solution in a precipitation vessel to form a solution mixture, the heated aqueous oxidizing solution being prepared so as to have Eh and pH values within a first metal stability area of an aqueous solution system, the first metal stability area being selected from the group consisting of a first metal oxide stability area, a first metal ion stability area, and a polyatomic ion stability area of the first metal for an aqueous solution heated to a temperature at or near boiling temperature at atmospheric pressure and being heated to a temperature at or near the boiling temperature;
   c. monitoring and adjusting the temperature, Eh value and pH value of the solution mixture so as to rapidly move mixture conditions into and to maintain them within the first metal stability area but outside of a metal oxide stability area of the at least one secondary metal; and
   d. maintaining the solution conditions within the first metal stability area so as to produce first metal oxides incorporating foreign metal cations.

14. A method rapid and adaptive processing of metal oxide sorbents, incorporating foreign metal cations comprising the steps of:
   a. providing at least first and second metal containing solutions or a mixed metal containing solution of the at least first and second metals;
   b. providing at least one secondary metal containing solution, the secondary metal containing solution being a solution of at least one secondary metal salt with the foreign metal cations being disassociated metal cations of the at least one secondary metal salt;
   c. feeding the at least first and second metal containing solutions or the mixed metal containing solution and the at least one secondary metal containing solution into a precipitation vessel containing a heated aqueous oxidizing solution, the solution being prepared so as to have Eh and pH values within a co-precipitation stability area for the at least first and second metals for an aqueous solution heated to a temperature at or near boiling temperature at atmospheric or higher pressure when the aqueous oxidizing solution is mixed with the at least first and second metal containing solutions and the at least one secondary metal containing solution; and d. monitoring and adjusting solution temperature, Eh value and pH value in the precipitation vessel so as to rapidly move solution conditions into and to maintain them within the co-precipitation stability area and maintaining the solution conditions within the co-precipitation stability area so as to produce a co-precipitated metal oxide incorporating foreign cations.

15. The method of any one of claims 10-14, further comprising the steps of:
   feeding a substrate into the precipitation vessel, the substrate being fed separately or mixed in one of the process solutions being fed into the precipitation vessel; and
   wherein the metal oxides are precipitated onto the substrate.

16. The method of any one of claims 10-14, further comprising the steps of:
   feeding a metal oxide substrate in particle form into the precipitation vessel, the substrate being fed separately or mixed in one of the process solutions being fed into the precipitation vessel; and
   wherein the metal oxides are precipitated onto the substrate.

17. The method of any one of claims 1-5 or 10-14, further comprising the step of:
   maintaining solution or solution mixture pH constant throughout the processing cycle.

18. The method of any one of claims 1-5 or 10-14, further comprising the steps of:
   separating the metal oxides from the processing solution to provide separated metal oxides and an oxidation filtrate, the oxidation filtrate being routed for further processing and handling;
   rinsing and filtering the separated metal oxides to provide a rinsed metal oxide filter cake and a rinse filtrate, the rinse filtrate being directed for further handling and processing; and
   directing the filter cake to a filter cake feed for introduction into a reaction chamber of a pollutant removal system.

19. The method of any one of claims 1-5 or 10-14, further comprising the steps of:
   separating the metal oxides from the processing solution to provide separated metal oxides and an oxidation filtrate, the oxidation filtrate being routed for further processing and handling;
   rinsing and filtering the separated metal oxides to provide a rinsed metal oxide filter cake and a rinse filtrate, the rinse filtrate being directed for further handling and processing;
   adding water to the rinsed metal oxides to form a metal oxide slurry; and
   directing the metal oxide slurry to a feeder selected from the group consisting of slurry feeders, spray feeders, and spray injection feeders for introduction into a reaction chamber of a pollutant removal system.

20. The method of any one of claims 1-5 or 10-14, further comprising the steps of:
   separating the metal oxides from the processing solution to provide separated metal oxides and an oxidation filtrate, the oxidation filtrate being routed for further processing and handling; and
   rinsing and filtering the separated metal oxides to provide rinsed metal oxides and a rinse filtrate, the rinse filtrate being directed for further handling and processing.

21. The method of any one of claims 1-5 or 10-14, further comprising the steps of:
   separating the metal oxides from the processing solution to provide separated metal oxides and an oxidation filtrate;
   rinsing and filtering the separated metal oxides to provide rinsed metal oxides and a rinse filtrate; and
   measuring and controlling concentrations of dissolved solids and fine particulates in the rinse filtrate.

22. The method of any one of claims 1-2 or 10-14, further comprising the steps of:
   separating the produced metal oxides from the aqueous oxidizing solution to provide separated metal oxides and a oxidation filtrate, the oxidation filtrate being routed for further processing and handling;
   rinsing and filtering the separated metal oxides to provide rinsed metal oxides and a rinse filtrate, the rinse filtrate being directed further handling and processing; and
   drying and/or comminuting the rinsed metal oxides.

23. The method of any one of claims 1-2 or 10-14, wherein the aqueous oxidizing solution contains an oxidant or oxidizer selected from the group consisting of persulfates, chlorates, perchlorates, permanganates, peroxides, hypochlorites, oxygen, air, organic oxidizers and ozone ($O_3$).

* * * * *